INVENTORS
MAURITZ L. GRANBERG
HUBERT W. MUELLER, JR.
BY Thomas J. Nikolai
ATTORNEY

| MINOR POINTS INCREMENT | | TANGENT (BASE 8) | |
|---|---|---|---|
| X | Y | ADD | CARRY |
| 8 | 2 | .2 | 23 |
| 8 | 2 | .4 | 46 |
| 8 | 2 | .6 | 71 |
| 8 | 3 | 1.1 | 14 |
| 8 | 2 | 1.3 | 37 |
| 8 | 2 | 1.5 | 62 |
| 8 | 3 | 2.0 | 05 |
| 8 | 2 | 2.2 | 30 |

May 5, 1970 M. L. GRANBERG ET AL 3,510,634

DIGITAL VECTOR GENERATOR

Filed Aug. 1, 1966 23 Sheets-Sheet 3

May 5, 1970 M. L. GRANBERG ET AL 3,510,634

DIGITAL VECTOR GENERATOR

Filed Aug. 1, 1966 23 Sheets-Sheet 4

OCTANT DECODER

DIGITAL VECTOR GENERATOR

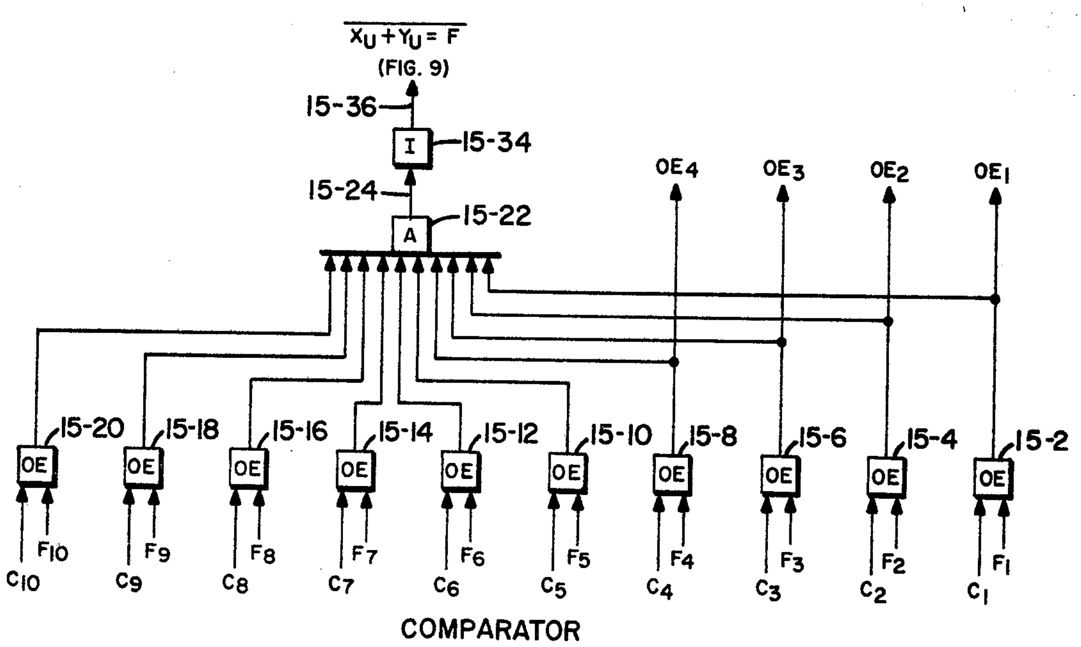
Fig. 15
| BASE 2 | BASE 10 |
|---|---|
| 0 0 0 0 0 | 0 |
| 0 0 0 0 1 | 1 |
| 0 0 0 1 0 | 2 |
| 0 0 0 1 1 | 3 |
| 0 0 1 0 0 | 4 |
| 0 0 1 0 1 | 5 |
| 0 0 1 1 0 | 6 |
| 0 0 1 1 1 | 7 |
| 0 1 0 0 0 | 8 |
| 0 1 0 0 1 | 9 |
| 0 1 0 1 0 | 10 |
| 0 1 0 1 1 | 11 |
| 0 1 1 0 0 | 12 |
| 0 1 1 0 1 | 13 |
| 0 1 1 1 0 | 14 |
| 0 1 1 1 1 | 15 |
| 1 0 0 0 0 | 16 |
| 1 0 0 0 1 | 17 |
Fig. 16
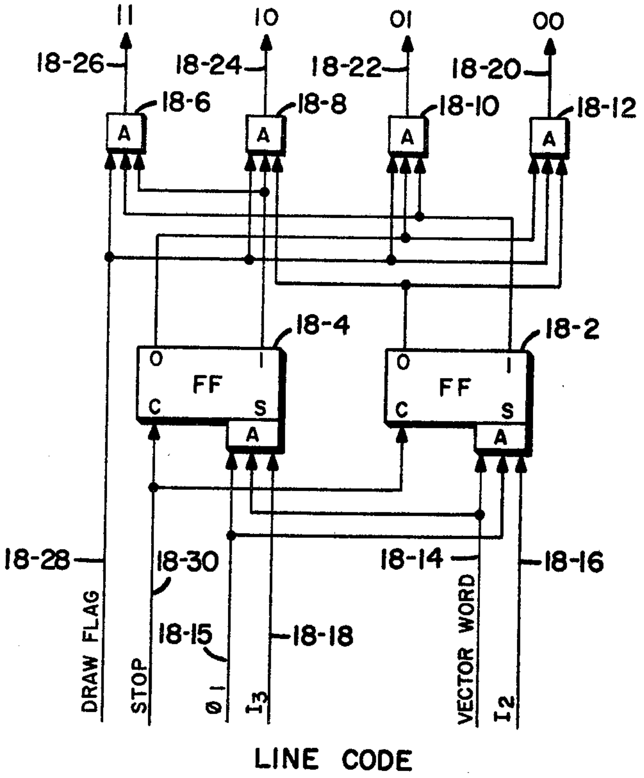
Fig. 18

SPEED SHIFT SENSING

T-REG.

I/O CYCLE
Ø1 —— GATE TO $X_u$, $Y_u$ AND OCTANT REGISTERS.
Ø2 —— GATE TO T AND F-REGS. AND TO D/A CONVERTER FROM X AND Y.
Ø3 ——
Ø4 —— SET DRAW PRESET FLIP-FLOP.

VECTOR DRAW CYCLE
Ø1 —— CLEAR C-REG., GATE X AND Y TO D/A CONVERTER, SET INTENSITY FLIP-FLOP IF DRAW FLAG FLIP-FLOP SET.
Ø2 ——
Ø3 —— SET DRAW FLAG FLIP-FLOP, ENABLE SUBTRACTOR AND COUNTER.
Ø4 —— GATE C TO $X_u$ OR $Y_u$ AND S TO X OR Y.

COMPARE CYCLE
Ø1 —— GATE X AND Y TO D/A CONVERTER
Ø2 ——
Ø3 —— GATE TO C AND S-REG., (OBTAIN COMP.) INHIBIT GATE SIGNALS TO C AND S.
Ø4 —— GATE C TO $X_u$ OR $Y_u$ AND S TO X OR Y, SET STOP FLIP-FLOP.

STOP CYCLE
Ø1 —— GATE X AND Y TO D/A CONVERTER.
Ø2 ——
Ø3 —— CLEAR DRAW PRESET, DRAW, AND INTENSITY FLIP-FLOP.
Ø4 ——

OPERATION TIMING CHART

Fig. 23

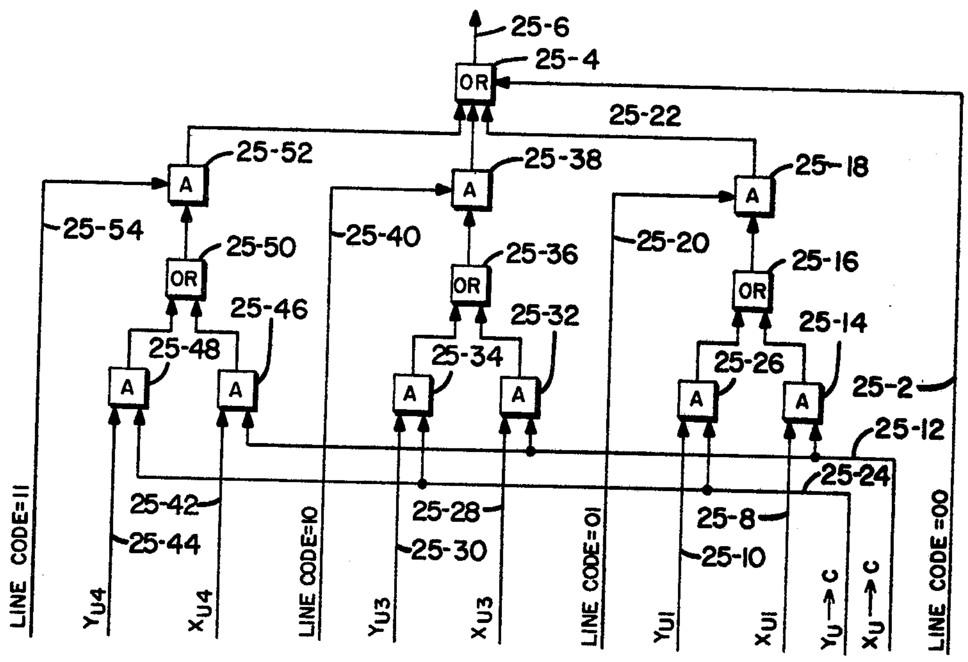

BEAM BLANKING CONTROL

Fig. 25

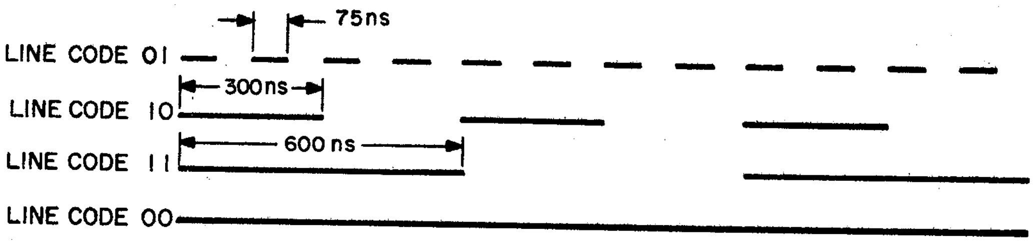

Fig. 26

| GROUP | TAN. REG. | | ANGLE | LENGTH | INTENSITY LEVEL |
|---|---|---|---|---|---|
| | $T_{11}$ $T_{10}$ $T_9$ $T_8$ | BASE 10 | Ø | UNITS | UNITS |
| 1 | 0 0 0 0 | .000 | 00.0° | 1.000 | 1.00 |
| | 0 0 0 1 | .125 | 07.1° | 1.010 | |
| | 0 0 1 0 | .250 | 14.0° | 1.030 | |
| | 0 0 1 1 | .375 | 20.5° | 1.070 | |
| 2 | 0 1 0 0 | .500 | 26.5° | 1.120 | 1.15 |
| | 0 1 0 1 | .625 | 32.0° | 1.180 | |
| 3 | 0 1 1 0 | .750 | 37.0° | 1.250 | 1.25 |
| 4 | 0 1 1 1 | .875 | 41.2° | 1.330 | 1.35 |
| | 1 0 0 0 | 1.000 | 45.0° | 1.414 | |

Fig. 27

$32 = 2^9+2^8+2^7+2^6+2^5$
$64 = 2^9+2^8+2^7+2^6$
$96 = 2^9+2^8+2^7+2^6 \cdot 2^5$
$128 = 2^9+2^8+2^7$
$160 = 2^9+2^8+2^7(2^6+2^5)$
$192 = 2^9+2^8+2^7 \cdot 2^6$
$224 = 2^9+2^8+2^7(2^6 \cdot 2^5)$
$256 = 2^9+2^8$
$288 = 2^9+2^8(2^7+2^6+2^5)$
$320 = 2^9+2^8(2^7+2^6)$
$352 = 2^9+2^8(2^7+2^6 \cdot 2^5)$
$384 = 2^9+2^8 \cdot 2^7$
$416 = 2^9+2^8 \cdot 2^7(2^6+2^5)$
$448 = 2^9+2^8 \cdot 2^7 \cdot 2^6$
$480 = 2^9+2^8 \cdot 2^7 \cdot 2^6 \cdot 2^5$
$512 = 2^9$ $544 = 2^9(2^8+2^7+2^6+2^5)$
$576 = 2^9(2^8+2^7+2^6)$
$608 = 2^9(2^8+2^7+2^6 \cdot 2^5)$
$640 = 2^9(2^8+2^7)$
$672 = 2^9[2^8+2^7 \cdot (2^6+2^5)]$
$704 = 2^9(2^8+2^7 \cdot 2^6)$
$736 = 2^9(2^8+2^7 \cdot 2^6 \cdot 2^5)$
$768 = 2^9 \cdot 2^8$
$800 = 2^9 \cdot 2^8(2^7+2^6+2^5)$
$832 = 2^9 \cdot 2^8(2^7+2^6)$
$864 = 2^9 \cdot 2^8(2^7+2^6 \cdot 2^5)$
$896 = 2^9 \cdot 2^8 \cdot 2^7$
$928 = 2^9 \cdot 2^8 \cdot 2^7(2^6+2^5)$
$960 = 2^9 \cdot 2^8 \cdot 2^7 \cdot 2^6$
$992 = 2^9 \cdot 2^8 \cdot 2^7 \cdot 2^6 \cdot 2^5$

Fig. 31

May 5, 1970 M. L. GRANBERG ET AL 3,510,634

DIGITAL VECTOR GENERATOR

Filed Aug. 1, 1966 23 Sheets-Sheet 18

D/A CONVERTER

POWER AMPLIFIER

| OCTANT | MAIN POSITION REGISTER | + OR − | TAN. OR COT. REG. | + OR − |
|---|---|---|---|---|
| 1 | X | + | TAN Y | + |
| 2 | Y | + | COT X | + |
| 3 | Y | + | COT X | − |
| 4 | X | − | TAN Y | + |
| 5 | X | − | TAN Y | − |
| 6 | Y | − | COT X | − |
| 7 | Y | − | COT X | + |
| 8 | X | + | TAN Y | − |

TABLE I

| Z | C | F |
|---|---|---|
| 1 | 0 | 0 |
| 0 | 1 | 0 |
| 0 | 0 | 1 |
| 1 | 1 | 1 |

$Z = \overline{C\overline{F} + \overline{C}F}$

TABLE II

United States Patent Office 3,510,634
Patented May 5, 1970

3,510,634
DIGITAL VECTOR GENERATOR

Mauritz L. Granberg, Minneapolis, and Hubert W. Mueller, Jr., Hamburg, Minn., assignors to Sperry Rand Corporation, New York, N.Y., a corporation of Delaware Filed Aug. 1, 1966, Ser. No. 569,481
Int. Cl. H01j *29/72*
U.S. Cl. 235—150 10 Claims

ABSTRACT OF THE DISCLOSURE

A high-precision vector generator for displaying on the face of a cathode ray tube a line segment of a desired length and direction wherein digital type circuits are used to develop deflection signals tending to move the electron beam in unit increments along a first Cartesian coordinate axis and along a second axis, at right angles to the first axis, in increments equal to the product of the tangent or cotangent of the direction angle and the unit increment.

This application relates to a new method of and apparatus for generating vectors and in particular to a digital high speed vector display unit. The present invention utilizes basic digital techniques rather than conventional analog techniques in a display design which provides an inherently more simple and stable unit which is free of adjustment or calibration requirements.

Applicants' device provides a new approach to the design of a computer driven display unit. This new design makes feasible displays of a kind not achievable by currently available units. An important advantage of the new display unit lies in its use of solid state digital, rather than analog, circuits to control the electron beam and to form vectors. These circuits are switched only between the "off" condition and the full saturated condition. As a result, in comparison with existing equipment, the display unit is unusually simple in design, reliable in operation, and easy to maintain. It provides a very stable image that is free from jitter and long term drift.

The techniques employed in applicants' device are fundamental in that their implementation is not limited to a particular set of components or hardware. It is thus possible to employ the techniques in many different display applications. In the light of various current procurement specifications, applicants believe that even the most stringent requirements for functional operation, reliability, and maintainability can be met and exceeded through this approach to display unit design. In general, the cost of the display unit utilizing these digital techniques will be substantially lower than that of a comparable unit using analog circuits. The cost reduction is the accumulative result of such factors as fewer components, less rigid parameter requirements, wider acceptable tolerances, less check out time, and practically no adjustments.

A conventional, off-the-shelf, single gun cathode ray tube of any desired diameter and having either electromagnetic or combined electromagnetic/electrostatic deflection may be used. The circuits associated with the cathode ray tube, i.e., power supply, deflection yoke, and yoke drivers, are the only analog devices in the display unit. All other circuits involved in the control of the electron beam operate in the digital on-or-off mode, and therefore require no calibration, adjustment, or maintenance except simple replacement in the event of failure.

This digital design ensures the stability and repeatability of the displayed image, since the circuits are immune to the effect of aging and parameter drift up to the point of actual failure.

The vector generator enables lines to be displayed which originate at any one of more than a million points on the face of the cathode ray tube and which terminate at any one of more than 64 million points. Consequently, vectors may be drawn which range in length from the trivial case of a single point up to full screen deflection. The intensity of the beam is automatically controlled according to the beam speed and vector angle to give uniform brightness to both short and long vectors. Further, a vector speed-up mode for the production of long vectors is used which increases the vector generation speed by a factor of four, eight, sixteen or more. Also, the vector speed may be caused to slow down in steps as the end point is approached. Special features of the binary deflection circuits permit the vector to assume any angle whatsoever with an accuracy greater than the resolving power of the human eye at viewing distance. Also, a digital method is used to introduce a correction every few units of deflection so that the error caused by approximation for any single stroke or for a vector of full screen deflection with a 22 inch screen will be a maximum of .001 inch which is below the level of perception.

These and other more detailed and specific objects will be disclosed in the course of the following specification reference being had to the accompanying drawings, in which:

FIG. 15 illustrates the Comparator circuit;

FIG. 16 is a table comparing values in the base 10 with values in the base 2;

FIG. 18 illustrates the Line Code control circuitry;

Figure 22:
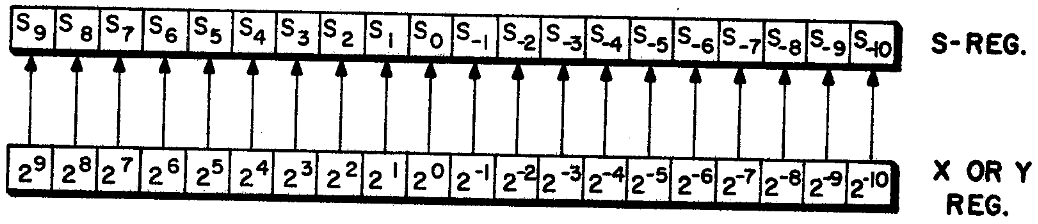
Figure 21:
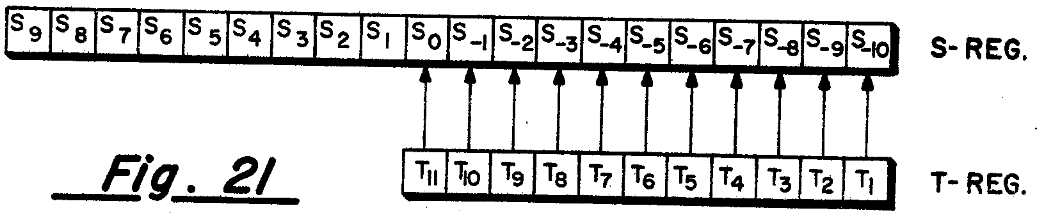
Figure 19:
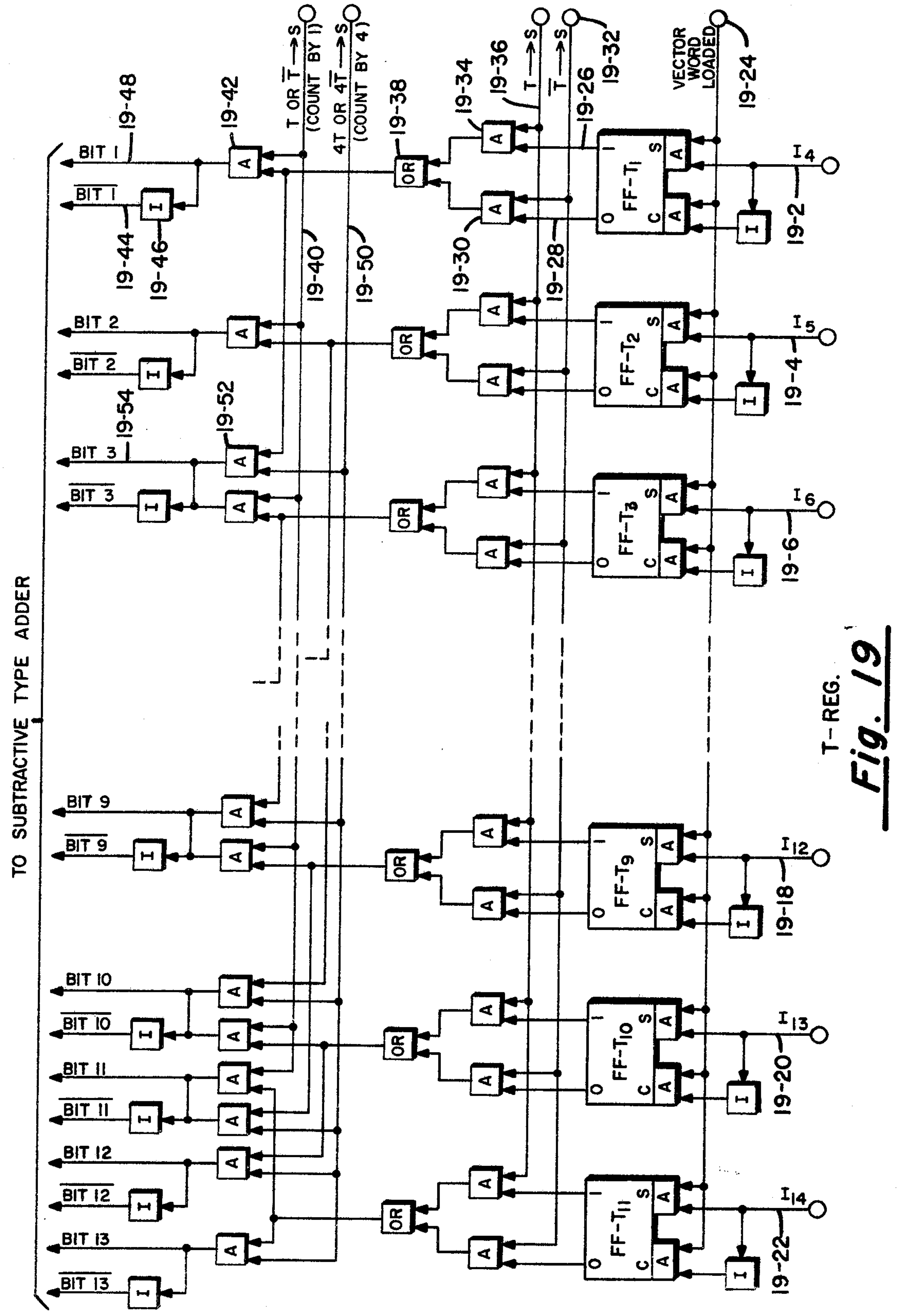
Figure 20:
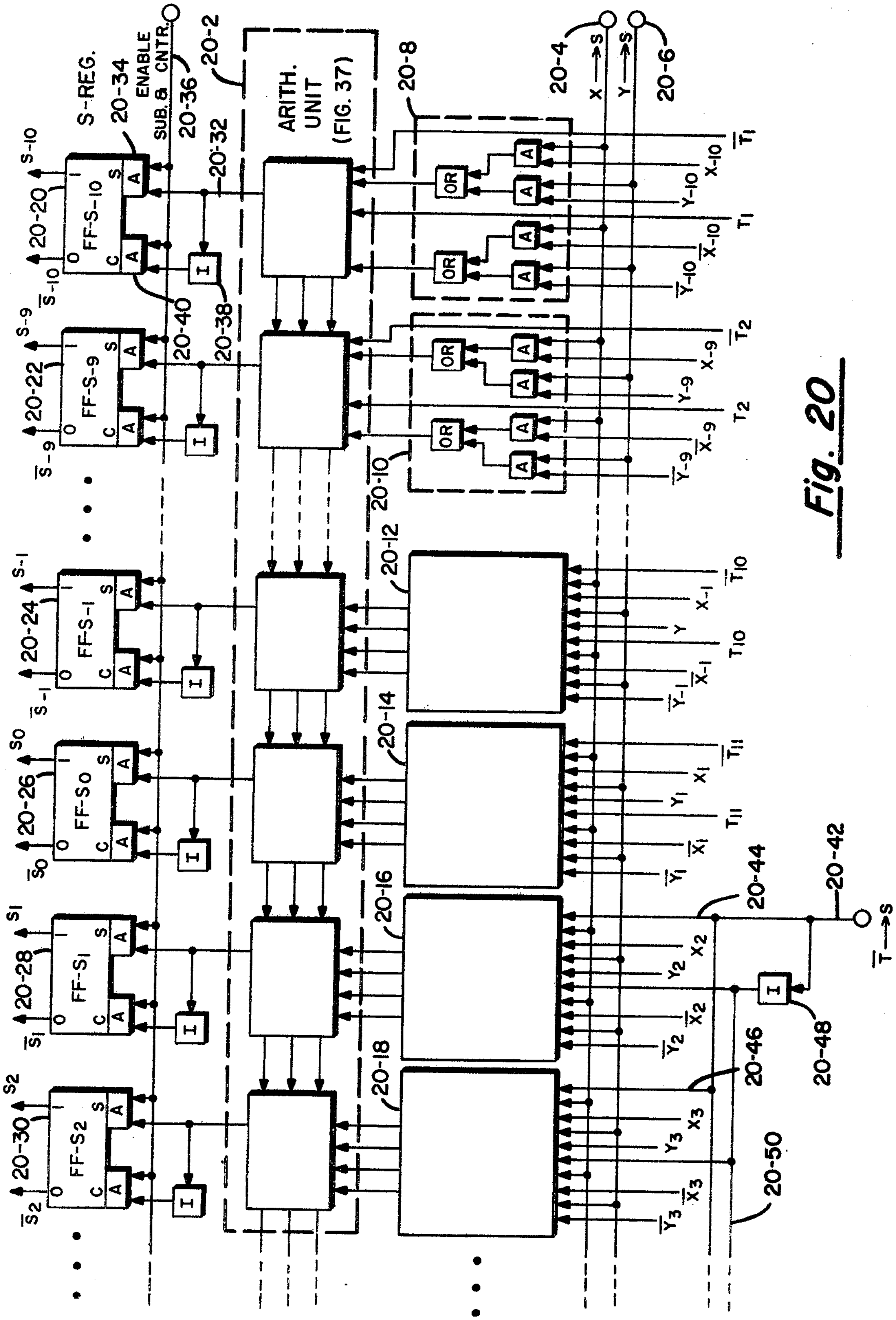
Figure 24:
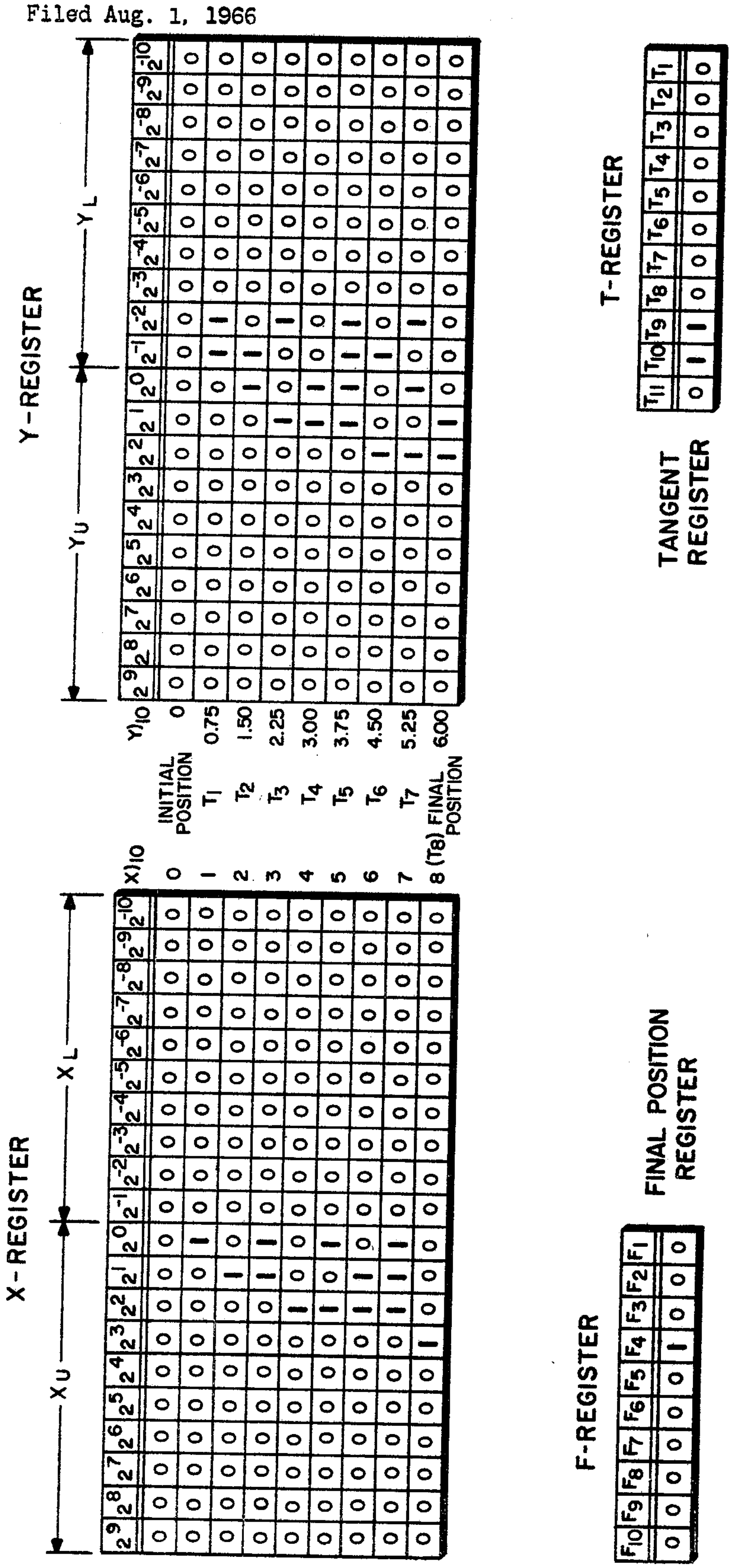
Figure 28:
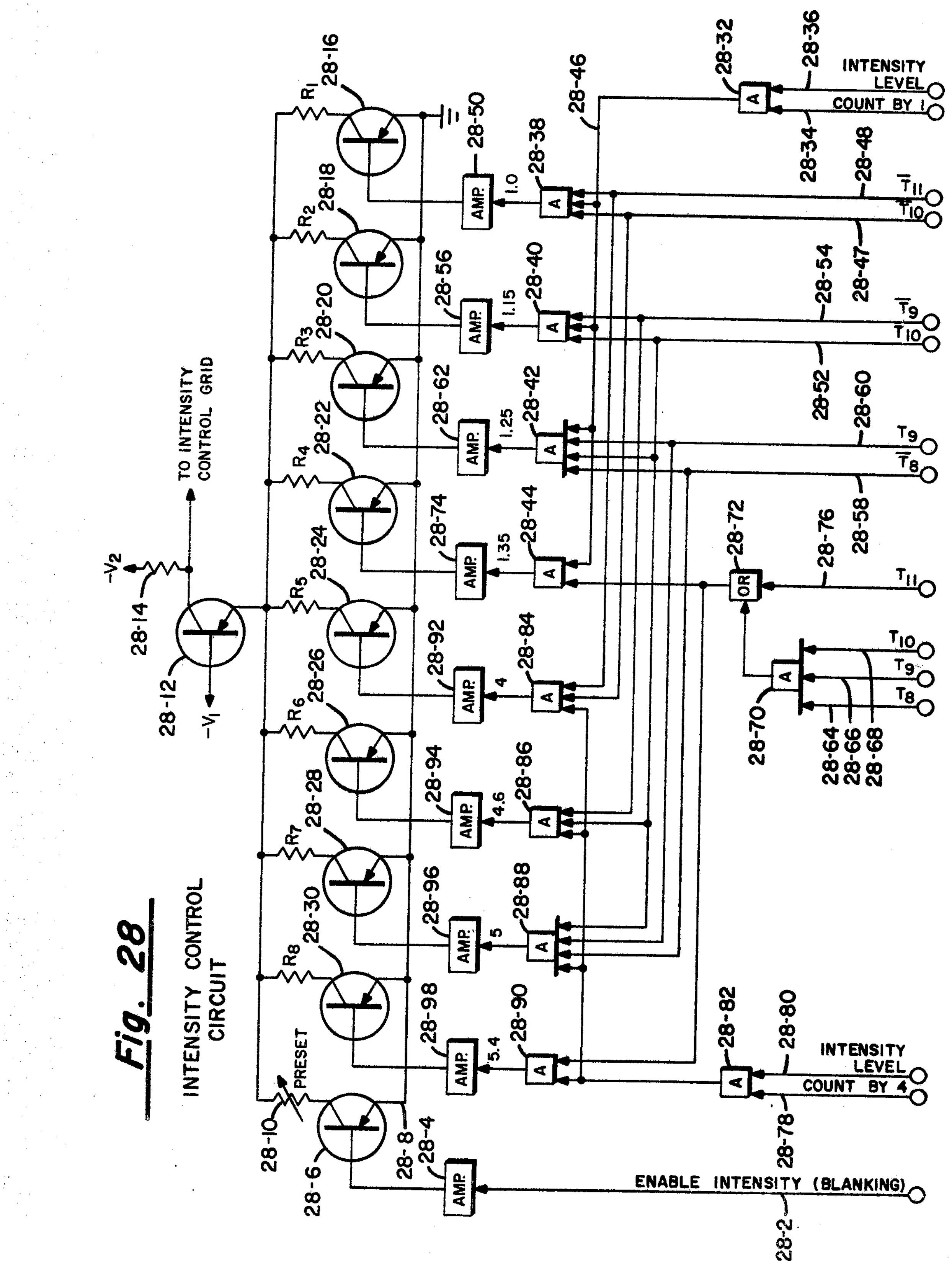
Figure 29:
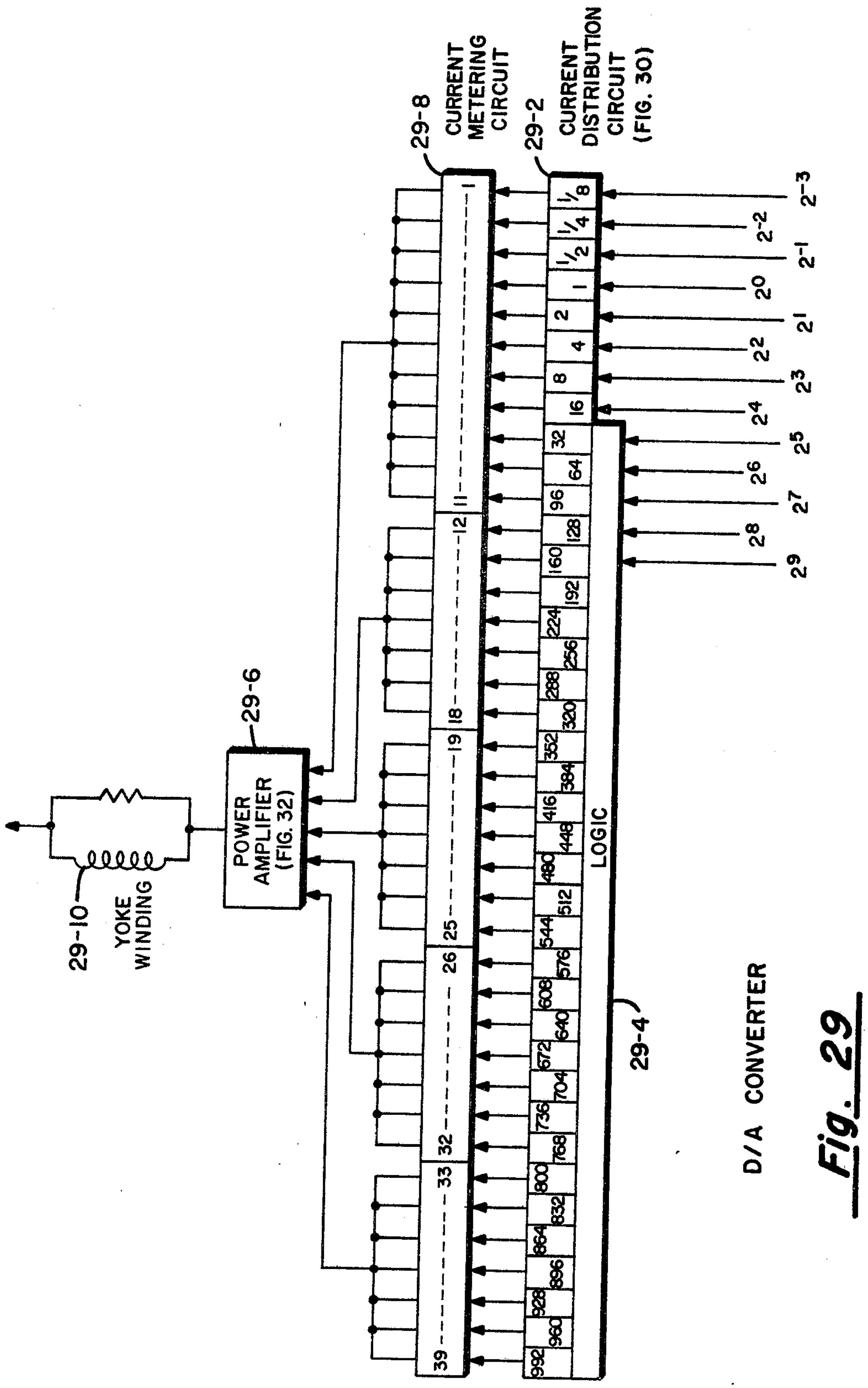
Figure 30:
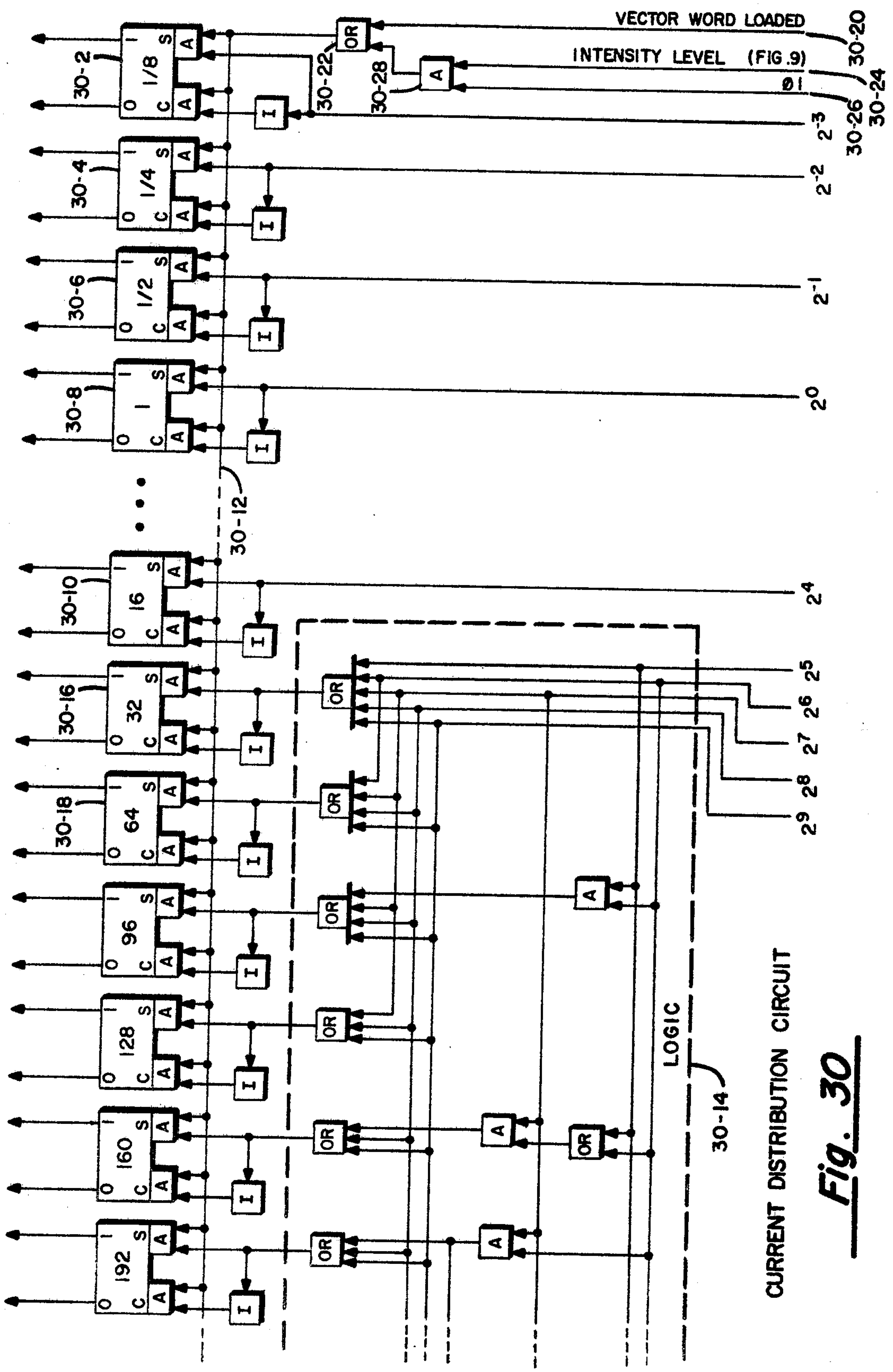
Figure 32:
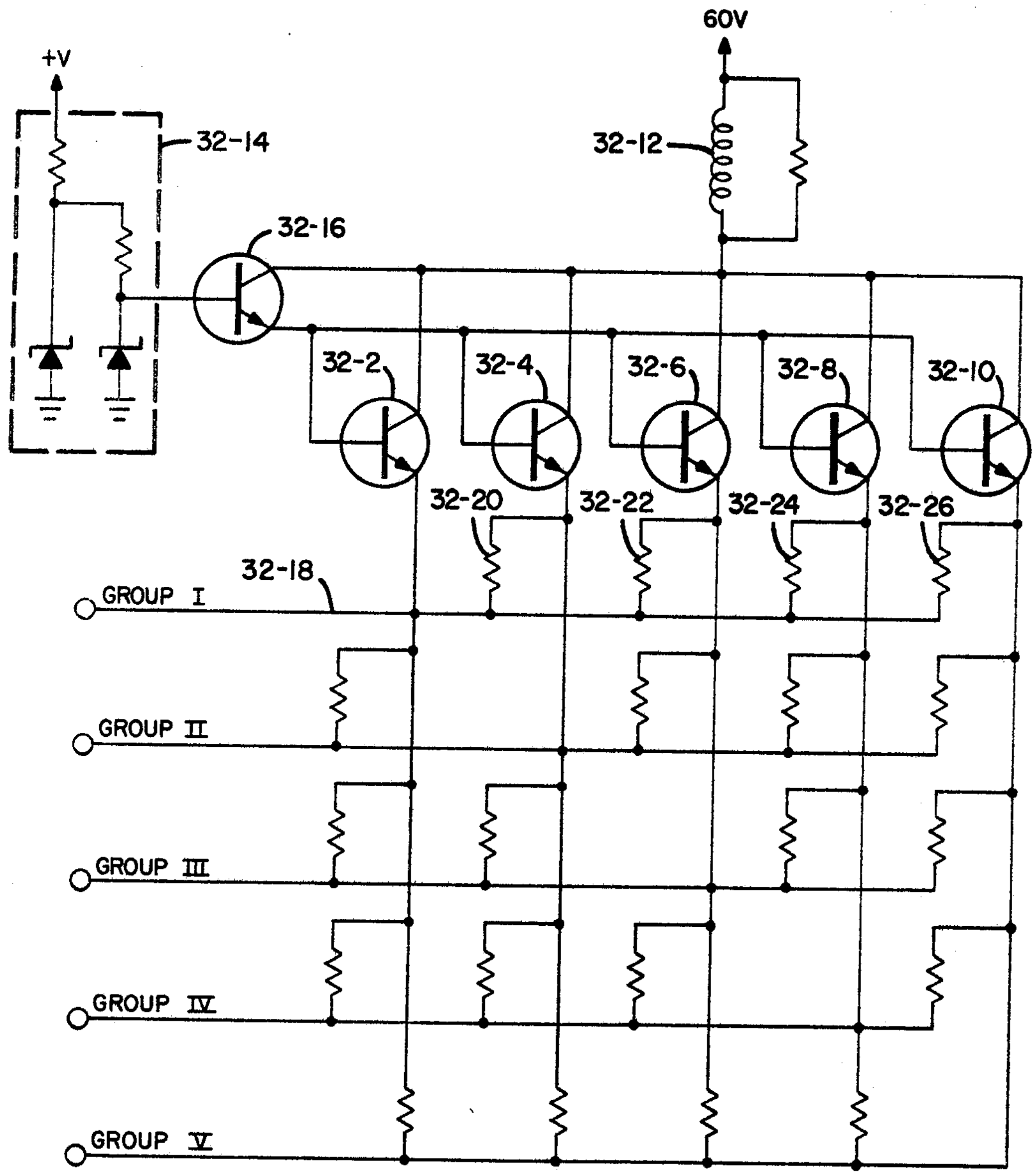
Figures 33, 34, 35:
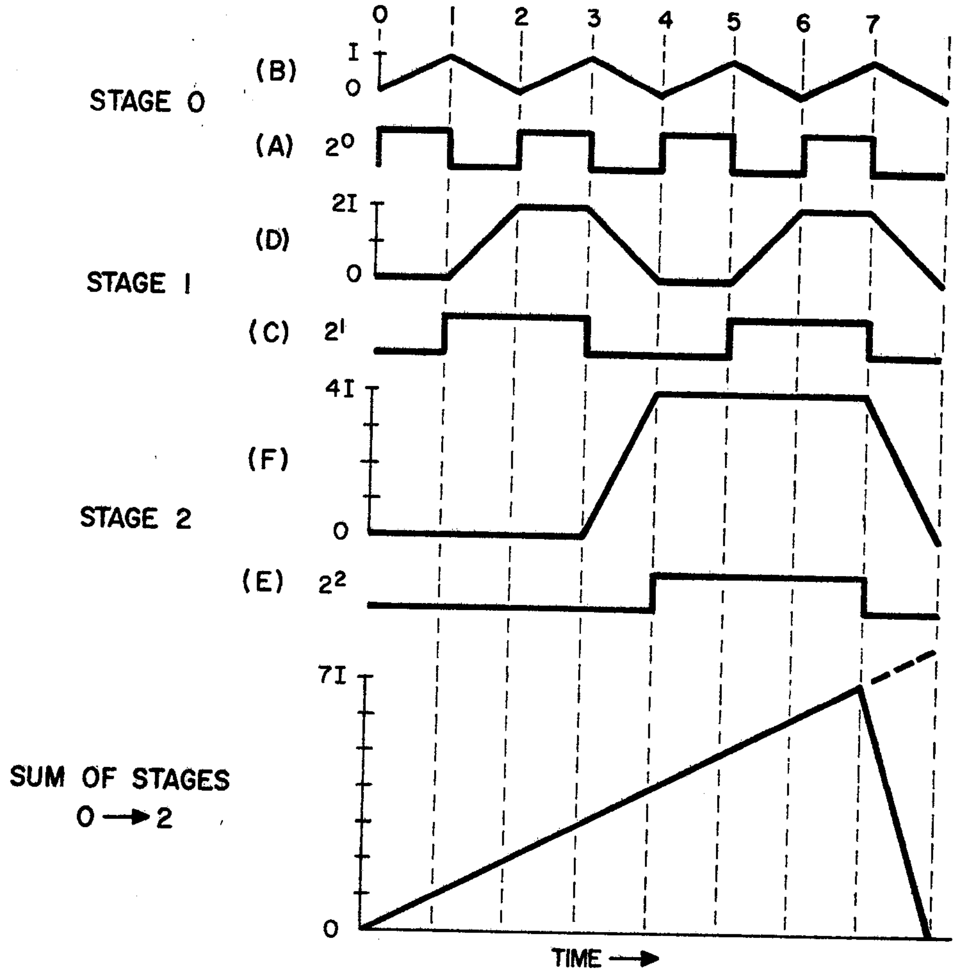
Figure 36:
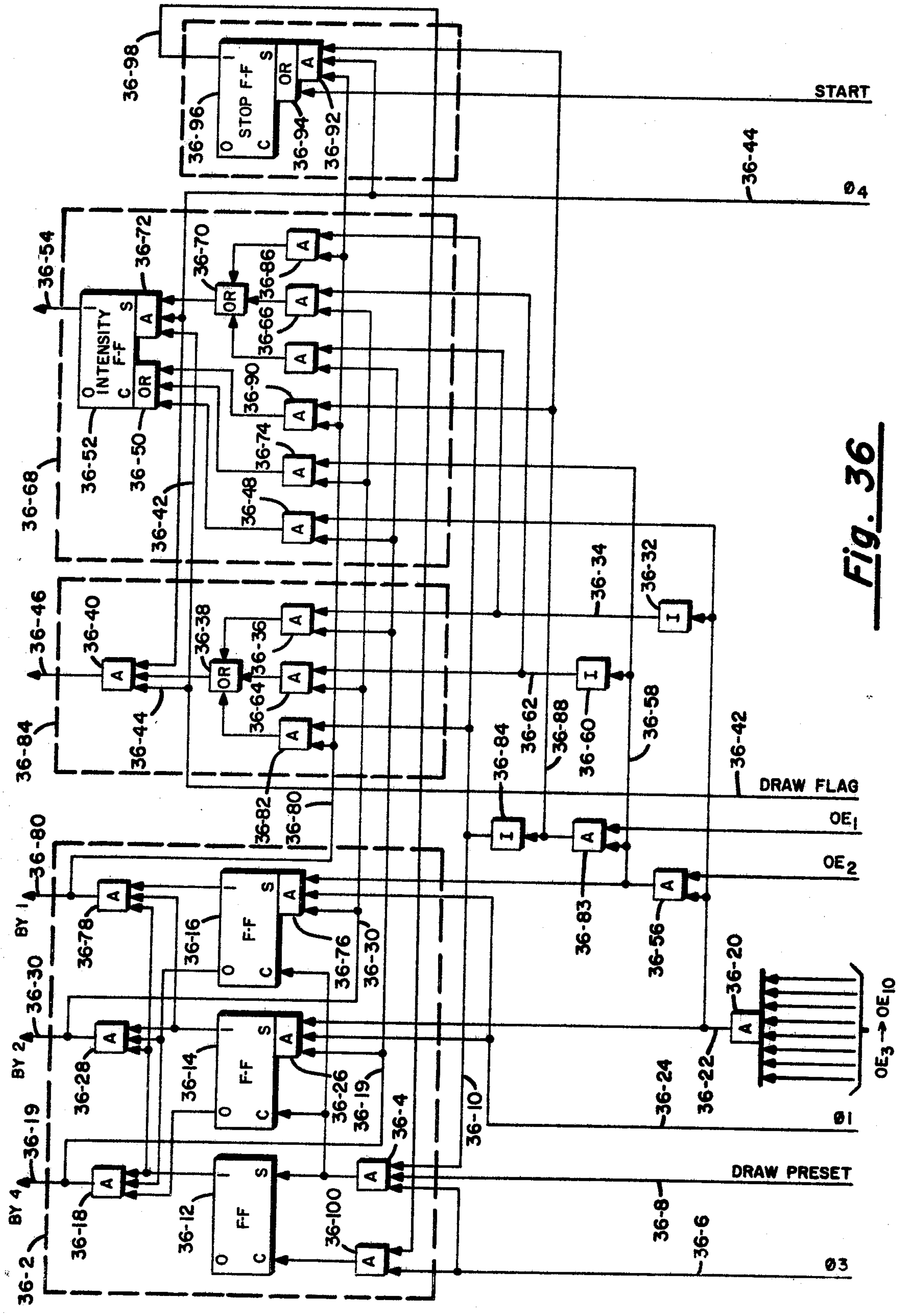

FIG. 19 ilustrates the Tangent-Cotangent or T-register;

FIG. 20 illustrates the Subtractive Type Adder;

FIG. 21 illustrates the connection between the T-register and the Subtractive Type Adder;

FIG. 22 illustrates the connections between the stages of the X or Y register and the Subtractive Type Adder;

FIG. 23 is a timing chart of the operation of the Vector Generator;

FIG. 24 illustrates how the contents of the X and Y registers change in an example where the Tangent and Final Position of the vector are given;

FIG. 25 illustrates the beam blanking control circuits;

FIG. 26 illustrates the four different types of vectors that may be drawn with the preferred embodiment of the invention;

FIG. 27 is a table illustrating the beam intensity level for the particular angle at which the vector is to be drawn;

FIG. 28 illustrates the beam intensity circuit;

FIG. 29 illustrates generally the digital-to-analog converter;

FIG. 30 illustrates the current distribution circuit that forms part of the digital-to-analog converter;

FIG. 31 is a table showing the equations for the connections to various stages of the current distribution circuit;

FIG. 32 illustrates the power amplifier portion of the digital-to-analog converter;

FIG. 33 illustrates the waveforms produced by various stages of the current metering portion of the digital-to-analog converter;

FIG. 34 is a table showing for each octant which register is to be the main position register, whether it will be incremental or decremental, which register shall store the tangent or cotangent and whether it will be incremented or decremented;

FIG. 35 is a truth table for an exclusive OR circuit;

FIG. 36 shows a second embodiment of the speed shift sensory circuit; and

Figure 37:
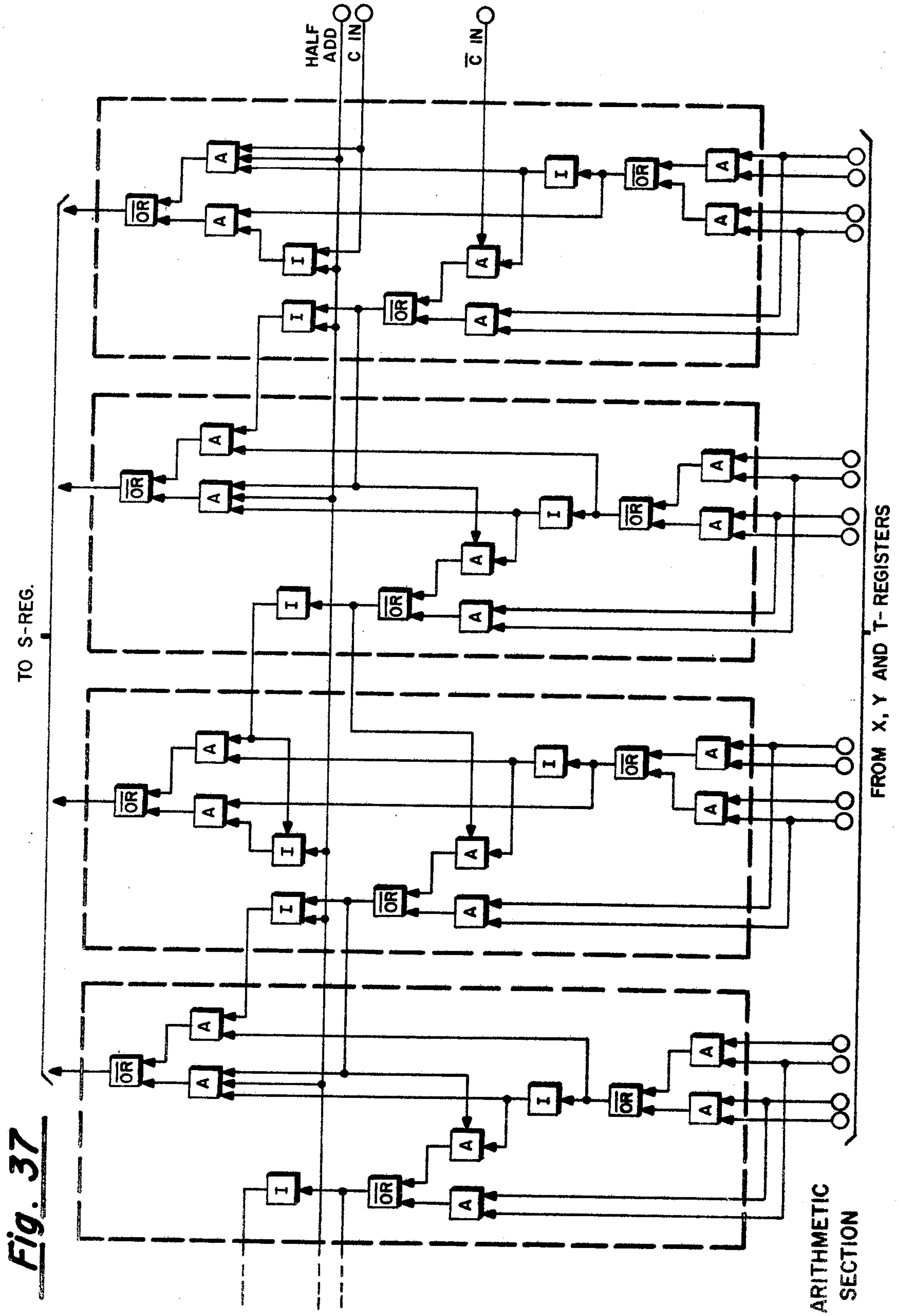

FIG. 37 shows the arithmetic section of a well known subtractive type adder.

INTRODUCTION

The digital vector generator is a high speed geometric line drawing device capable of producing 200,000 inches of geometric lines per second on the face of the cathode ray tube. The display viewing area is a square X inches on a side. The square contains a 1024 by 1024 point position matrix. The distance between successive horizontally or vertically adjacent points is $X/1023$ units. The coordinate system for the display viewing area is in rectangular Cartesian coordinates with the origin for the coordinate system at the lower left corner of the display viewing area. Values for the X-axis are specified along the horizontal axis and values for the Y-axis are specified along the vertical axis. The origin corresponds to the values $X=0$, $Y=0$. X is positive along the horizontal axis and has a maximum value at the right edge of the display viewing area of $1023_{10}$. This value of X represents a row of 1034 major position points horizontally on the 1024 by 1024 point position matrix. Correspondingly, Y is positive along the vertical axis and has a maximum value at the upper edge of the viewing area of $1023_{10}$. This value of Y represents a column of 1024 major position points vertically on the 1024 by 1024 point position matrix. Thus the display area of the cathode ray tube is conceptually divided into a 1024 by 1024 matrix defining unit squares. On a 22 inch screen, these squares are approximately .016 inch on a side. The unit square is the base from which all vectors are generated. Within each unit square is an 8 by 8 minor position point matrix. A vector may be terminated at any of the minor position points.

Figure 1:
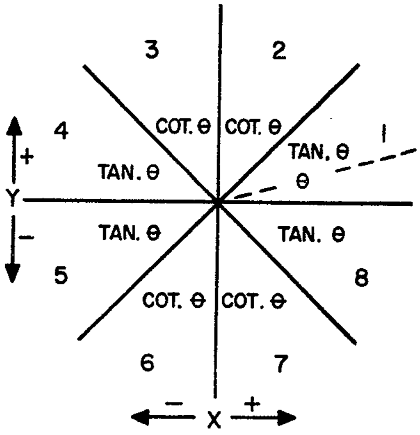
FIG. 1 shows the octants in which the tangent or cotangent must be used to draw a vector.

Applicants' approach to vector generation involves the use of maximum pre-processing in the associated computer with resulting economies in the display unit itself. Thus, a vector can be described by an origin (X and Y), tangenet or cotangent, and an end point (X or Y). These parameters are calculated and supplied by the computer to the vector generator. This scheme ensures that the angular coefficient of the vector never exceeds the value of 1. An octant system is used to draw the vectors. FIG. 1 shows that the cotangent of X is used in octants 2, 3, 6 and 7 while the tangent of X is used in octants 1, 4, 5 and 8.

To generate the correct angle at which the vector must be drawn from X (or Y) axis the amount of deflection current which represents unit beam displacement along the X (or Y) axis is multipled by the (fractional or unit value) angular coefficient representing the tangent or cotangent before application to the Y (or X) deflection coil. This permits the construction of a vector segment or stroke by moving one unit along one axis, while moving the tangent or cotangent amount along the other axis. Thus, it can be said that the vector has a first component along a first axis and a second component along a second axis at right angles to the first. The vector generator then comprises first means tending to move said beam along said first axis in unit increments and second means coupled to said first means for simultaneously tending to move said beam along said second axis by the tangent or cotangent, an amount equal to the ratio of said second component to said first component, times said unit increment.

Figure 2A:
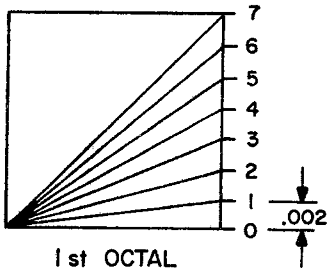
FIG. 2 shows how individual ones of unit squares formed by major position points may be divided into eight minor position points per side by use of the three most significant bits of the T-register.
Figure 2B:
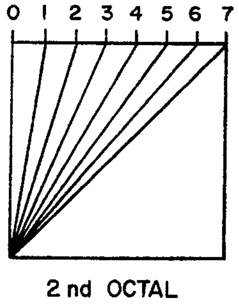
Figure 2C:
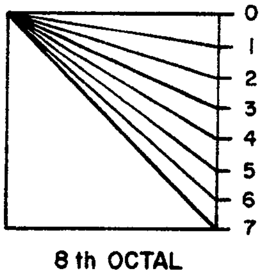

As shown in FIG. 2, the unit square may be divided into 8 divisions or minor position points per side defining 8 possible strokes in each of the unit squares. This would require 3 extra bits if 10 bits are used to define the 1023 major position point matrix. These 3 bits which define the 8 possible minor position points in each of the unit squares are the three most significant bits of the target or cotangent register and approximate the desired tangent or cotangent. Seven more bits are carried for accuracy. Because only 8 different slopes within unit square are generated in the prefered embodiment of the present invention, corrections are necessary every few units of deflection to eliminate the error caused by the approximations. However, on a 22 inch screen, the maximum correction for any single stroke is only .002 inch or the length of one side of the unit square (.016) divided by 8. Digital techniques are used to save the seven low order (accuracy) bits so that the errors will not be cumulative. The error on a vector of full screen deflection would be a maximum of .001 inch in this case, .002/2.

Thus, two identical 20-bit registers, one for X and one for Y, are used to specify points on the display viewing area. The uppermost 10 stages of each register ($X_u$ and $Y_u$) are used to specify points on the 1024 by 1024 major point position matrix. The lower 10 stages ($X_L$ and $Y_L$) of each register are used to specify an abstract 1024 by 1024 minor point position matrix within each of the 1023 by 1023 squares formed by the points of the 1024 by 1024 major point position matrix produced by the 10 uppermost stages. However, as stated above only the three most significant stages of the lower 10 stages of each register are used to actually define an 8 by 8 minor point position matrix within each of the 1023 by 1023 squares. As stated previously, the 7 remaining stages of the lower 10 stages carry accuracy bits. While 20-bit registers are specified here, it is obvious that a register storing $m$ bits including $x$ major position bits, $y$ minor position bits and $z$ accuracy bits could be used.

Figure 3A:
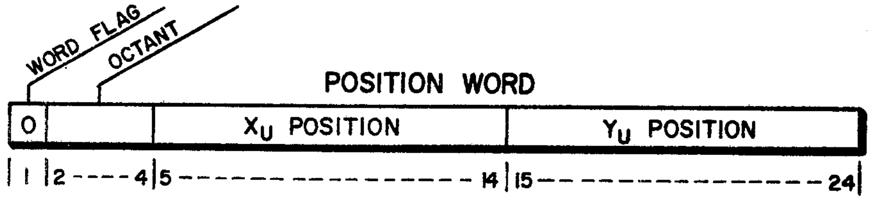
FIG. 3 shows the format of the 24-bit Position Word and the Vector Word.
Figure 3B:
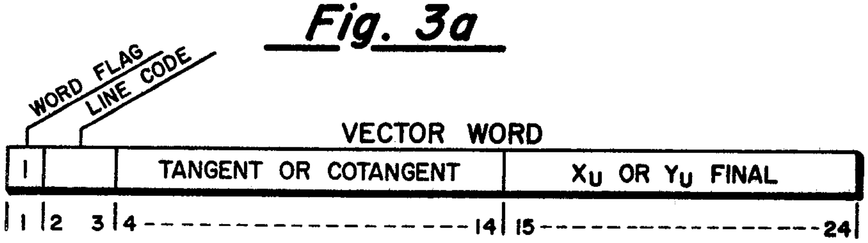

A 24-bit Input Data or Buffer Register is utilized to receive the data words from the associated computer. It stores these words while they are decoded and distributes the data to the appropriate specialized circuits depending upon whether the word is a Vector Word or a Position Word. FIG. 3 shows the two words which are transmitted by the computer to the Input Data or Buffer Register. The Position Word shown in FIG. 3*a* includes 20-bits representing the 10 upper most stages, $X_u$ and $Y_u$, of the X and Y register. It also includes 3-bits which specify the octant in which the vector is to be drawn. Finally, it includes one-bit which is designated a Word Flag which is used to distinguish between a Position Word and a Vector Word, and therefore, to gate the other 23-bits into the appropriate registers. In FIG. 3*b*, the Vector Word is shown and includes 10-bits representing the final X or Y position of the beam, 11-bits which represents either a tangent or a cotangent value, 2-bits representing a Line Code which designates which one of four types of lines will be used in drawing the vector and one-bit which again is designated a Word Flag and is used to gate the other 23-bits into the appropriate registers. It will be understood that if several vectors of various lengths are to be connected end-to-end so as to form either one long straight vector or a many angled figure, only the initial X and Y values and the end-point for the first vector need to be transmitted by the computer since, upon completion of each vector, the new X and Y points (the old end-points X, Y) are already available for that point which is actually the beginning X and Y for the next vector. Thus, only the octant code would need to be transmitted by the computer to the vector generator. Again, while 10 bits are used herein to designate final beam position, it is obvious that a register producing data words $x$ bits in length could be used.

To illustrate the above description, the generation of a sample vector is described below. Assume a vector in the first octant is desired and that it will be several units long. See FIG. 4. Assume that initial X and Y origin to be 0 for simplicity although any other beginning point would work identically. The data given by the first word (Position Word) from the computer for this vector would be $X=0$ and $Y=0$, with the 3-bits representing the octant designating octant 1, i.e. X is positive, Y is positive and the tangent will be used. Also, the proper Word Flag would be present to gate these data into the appropriate registers. The Vector Word from the computer follows the Position Word and will contain information representing the final X position of the vector, the tangent of the angle at which the vector will be drawn, a Line Code to indicate the type of vector to be drawn and a Word Flag to gate these data into the appropriate registers. Assume that the tangent in this example is $.223_8$. In this example, each stroke of the electron beam will tend to move along the X-axis by a unit amount. Thus, the initial X value represented by the upper 10-bits of the X-register, $X_u$, will be incremented by one unit while the lower 10-bits, $X_L$, will be all zeros. For each stroke of the beam along the X-axis, the tangent portion of the Y-register, $Y_L$ will be incremented by the amount $.223_8$. However, only the most significant octal digit (representing the three most significant binary bits) of the tangent is actually used at any instant in drawing the vector. Thus, only $.2_8$ is used. As will be seen in the table of FIG. 4 the increment will be $.2_8$ for the first three segments and an overflow of the accuracy bits from the seven lower order stages of the tangent register will cause an increment of $.3_8$ on the fourth segment. The increment then returns to $.2_8$ until there is another overflow from the lower order stages. Thus, by retaining the accuracy bits in the lower order stages, the display vector will always remain within $.1_8$ units or .002 inch. Since the overflow increments are so small, the digital corrections are beyond the level of perception and the vector is extended unit-by-unit until the end X value is reached.

To speed the production of long vectors, the logic associated with producing the deflection current automatically moves the beam a unit at a time until the remaining units can be stepped in unit lengths of 4, 8, 16 or more as desired. Also, the vector may be caused to slow down in steps as the end point is approached. This was not shown in FIG. 4 in order to simplify the explanation but will be explained later in the specification. However, by this means, a writing rate faster than 200,000 inches per second is obtained and ringing is prevented at the end points by the slow-down operation.

GENERAL OPERATION

Figure 5:
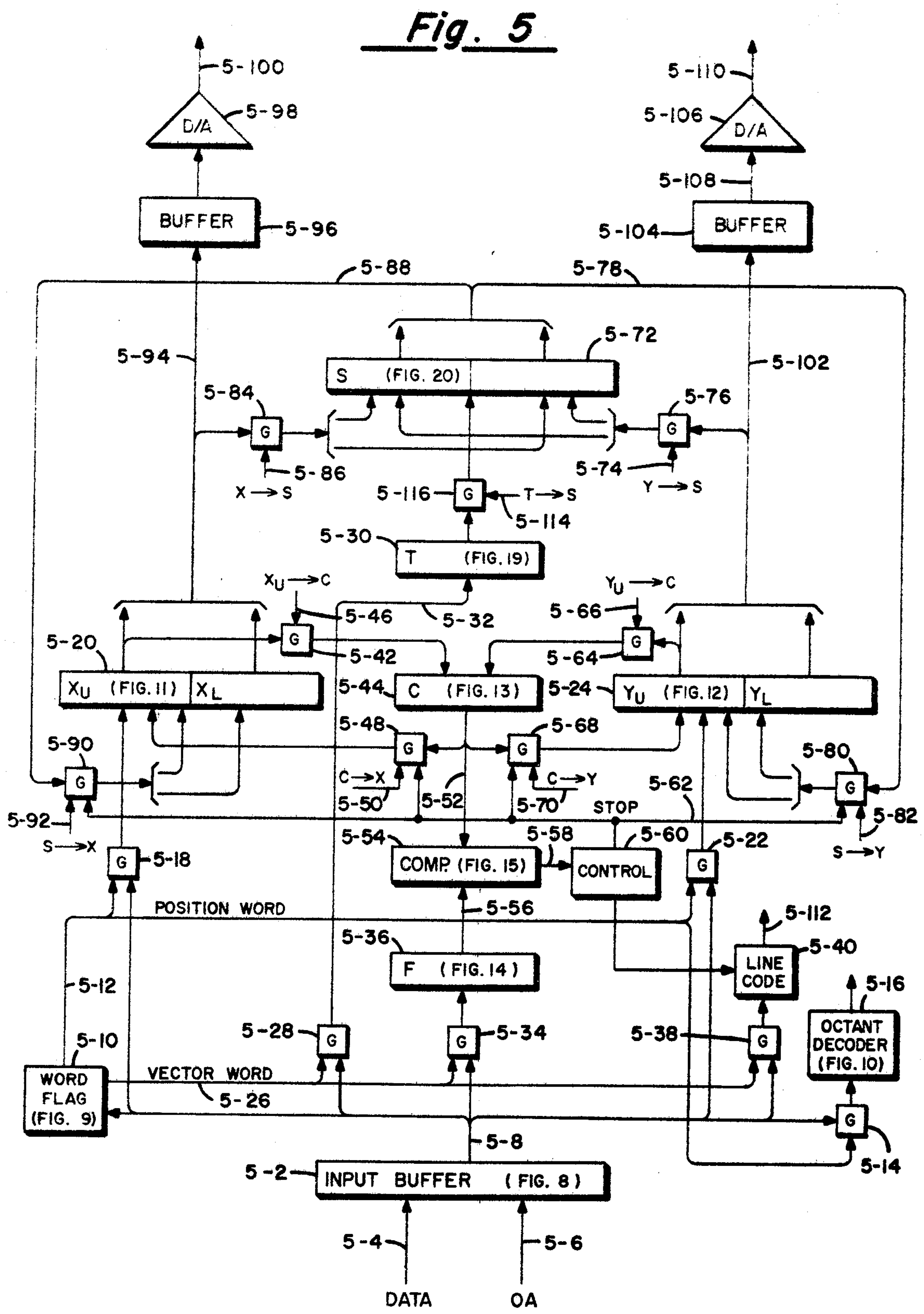
FIG. 5 shows a system diagram of the digital vector generator.

FIG. 5 is a system diagram of the digital Vector Generator. Input Data or Buffer Register 5–2 accepts data from the computer on line 5–4 when an Output Acknowledge signal is presented by the computer on line 5–6. The I/O circuits which cause the Output Acknowledge signal to be produced are conventional and well-known as described in commonly assigned copending patent application Ser. No. 436,174, filed Mar. 1, 1965, and will not be described here. The Position Word is the first word received by Input Register 5–2 and the first bit of the Position Word, which is the Word Flag, is coupled by conductor 5–8 to Word Flag circuit 5–10. The Word Flag representing the Position Word is a binary 0 and when present on conductor 5–8 causes the Word Flag circuit 5–10 to produce an output on line 5–12 which is used as a gating signal. This signal opens gate 5–14 to allow bits 2–4 to be coupled to the Octant Decoder 5–16 which determines whether X and Y will be positive or negative and whether the tangent or cotangent is to be used. It also opens gate 5–18 which allows initial position bits 5 through 14 to be coupled to the upper 10 flip-flops, $X_u$, of the X-register 5–20. It also opens gate 5–22 to enable bits 15–24 to be coupled to the upper 10 flip-flops, $Y_u$, of the Y-register 5–24. Thus the Position Word includes a Word Flag bit which causes the bits representing the desired octant as well as those representing the desired initial X and Y positions to be stored in the appropriate registers.

The second word to be received from the computer by the Input Buffer Register 5–2, the Vector Word, includes in the first position a Word Flag bit which is a binary 1. This bit, when coupled to the Word Flag circuit 5–10, causes an output to be produced on line 5–26 which gates the remainder of the Vector Word to the appropriate registers. Thus, it opens gate 5–28 to enable the 11 bits representing the tangent or cotangent to be stored in the tangent register 5–30 via line 5–32. It also opens gate 5–34 to enable the 10-bit word representing the final position or end position of the vector to be stored in F-register 5–36. Finally, it opens gate 5–38 to enable bits 2 and 3 which represent the type of vector to be drawn to be stored in Line Code circuit 5–40.

When both the Position Word and the Vector Word have been received and the information stored in the appropriate registers, inputs from the computer are no longer needed and the generation of the vector begins. As can be seen from referring to FIG. 1 and Table I shown in FIG. 34, four items must be determined before a vector can be drawn in any octant. First, it must be determined whether the X-register or the Y-register will be the main position register. Second, it must be determined whether or not the contents of that register are to be incremented or decremented (algebraically incremented). Third, it must be determined whether the X-register or the Y-register is to be used as the tangent or cotangent register. Finally, it must be determined whether or not the data stored in the tangent or cotangent register must be incremented or decremented (algebraically incremented). As can be seen in Table I in FIG. 34, in octant 1 the X-register will serve as the main position register and will be incremented to cause the beam to move to the right. At the same time the Y-register will serve as the tangent register and will be incremented to cause the beam to move up. In like manner, in octants 2, 7 and 8 the X-register will be incremented while in octants 3, 4, 5 and 6 the X-register will be decremented. Also, in octants 1, 2, 3 and 4 the Y-register will be incremented while in octants 5, 6, 7 and 8 the Y-register will be decremented. Further, in octants 1, 4, 5 and 8 the X-register will be used as the main position register while it will be used to store the initial X-position plus multiples of the cotangent in octants 2, 3, 6 and 7. In a like manner, the Y-register will be used as the main position register in octants 2, 3, 6 and 7 while it will be used to store the initial Y-position plus multiples of the tangent in octants 1, 4, 5 and 8. The octant decoder 5–16 will therefore produce appropriate signals to cause the appropriate register to be algebraically incremented.

Assume that a vector is to be drawn in octant 1 and that the initial position of the vector origin has been loaded into the $X_u$ and $Y_u$ portions of registers 5–20 and 5–24 respectively. Thus, the X-register is the main position register with the Y-register storing the initial Y-position that is to be incremented by the tangent of the angle at which the vector is to be drawn. Further, the contents of both registers are to be incremented simultaneously. With clock pulses, the output of the upper portion, $X_u$, of X-register 5–20 is coupled through gate 5–42 to counter 5–44. Gate 5–42 is opened by a gating signal $X_u \rightarrow C$ on line 5–46 which is produced by Octant Decoder 5–16. C-register 5–44 automatically increments the received data by one unit and couples it through gate 5–48 back to the upper 10 stages, $X_u$, of X-register 5–20 whenever a signal $C \rightarrow X$ appears on line 5–50 to gate 5–48. This signal on line 5–50 is also produced by Octant Decoder 5–16. Thus, by utilizing proper timing, the contents of the X-register is continually gated into the C-register 5–44 where it is incremented and returned to the upper portion, $X_u$, of the X-register. It will be noted that the output of the C-register 5–44 on line 5–52 is also coupled to Comparator 5–54. The other input to Comparator 5–54 on line 5–56 is from the Final Position Register 5–36. Thus, whenever the contents of the C-register is equal to the contents of the F-register 5–36, Comparator 5–54 produces an output on line 5–58 which causes Control Unit 5–60 to produce a STOP signal on line 5–62 which is coupled to gate 5–48 which prevents gate 5–48 from returning the output of the Counter to the X-register. Thus, the contents of the X-register will also be equal to the value stored in the F-register and the beam will have reached the end point as determined by the computer. It will be noted that had it been desired to draw the vector in octants 2, 3, 6 or 7, the Y-register 5–24 would have been the main register and it would have been incremented or decremented in a manner similar to that described for X-register 5–20. Thus, at the appropriate time, the output of the upper portion, $Y_u$, of the Y-register 5–24, would have been coupled through AND gate 5–64 due to the presence of the gating signal $Y_u \rightarrow C$ on line 5–66 which was produced by Octant Decoder 5–16. The output of gate 5–64 is coupled to Counter 5–44 where the data would be incremented by 1 and returned to the upper portion $Y_u$, of Y-register 5–24 when gate 5–68 was opened by the signal $C \rightarrow Y$ on line 5–70. Again, this cycle would continue until such time as the data stored in the Counter 5–44 (or the upper 10-bits, $Y_u$, of the Y-register 24) would be equal to the data stored in the Final Position Register 5–36. At which time, Comparator 5–54 would produce an output on line 5–58 which would cause Control Unit 5–60 to produce a STOP signal on line 5–62 which, when coupled to gate 5–68, would prevent the output of the Counter 5–44 from being returned to the upper 10 stages, $Y_u$, of the Y-register 5–24. It is in this manner then that the upper 10 stages of the X or Y register are incremented or decremented when either of these registers is being used as the main register.

Returning now to the example of a vector being drawn in the first octant, with the X-register as the main register whose contents are being incremented through the Counter 5–44, the Y-register 5–24, both the upper 10 stages and the lower 10 stages, will be used to provide data which represents the Y-position of the vector origin incremented by multiples of the tangent of the angle at which the vector is to be drawn. In this example, each time the contents of the X-register is incremented by 1, a unit increment, the contents of the Y-register is also to be incremented by the data stored in the tangent register which represents the tangent of the angle at which the vector is drawn. This is accomplished by gating the contents of the Y-register and the T-register into the Subtractive Type Adder 5–72. Thus, when Octant Decoder 5–16 produces a signal, $Y \rightarrow S$, on line 5–74 to gate 5–76, the output of the Y-register is gated into the Subtractive Type Adder 5–72. Also, Octant Decoder 5–16 simultaneously produces a signal, $T \rightarrow S$, on line 5–114 to gate 5–116 which gates the data stored in the T-register 5–30 into the Subtractive Type Adder 5–72. The output of the Subtractive Type Adder on line 5–78 is coupled back to the Y-register through gate 5–80 whenever Octant Decoder 5–16 produces a signal, $S \rightarrow Y$, on line 5–82. This cycle then is repeated simultaneously with the incrementing of the X-register and continues until such time as Comparator 5–54 produces a STOP signal on line 5–62 which is also coupled to gate 5–80 and prevents the output of the Adder from being gated back into the Y-register.

In a like manner, if octant 2, 3, 6 or 7 is chosen for drawing the vector, then as stated previously, the Y-register will become the main position register and the X-register will become the cotangent register. This means that the X-register must be incremented by the value of the cotangent through the Subtractive Type Adder in the same manner as the Y-register as previously described. Thus, the output of the X-register, both upper and lower portions, would be coupled through AND gate 5–84 to the Subtractive Type Adder 5–72 whenever Octant Decoder 5–16 produces a signal $X \rightarrow S$ on line 5–86. The output of the T-register would be added to or subtracted from this value stored in the X-register. The output of the Subtractive Type Adder on line 5–88 would then be coupled back to the X-register through gate 5–90 whenever Octant Decoder 5–16 produces a signal, $S \rightarrow X$, on line 5–92. This cycle would also continue simultaneously with the incrementing of the Y-register until such time as the Comparator produces a signal on line 5–58 which would cause a STOP signal on line 5–62 which would be coupled to gate 5–90 and which would prevent the output from the Subtractive Type Adder on line 5–88 from being returned to the X-register.

Returning again to our example wherein a vector is to be drawn into octant 1, at the time the Comparator causes an output signal to be produced which causes the vector drawing cycle to stop, the X-register contains the final position of the beam on the X-axis while the Y-register contains the final tangent position of the beam on the Y-axis. The output of the X-register is coupled via line 5–94 to a buffer register 5–96 the output of which is connected directly to the digital-to-analog converter 5–98. The buffer register 5–96 is actually a part of the digital-to-analog circuitry and in FIG. 29 is shown as register 29–2 which is denoted as the Current Distribution Circuit. It is shown separate in FIG. 5 for ease of illustration. The output of the digital-to-analog converter on line 5–100 is connected directly to the X-deflection coil of the cathode ray tube. The purpose of buffer register 5–96 is to control the manner in which the digital-to-analog conversion is effected in order that excessive increments of current are not applied to the transistors in the *D/A* converter. In a like manner, the output of the Y-register on line 5–102 is coupled to buffer register 5–104. Digital-to-analog converter 5–106 receives the output of buffer 5–104 on line 5–108 and produces an output on line 5–110 which is coupled directly to the Y-deflection coil of the cathode ray tube. For ease of illustration, the signals for gating the data into the buffer registers are not shown. The *D/A* converters, however, continually produce an output depending upon the value stored in the X and Y registers. This means that the beam is drawn continually as long as the intensity is activated by the output of Line Code circuit 5–40 on line 5–112.

As explained previously, each time the output of the X or Y register respectively is coupled to the Subtractive Type Adder, it is algebraically added to the tangent or cotangent, as the case may be, that is stored in the T-register 5–30. Thus, each time Octant Decoder 5–16 produces an output signal T→S on line 5–114, gate 5–116 opens and couples the output of the T-register to the Subtractive Type Adder where it is either added to or subtracted from either the contents of the X-register or the contents of the Y-register whichever is being gated into the Subtractive Type Adder.

Thus, in summary it will be seen that whichever of the X and Y registers is chosen as the main register, its contents are automatically incremented by 1 through the C-register 5–44. Simultaneously, and in a like manner, the output of the other register is coupled to the Subtractive Type Adder where it is added to or subtracted from the tangent or cotangent and returned to the appropriate register.

Thus, the vector generator causes the electron beam to draw a vector of any length and at any angle on the face of the cathode ray tube with the vector having a first component along the X or Y axis and a second component along the Y or X axis respectively. The X-register (or Y-register), the Counter and the related timing circuits, therefore, tend to move the beam along the X-axis (or Y-axis) in unit increments while the Y-register (or X-register), the T-register and the Adder are connected to the timing circuits for simultaneously tending to move the beam along the Y-axis (or X-axis) by an amount equal to the ratio of the second component to the first component times the unit increment.

SYSTEM DETAILS.—CLOCK GENERATOR

Figure 6:
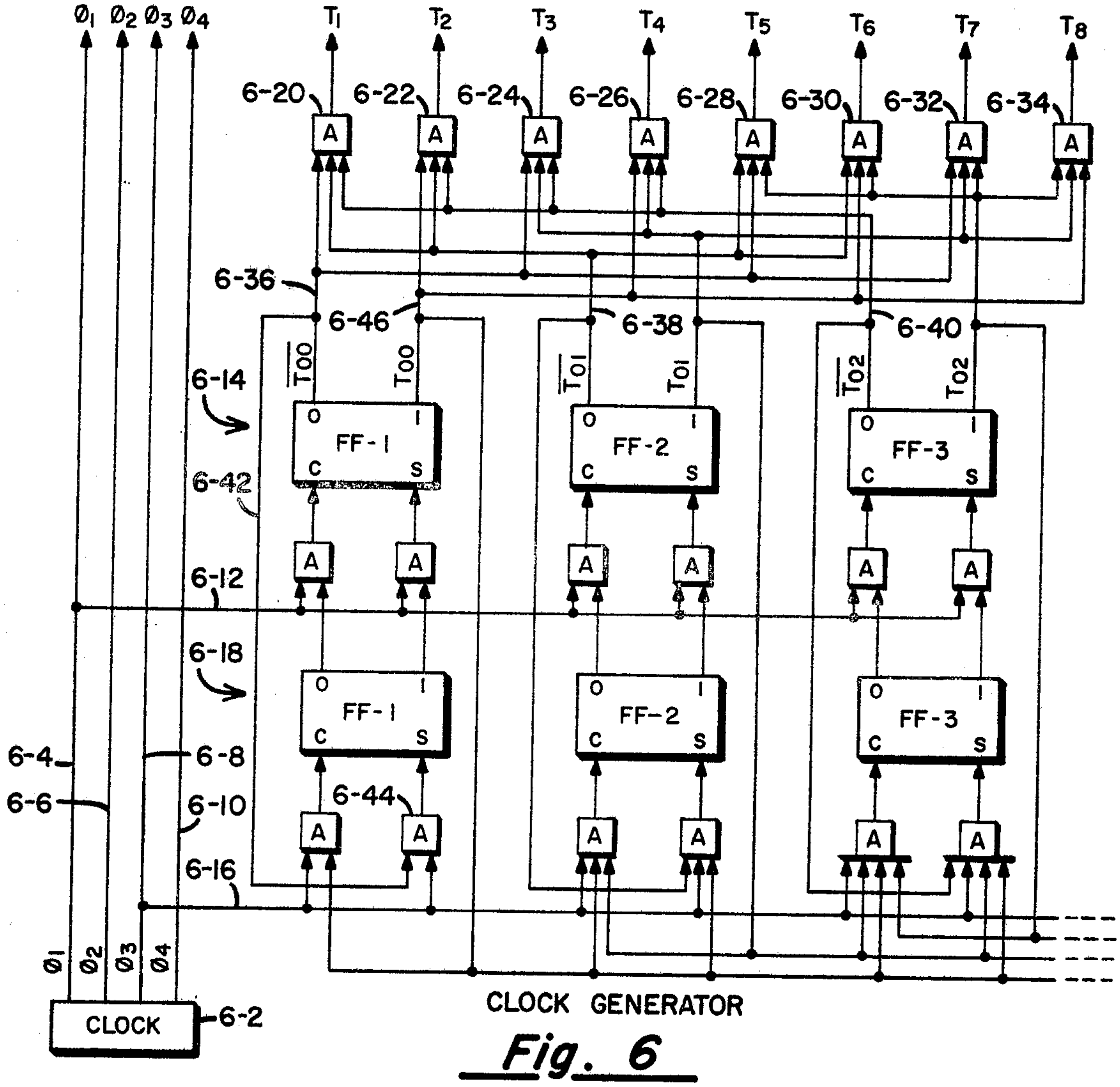
FIG. 6 is a diagram of the clock pulse generator.

The digital vector generator may be operated either synchronously or asychronously. In any event the operations of the unit must be timed and FIG. 6 discloses the circuitry of a clock generator which will produce the necessary timing pulses for the operation of the vector generator. Clock unit 6–2 represents any well-known timing unit which will produce four output phases each 75 nanoseconds in width. Thus, $\phi_1$–$\phi_4$ appear on lines 6–4 through 6–10 respectively. Phase 1 of the clock pulses on line 6–12 is coupled through AND gates to both the CLEAR and the SET side of each of the flip-flops in row 6–14. In a like manner, $\phi_3$ is coupled via line 16 through a plurality of AND gates to both the SET and CLEAR side of each of the flip-flops in row 6–18. Whenever $\phi_1$ appears on line 6–12, flip-flops 1 through 3 of row 6-14 cause one of AND gates 6–20 through 6–34 to produce a 300 nanosecond output signal. Whenever $\phi_3$ appears on line 6–16, flip-flops 1 through 3 of row 6–18 and their associated AND gates increment the data stored in flip-flops 1 through 3 of row 6–14 by one unit and store the incremented value. Thus, for example, if the flip-flops of row 6–14 are all CLEARED on $\phi_1$, on $\phi_3$, flip-flop 1 of row 6–18 is SET with flip-flops 2 and 3 being CLEARED. This can be seen by considering the details of FIG. 6. If all of the flip-flops in row 6–14 are in the CLEARED state, then signals representing a binary 1 will be found on conductors 6–36, 6–38 and 6–40. These three signals are connected to AND gate 6–20 and cause an output pulse, $T_1$, to be produced. The signal on line 6–36 is also coupled via conductor 6-42 to AND gate 6–44 where, when the $\phi_3$ signal is present on line 6–16, AND gate 6–44 produces an output which SETS flip-flop 1 of row 6–18. Thus, it can be seen that the flip-flops in row 6–18 have incremented by 1 the data stored in the flip-flops of row 6–14. On the next $\phi_1$ pulse on line 6–12, the information stored in the flip-flops of row 6–18 is transferred to corresponding flip-flops in row 6–14. This means, then, that flip-flop 1 of row 6-14 will produce an output on line 6–46. This pulse as well as the pulses from flip-flops 2 and 3 in row 6–14 on lines 6–38 and 6–40 respectively are all coupled to AND gate 6–22 which produces and output pulse $T_2$. This cycle continues with each of the AND gates 6–20 through 6–34 sequentially producing an output signal on $\phi_1$ while on $\phi_3$ the information stored in the row of flip-flops 6–14 is incremented and stored in row 6–18. While FIG. 6 shows only 3 flip-flops in each row which therefore produce a possibility of 8 different pulses at AND gates 6–20 through 6–34, it is obvious that more flip-flops may be added in each row as needed to produce as many output pulses as desired for proper timing, as required by the associated computer. The eight different pulses $T_1$–$T_8$ are not used in the explanation of the invention disclosed herein. In actual practice, however, they enable the vector generator to be interfaced with any computer.

CLOCK TIMING CHART

Figure 7:
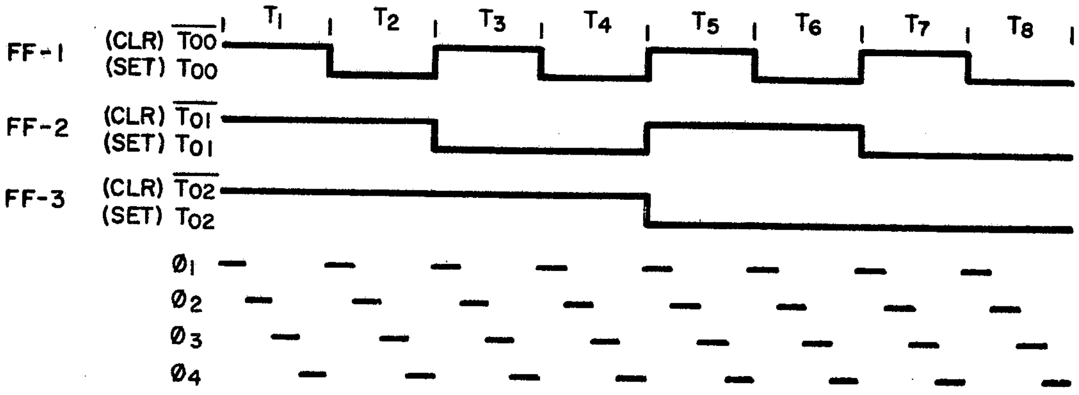
FIG. 7 is a timing chart of the clock pulses produced by the clock pulse generator.

FIG. 7 is a timing chart showing the relationship of the output pulses $T_1$–$T_8$ to the true and complement outputs of the flip-flops 1 through 3 in row 6–14 and the four phases produced by clock 6–2. It will be seen that to produce output pulse $T_1$, flip-flops 1, 2 and 3 must be in the CLEAR state. $\phi_1$ must also be present to cause output pulse $T_1$ to be initially produced. It will be noted that on the second $\phi_1$ pulse, flop-flop 1 is SET while flip-flops 2 and 3 remain in the CLEAR state thus causing output pulse $T_2$ to be produced. In a like manner, pulses $T_3$ through $T_8$ are produced.

INPUT DATA REGISTER

Figure 8:
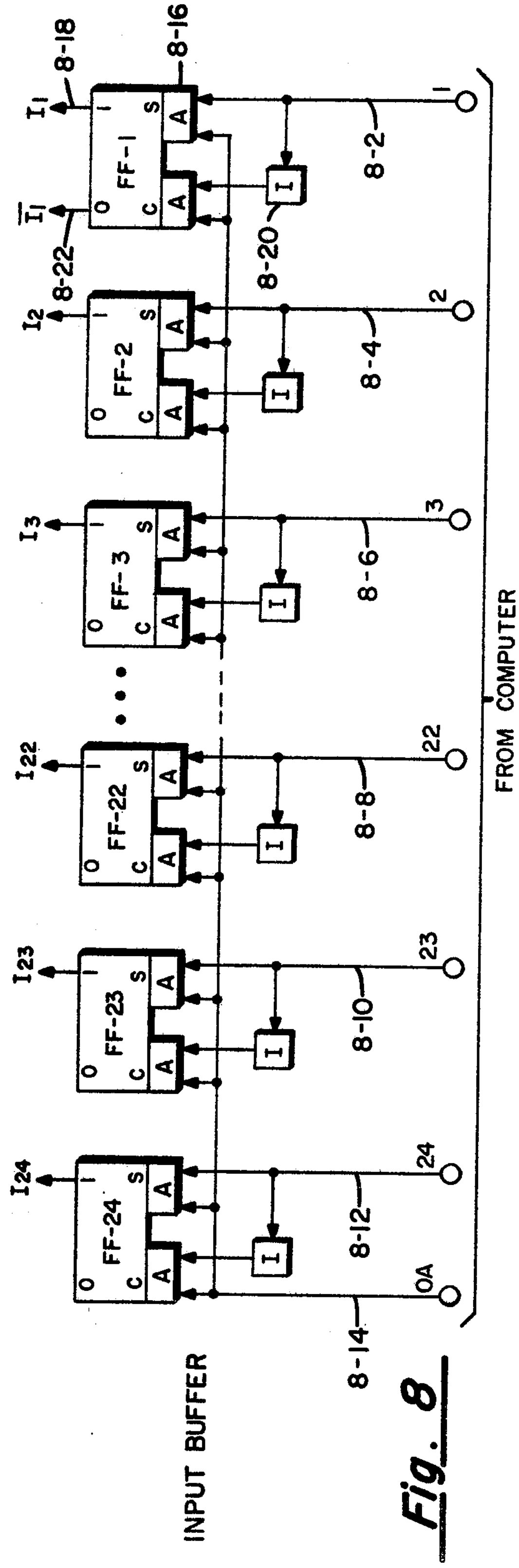
FIG. 8 is a diagram of the Input Data or Buffer Register.

The Input Data or Buffer Register is shown in FIG. 8. Although the Input Register is a 24-stage register, for purposes of simplifying the drawings, only six stages are shown in FIG. 8. Obviously, this register could be longer or shorter if necessary to cooperate with any particular computer. Data is received from the computer on lines 8–2 through 8–12 respectively. This data is connected not only to the SET side of the flip-flops through an AND gate, but is also inverted and coupled to the CLEAR side of the flip-flops through an AND gate. The flip-flops are, therefore, self-clearing. Thus, whenever the computer places data on lines 8–2 through 8–12, it also places an Output Acknowledge signal on line 8–14 which is coupled to both the SET and CLEAR side of each of the flip-flops through an AND gate. Considering now flip-flop 1, if a signal representing a binary 1 is present on line 8–2, and the Output Acknowledge signal is present on line 8–14, AND gate 8–16 produces a signal which SETS flip-flop #1 and produces an output on lines 8–18. If, however, a binary 0 was presented by the computer on line 8–2, inverter 8–20 would produce an output which when ANDed with the Output Acknowledge signal on line 8–14 would cause flip-flop #1 to be CLEARED and thus the signal on line 8–18 would be removed and placed on line 8–22. Each of the other flip-flops 2–24 operate in a similar manner.

CONTROL CIRCUITRY

Figure 9:
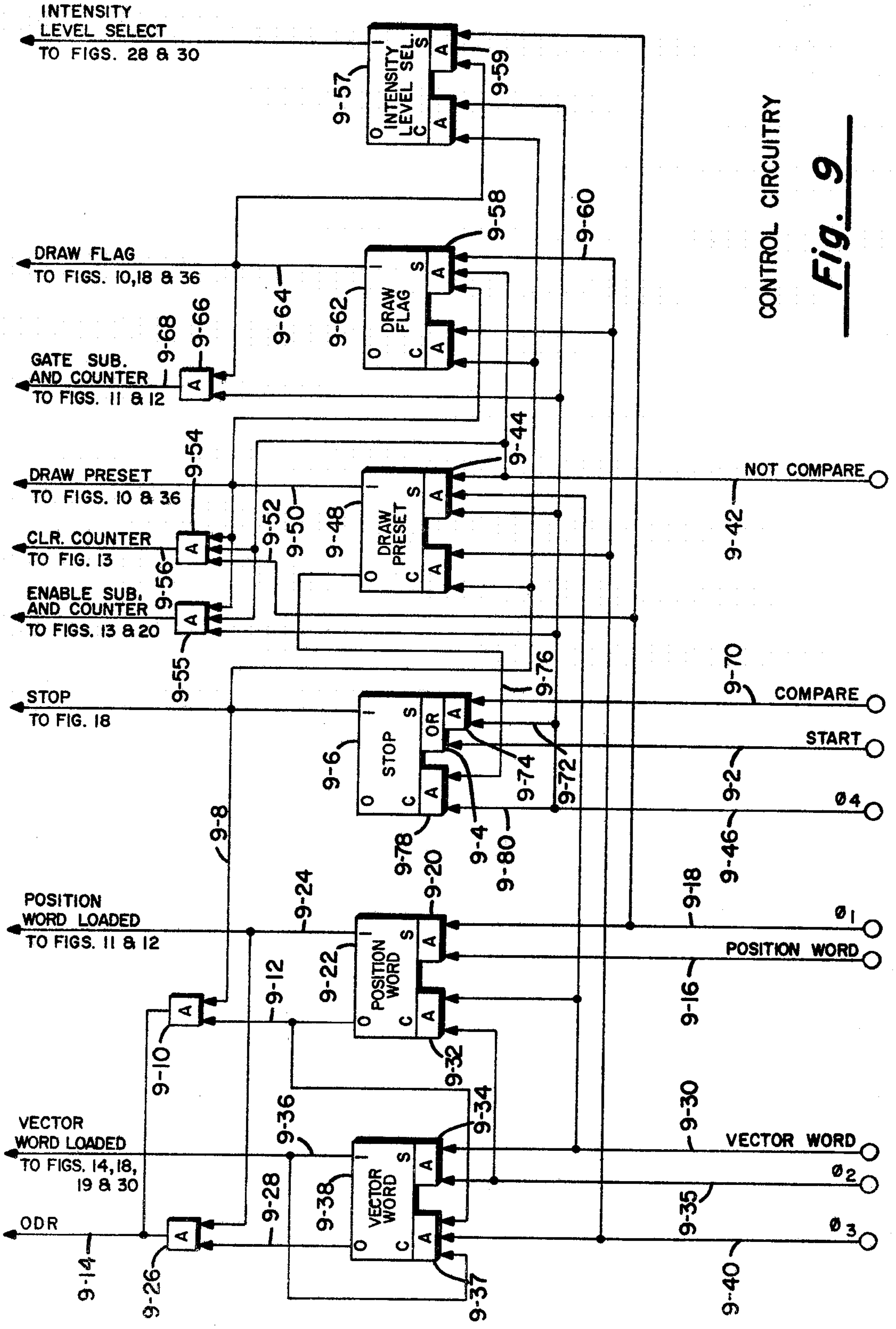
FIG. 9 is a diagram of the control circuitry necessary for initiating operation of the vector generator.

FIG. 9 shows the control circuitry necessary for starting and stopping operation of the vector generator. Assume that initially a START pulse is present on line 9–2. This START pulse may be produced in any well known manner as, for example, by depressing a MASTER CLEAR button. The START pulse passes through OR gate 9–4 thus setting STOP flip-flop 9–6 and producing an output on line 9–8. This output pulse on line 9–8 is coupled to AND gate 9–10 where it is ANDed with the output from the complementary side of the Position Word flip-flop 9–22 on line 9–12. Since a pulse is present on line 9–12 when the Position Word has not been received, AND gate 9–10 produces an output one line 9–14 which is an Output Data Request signal that is coupled to the computer requesting a Position Word. When the computer returns the Position Word to the Input Buffer Register shown in FIG. 8 along with an Output Acknowledge signal, flip-flop 1 of the Input Buffer Register is CLEARED and the output from its complementary side is coupled to line 9–16 in FIG. 9. This signal along with clock pulse $\phi_1$ on line 9–18 causes AND gate 9–20 to produce an output signal which SETS Position Word flip-flop 9–22. With this flip-flop SET, the complementary signal on line 9–12 is removed and the true signal is present on line 9–24. Thus, AND gate 9–10 is disabled and the Output Data Request signal is removed. However, the true signal from the Position Word flip-flop on line 9–24 is coupled to AND gate 9–26 where it is ANDed with the complement output from the Vector Word flip-flop on line 9–28. This causes AND gate 9–26 to produce an Output Data Request signal on line 9–14 which is coupled to the computer and which requests the computer to transmit the Vector Word to the vector generator. When the computer places the Vector Word on the data lines along with an Output Acknowledge signal as shown in FIG. 8, the data is stored in the Input Buffer Register flip-flops. The Vector Word is indicated by a "1" stored in flip-flop 1. This causes an output from the true side of the flip-flop which is coupled to line 9–30 in FIG. 9. On $\phi_2$ from the clock, this signal passes through AND gate 9–32 and CLEARS Position Word flip-flop 9–22. It also passes through AND gate 9–34 with $\phi_2$ on line 9–35 to SET the Vector Word flip-flop and cause a true output signal to occur on line 9–36 and also removes the complement signal on line 9–28. The removal of the complement signal on line 9–28 prevents AND gate 9–26 from continuing to produce the Output Data Request signal on line 9–14. Since the Position Word flip-flop 9–22 has been CLEARED, the complement output signal on line 9–12 is coupled to AND gate 9–37 on the CLEAR side of Vector Word flip-flop 9–38. Also coupled to AND gate 9–37 on the CLEAR side of the Vector Word flip-flop 9–38 is the true output signal on line 9–36. When clock pulse $\phi_3$ is present on line 9–40, the Vector Word flip-flop is CLEARED by the signal from AND gate 9–37 on the CLEAR side. Thus, at this point, both the Position Word and the Vector Word have been received and stored. Because at this point the data representing the origin of the vector which is stored in the main position register (X or Y) cannot be equal to the data representing the final position of the vector which is stored in the F-register, the Comparator shown in FIG. 15 produces a signal on line 9–42 which is coupled to AND gate 9–44 associated with the Draw Preset flip-flop 9–48 and to AND gates 9–54 and 9–55. Also, coupled to AND gate 9–44 is the signal on line 9–30 representing that the Vector Word has been received. Because the Vector Word has been received, it is desired that the vector now be drawn. Therefore, on $\phi_4$ a clock signal is present on line 9–46 which, when coupled to AND gate 9–44, causes a signal to be produced which SETS the Draw Preset flip-flop 9–48. The output of the Draw Preset flip-flop 9–48 on line 9–50 is coupled, along with a $\phi_1$ clock signal on line 9–52, to AND gate 9–54 which produces an output on line 9–56 which CLEARS the Counter. The output on line 9–50 is also coupled to AND gate 9–55, which on $\phi_4$, of the clock, produces a signal which enables the Subtractive Type Adder and Counter.

The output signal from the Draw Preset flip-flop 9–48 on line 9–50 is also coupled to AND gate 9–58 along with the $\phi_3$ clock pulse on line 9–60 and the signal on line 9–42 which indicates that the data in the F-register representing the final position of the vector does not equal the data stored in the upper 10 stages of the X or Y register. These three signals cause AND gate 9–58 to produce an output signal which SETS Draw Flag flip-flop 9–62. This flip-flop produces an output signal on line 9–64 which is coupled, along with $\phi_4$ of the clock pulse on line 9–46, to AND gate 9–66 which produces an output on line 9–68 which gates the outputs of the Subtractive Type Adder and the Counter to the respective X or Y register. The beam intensity level is enabled by $\phi_1$ of the clock and the Draw Flag signal on line 9–64 enabling AND gate 9–59 and setting flip-flop 9–57. Thus, the generator begins to draw the vector. When the data stored in the X or Y register is equal to the data stored in the Final Position Register F, the vector is completed and a vector completed signal is produced by the comparator. A signal then appears on line 9–70 which, when coupled with the $\phi_4$ clock signal on line 9–72, causes AND gate 9–74 to produce an output signal which passes through OR gate 9–24 and sets STOP flip-flop 9–6 causing an output signal to be produced on line 9–8 which indicates that the vector is completed. This signal on line 9–8 is also coupled to the CLEAR side of both the Draw Preset flip-flop 9–48 and the Draw Flag flip-flop 9–62 which CLEARS these flip-flops and removes the control signals from their true outputs. Also the signal on the complement output on line 9–76 of Draw Preset flip-flop 9–48 is coupled to AND gate 9–78 where along with the $\phi_4$ clock pulse on line 9–80, AND gate 9–78 is caused to produce an output signal which CLEARS STOP flip-flop 9–6. Thus, the control circuitry in FIG. 9 initiates the drawing of the vector and then removes the control signals when the vector has been completed.

OCTANT DECODER

Figure 10:
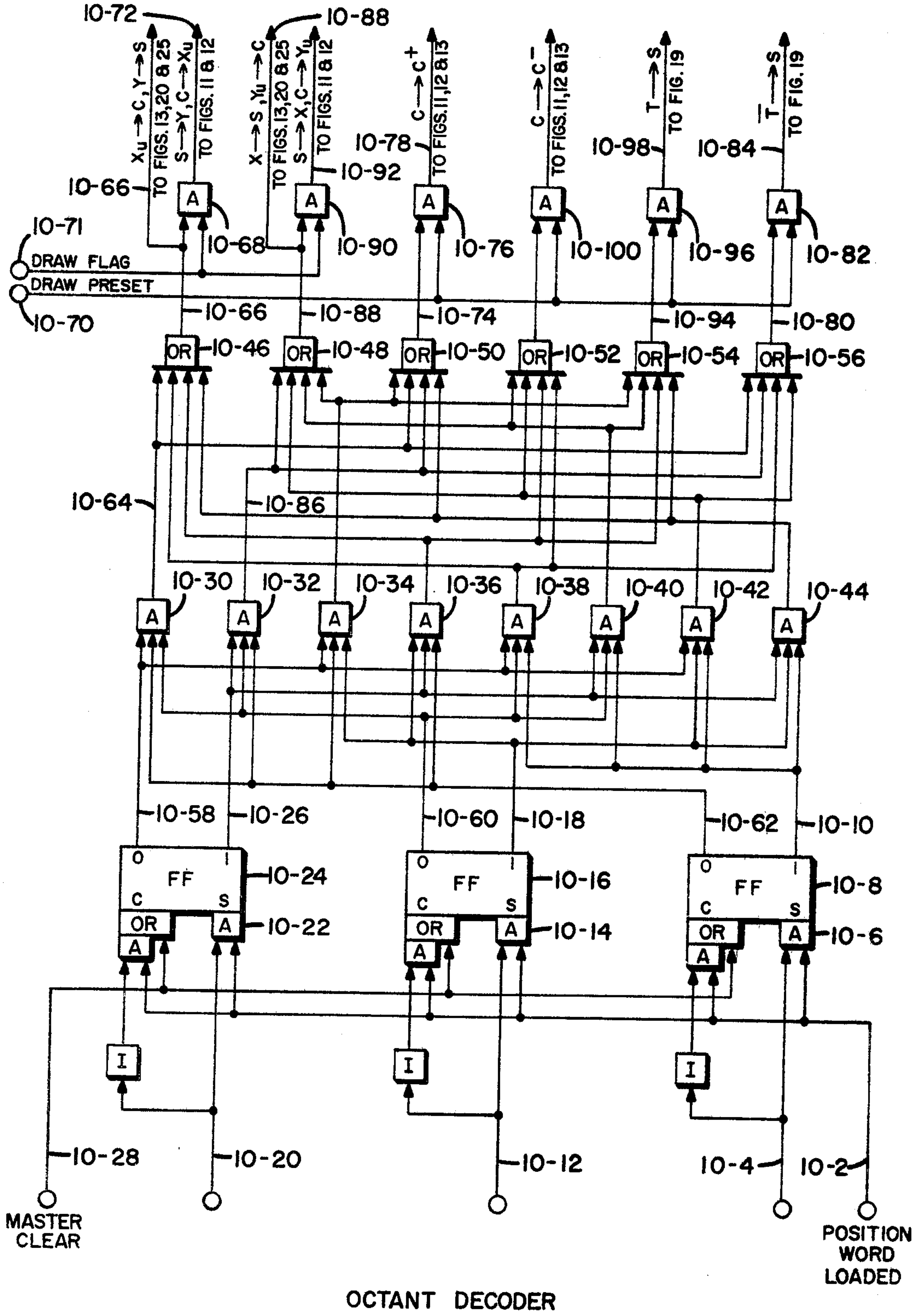
FIG. 10 is a diagram of the Octant Decoder which produces the necessary gating signals.

The octant decoder is shown in FIG. 10, and includes a 3-stage Octant Register that holds the encoded octant number which specifies the octant in which the vector is to be drawn and the octant decoder logic which decodes the octant number and determines (a) whether the value in the trigonometric register represents tangent $\theta$ or cotangent $\theta$ and, thus, whether the output of the X-register or the Y-register will be connected to the counter register, C, (b) whether the 10-stage counter is to be incremented or decremented, (c) whether X or Y register outputs will be coupled to the subtracter, and (d) whether the Subtractive Type Adder will subtract or add.

When the Position Word has been received by the Input Buffer Register, shown in Fig. 8, and the Position Word flip-flop in Fig. 9 has been SET, the output from the Position Word flip-flop is coupled to line 10–2 in FIG. 10 to gate bits 2, 3 and 4 of the Input Buffer Register into the 3-stage Octant Register. Thus, with the Position Word signal on line 10–2 and the second bit of the Input Register on line 19–4, AND gate 10–6 produces an output signal which SETS flip-flop 10–8 thus causing an output on line 10–10 from the SET side of the flip-flop. In a like manner, if an input signal representing the third bit of the Input Register is present on line 10–12, AND gate 10–14 produces an output which SETS flip-flop 10–16 thus causing an output on line 10–18. Similarly, if an input signal representing the fourth bit of the Input Register is present on line 10–20, AND gate 10–22 produces an output which SETS flip-flop 10–24 and causes an output to be produced on line 10–26. Each of the flip-flops 10–8, 10–16 and 10–24 may be CLEARED either by the Master Clear Pulse on line 10–28 or are self-clearing by inverting the input and connecting it to the CLEAR side through an AND gate along with the Position Word Loaded signal on line 10–2. Because there are three flip-flops, 10–8, 10–16 and 10–24, eight possible combinations of output signals could be produced by these three flip-flops. Thus, AND gates 10–30 through 10–44 will produce outputs depending upon the information stored in the 3-bit Octant Register.

AND gates 10–30 through 10–44 produce individual outputs which represent the octants 1–8 respectively in which the vector is to be drawn and cause OR gates 10–46 through 10–56 to produce the necessary output signals to control the generation of the vector. Thus, if flip-flops 10–8, 10–16 and 10–24 are all storing binary 0's, which represent octant 1, the complementary output signals on lines 10–58, 10–60 and 10–62 are all coupled to AND gate 10–30 which produces an output on line 10–64. Line 10–64 is coupled to OR gate 10–46, OR gate 10–50, and OR gate 10–56. The output of OR gate 10–46 on line 10–66 indicates that the X-register is to be the main register and therefore the data is to be gated from the X-register to the Counter register and back to the X-register. It also indicates that the data in the T-register is to be algebraically added to the value, stored in the Y-register and therefore causes the data stored in the Y-register to be gated into the Subtractive Type Adder. The output of OR gate 10–46 on line 10–66 is also coupled to AND gate 10–68 along with the Draw Flag flip-flop signal from Fig. 9 on line 10–71. AND gate 10–68 then produces an output signal on line 10–72 which gates the output of the Counter back to the upper 10 stages of the X-register and the output of the Adder back to all 20 stages of the Y-register.

OR gate 10–50 produces an output signal on line 10–74 which is coupled to AND gate 10–76 where it is ANDed with the Draw Preset flip-flop signal from Fig. 9 on line 10–70 to cause AND gate 10–76 to produce an output signal on line 10–78. This signal indicates that the information entering into the Counter must be incremented. Since the $X_u \rightarrow C$ signal on line 10–66 is gating the upper 10 bits of the X-register into the Counter, it is the X-register data that is incremented by the Counter because of the signal on line 10–78. Also, at this time, OR gate 10–56 is producing an output signal, $\overline{T} \rightarrow S$, on line 10–80. This signal is coupled to AND gate 10–82 where it and the Draw Preset flip-flop signal from Fig. 9 on line 10–70 causes AND gate 10–82 to produce an output signal on line 10–84. This signal indicates that the tangent stored in the Tangent Register is to be added to the data gated into the Subtractive Type Adder from the Y-register. Since the Adder used is a Subtractive Type, an addition is performed by coupling the complement of the data stored in the Tangent Register to the Subtractive Type Adder. The signal on line 10–84 therefore gates the complement of the information in the Tangent Register into the Subtractive Type Adder. Thus, it has been seen that if the code 000 is stored in the Octant Register, AND gate 10–30 is activated which produces an output signal indicating that octant 1 is to be used and OR gates 10–46, 10–50 and 10–56 are energized to cause AND gates 10–68, 10–76 and 10–82 respectively to produce appropriate control signals which will select the X-register as the main register and gate the data in the X-register to the Counter where that data will be incremented by 1 and then gated back to the X-register. It will also cause the information stored in the Y-register to be transferred to the Subtractive Type Adder where it will be added to the complement of the data stored in the Tangent Register and the return to the Y-register.

In a like manner, if flip-flops 10–8 10–16 and 10–24 of the Octant Decoder Register are storing code 001, AND gate 10–32 is activated which selects octant 2 by producing an output signal on line 10–86 which is coupled to OR gates 10–48, 10–50 and 10–56. OR gate 10–48 produces an output signal on line 10–88 which indicates that the Y-register is chosen to be the main register and that the data in the Y-register is to be gated into the C-register and returned to the Y-register while the X–register is chosen as the cotangent register and thus the signal on line 10–88 will cause the information stored in the X-register to be gated into the Adder. The output of OR gate 10–48 on line 10–88 is also coupled AND gate 10–90 along with the Draw Flag flip-flop signal from FIG. 9 on line 10–71. AND gate 10–90 then produces an output signal on line 10–92 which gates the output of the Counter back to the upper 10 stages of the Y-register and the output of the Adder back to the 20 stages of the X-register. Since in octant 2 the Y-register must be incremented, OR gate 10–50 produces an output signal which is used as previously explained to cause the information entering the C-register to be incremented by 1. Further, since the cotangent is also positive in octant 2, OR gate 10–56 produces an output signal as previously explained that causes AND gate 10–82 to produce an output signal on line 10–84 which causes the complement of the Tangent Register to be coupled to the Subtractive Type Adder where it will be added to the information stored in the X-register.

If octant 3 is chosen, AND gate 10–34 will produce an output signal which again causes OR gate 10–48 to produce a signal on line 10–88 which selects the Y-register as the main register and the X-register as the Cotangent Register. However, in octant 3, the Y-register is to be incremented while the X-register is to be decremented. Therefore, OR gate 10–50 is also energized to cause AND gate 10–76 to produce an output signal on line 10–78 which causes the C-register to increment the data presented to it. This time, however, OR gate 10–54 is also energized which causes an output signal to be present on line 10–94, which is coupled to AND gate 10–96 where with the Draw Preset flip-flop signal on line 10–70, a signal is caused to be produced on line 10–98. This signal couples the true output of the T-register to the Subtractive Type Adder. When the true output is coupled into the Subtractive Type Adder, a subtraction takes place. Therefore, since the signal on line 10–92 is causing the data in the X-register to be coupled to the Subtractive Type Adder, and since the signal on line 10–98 causes the true side of the T-register to be coupled to the Subtractive Type Adder, the data in the X-register is decremented by the amount in the T-register and the result stored in the Adder. It will also be seen that OR gate 10–52 will be energized whenever any one of AND gates 10–36, 10–38, 10–40 and 10–42 is energized to produce a signal representing octants 4, 5, 6 and 7 respectively. The signal produced by OR gate 10–52 cause AND gate 10–100 to produce a signal which causes the data being coupled to the C-register to be decremented. Thus, in octants 4 and 5, the data in the X-register must be decremented. In octants 6 and 7, the data in the Y-register must be decremented. See Table I in FIG. 34.

By comparing the requirements set up in Table I with the outputs produced by the circuit in FIG. 10, it will be seen that as the Octant Decoder Register receives the three bits representing the various octants. AND gates 10–30 through 10–44 will energize the proper OR gates 10–46 through 10–56 which activate various ones of AND gates 10–68, 10–90, 10–78, 10–100, 10–96, or 10–82, to produce the necessary control signals to cause the vector to be properly drawn in the particular octant.

X-POSITION REGISTER

Figure 4:
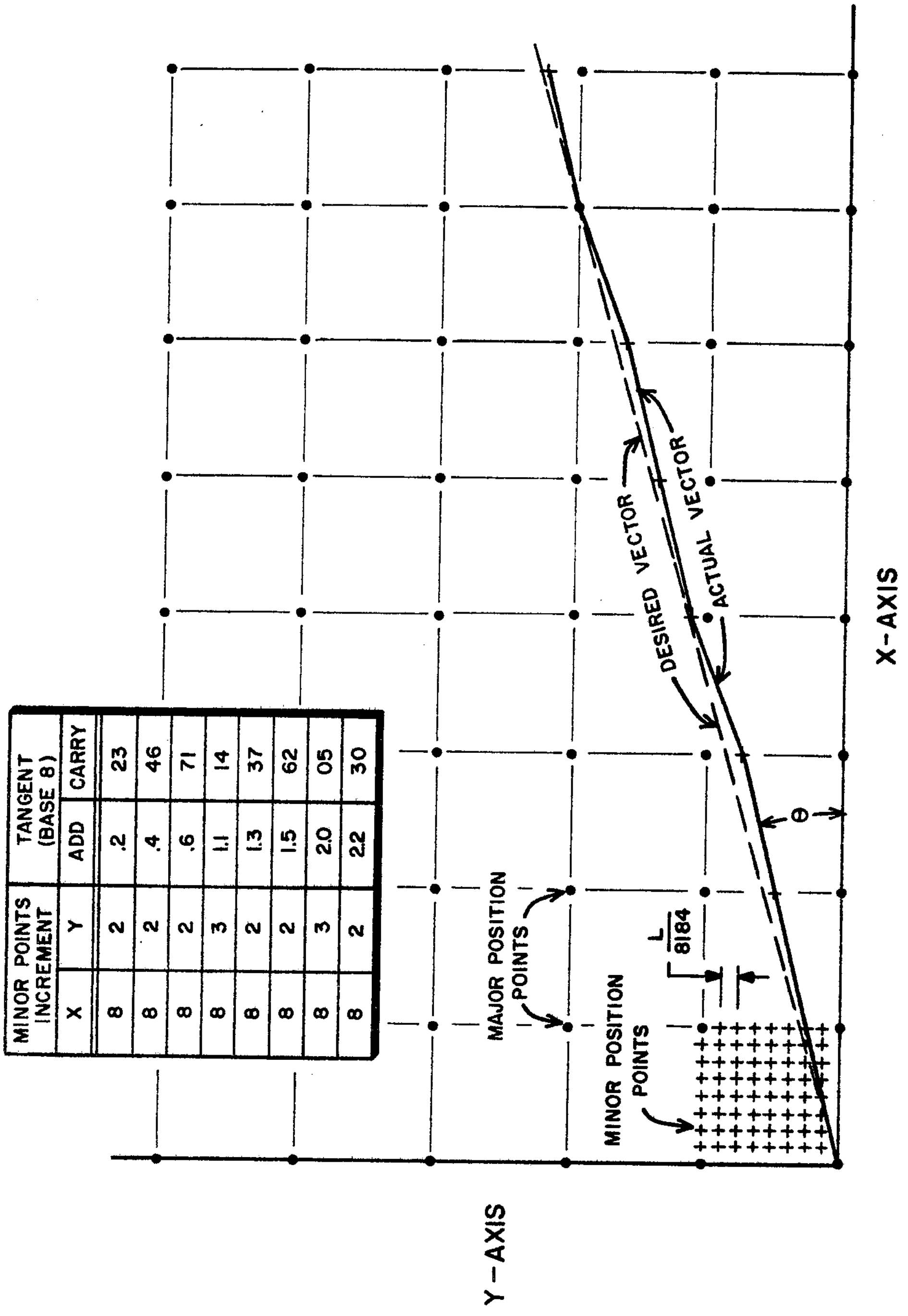
FIG. 4 represents the face of the cathode ray tube showing the fictitious major position points, minor position points, desired vector, actual vector and a table showing how the tangent is added to the initial Y-position.
Figures 11, 12:
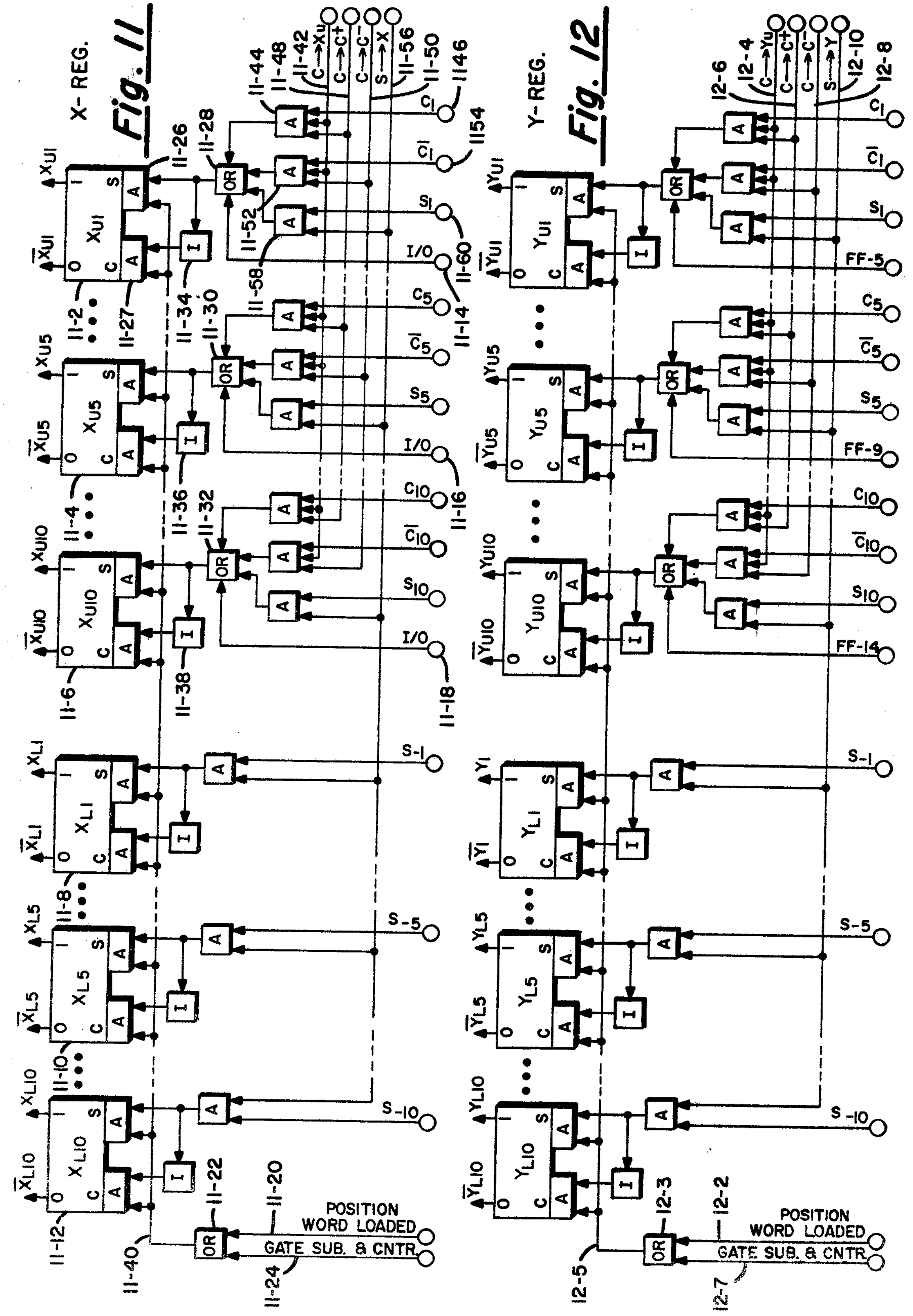
FIG. 11 is an illustration of the X-position register.
FIG. 12 illustrates the Y-position register.

The X-register is shown in FIG. 11. It is a digital register 20 stages in length that is used to specify points on the display viewing area. The most significant 10 bits stored in the X-register represent the integer portion of the beam position along the X-axis, that is, a particular one of the 1024 major position points on the X-axis. The next three bits are the most significant of the cotangent when the X-register is being used to store the cotangent and represent minor position points within said major position points (as shown in FIG. 4). These three bits are used directly in the vector generation. The remaining seven bits represent accuracy position points and are used as carry bits to maintain accuracy.

In FIG. 11, for simplicity of the drawings, only three flip-flops 11–2, 11–4 and 11–6, are used to represent the upper 10 bits of the X-register while three other flip-flops, 11–8, 11–10 and 11–12, are used to represent the lower 10 bits of the X-register. As stated previously, information from three different locations must be transferred into the various stages of the X-register at particular times. Information must be initially transferred into the X-register from the Input Buffer Register to represent the initial X-position of the beam. Further, if the X-register is chosen as the main register, the information is gated from the X-register to the Counter Register where it is either incremented or decremented and returned to the X-register. Finally, if the X-register is chosen as the cotangent register, the data stored therein must be transferred to the Subtractive Type Adder where it will be either incremented or decremented, and returned to the X-register stages.

Consider first the situation that exists when the X-register is to receive data from the Input Buffer Register. Since this digital data represents the initial X-position of the beam, only 10 bits are required and therefore are stored in the upper 10 stages of the X-register. It will be remembered that the first bit of the Position Word is the Word Flag and the next three bits are the Octant bits. Thus, bit 5 of the Input Buffer Register will be present on line 11–14, bit 9 of the Input Register will be present on line 11–16 and bit 14 of the Input Register will be present on line 11–18. These signals are passed through OR gates 11–28, 11–30 and 11–32 respectively. The output from each of these OR gates is connected through an AND gate to the SET side of its respective flip-flop. Therefore, if the output signal from the OR gate represents a binary 1, it SETS its respective flip-flop when the control signal from OR gate 11–22 is present on line 11–40. However, if the output of the OR gates represents a binary 0, it passes through its respective inverter 11–34, 11–36 or 11–38 and is coupled through an AND gate to the CLEAR side of its respective flip-flop when the control signal from OR gate 11–22 is present on line 11–40. Thus, bits 5 through 14 of the Input Buffer Register are stored in the upper 10 stages of the X-register. The Position Word Loaded signal on line 11–20 passes through OR gate 11–22 to gate the signals in the Input Buffer Register to the corresponding stages of the X-register while the Gate Subtractor and Counter signal on line 11–24 passes through OR gate 11–22 to gate the signals from either the Subtractive Type Adder or the Counter into the corresponding stages of the Y-register.

As stated previously, if the X-register is to be used as the Main Position Register, the data stored therein must be gated into the C-register where it is either incremented or decremented and then returned to the X-register. This means, of course, that the upper 10 bits of the X-register are to be used for this purpose. If the contents of the X-register is to be incremented, the true outputs of the X-registers are gated into the C-register where a count 1 is added thereto and the true outputs of the C-register are gated back to the corresponding stages of the X-register. The incrementing control signal on line 11–48 from FIG. 10 is coupled to AND gate 11–44 along with the true output from stage 1 of the C-register on line 11–46 and the C-register to X-register gating signal, $C \rightarrow X_u$, from FIG. 10 on line 11–42. Thus, the true outputs from the stages of the C-register are stored in the respective upper 10 stages of the X-register.

If the contents of the X-register is to be decremented, the complement outputs from the X-register stages are coupled to the corresponding stages of the C-register where a count of 1 is added and the complement outputs from the C-register stages are gated back to the corresponding stages of the X-register. This is accomplished by the decrement signal on line 11–50 being coupled to AND gate 11–52 along with the complement from the first stage of the C-register on line 11–54 as well as the C-register to X-register gating signal, $C \rightarrow X_u$, on line 11–42. For example, using only three stages for purposes of illustration, assume that a 010 is stored in the stages of the X-register and that this value is to be decremented. The complement, 101, is gated to the corresponding stages of the C-register. A count of 1 is added thereto to obtain 110 stored in the stages of the C-register. The complement, 001, is returned to the X-register stages. It can be seen that the initial count stored in the X-register stages 010, has been decremented by one count to obtain 001.

If the X-register data is to be incremented by the cotangent, the contents of all 20 stages of the X-register are gated to the Subtractive Type Adder where the data is algebraically and repeatedly incremented by the value stored in the T-register and returned to the corresponding stages of the X-register. Storing the new information in stage 1 of the X-register is accomplished, for example, by the gating signal, $S \rightarrow X$, on line 11–56 from FIG. 10 which is coupled to AND gate 11–58 along with the signal from stage 1 of the Subtractive Type Adder on line 11–60. Thus, AND gate 11–58 produces an output signal representative of the information stored in stage 1 of the Subtractive Type Adder and which passes through OR gate 11–28 to AND gates 11–26 or 11–27, through inverter 11–34, which either SETS or CLEARS stage 1 of the X-register depending upon whether the information received from the Subtractive Type Adder is either a binary 1 or a binary 0. Of course, the Gate Subtracter and Counter signal must be present on line 11–40 for the stages to be SET or CLEARED. Each of the other stages of the X-register receives information from the Subtractive Type Adder in a similar manner. It should be noted that all of the stages of the X-register, both upper and lower, receive data from the Adder. The upper ten stages, $X_u$, form a first group of X stages that store data representative of major position points along the X-axis on the cathode ray tube face. The first three stages of the lower ten stages, $X_L$, form a second group of Y stages that store data representative of minor position points within said major position points. The remaining seven stages form a third group of Z stages which stores data representative of accuracy position points within said minor position points. As the Adder continually increments the initial beam position by the cotangent, carries may be produced by those stages in the Adder storing data representative of the minor position bits and the accuracy position bits. The first group of X stages, $X_u$, receives the carries from the stages in the Adder representing the minor position bits and the second group of Y stages in the X-register, the first three of the lower ten stages $X_L$, receives the carries produced by the stages in the Adder representing the accuracy bits. Thus, in the incrementing process, the accuracy bits spill over into the minor position bits which build up and spill over into the major position bits.

In summary, for each stage of the upper 10 stages of the X-register, AND gates are used to gate the proper signals into the appropriate stages. One of these AND gates receives the true output from the C-register stages and gates it into the corresponding X-register stages. Another of these gates receives the complement of the C-register stages and gates it into the corresponding X-register stages in order to perform a decrementing operation. Still another of these AND gates couples the output of the Subtractive Type Adder stages into the corresponding X-register stages to enable it to be used as the cotangent register. Finally, data representing the initial X-position from the Input Buffer Register stages is gated directly into the corresponding X-register stages.

Thus, the X-register stores *m* bits of data representative of the coordinates of the initial beam position along the X-axis on the face of a cathode ray tube and includes a first group of stages for storing data representative of major position points along said X-axis, said first group receiving any carries from the plurality of stages in the Adder which store the minor position bits, a second group of stages for storing data representative of minor position points within said major position points and for receiving any carries from the plurality of stages in the Adder which store accuracy bits and a third group of stages for storing data representative of accuracy position points within said minor position points.

Y POSITION REGISTER

The Y-register shown in FIG. 12 is identical to the X-register shown in FIG. 11 except for the proper gating signals. Thus, the Position Word Loaded signal on line 12–2 from FIG. 2 passes through OR gate 12–3 to line 12–5 and causes the information stored in the Input Buffer Register to be transferred to the corresponding stages of the Y-register. Also, if the Gate Subtractor and Counter signal is present on line 12–7, the control signal $C \rightarrow X_u$ on line 12–4 from FIG. 10 allows the contents of the C-register to be gated into the Y-register. However, if the contents of the Y-register is to be incremented by the C-register and returned from FIG. 10 to the corresponding stages of the Y-register, the incrementing control signal from FIG. 10 must be present on line 12–6. Also, if the contents of the Y-register is to be decremented by the C-register and then stored in the corresponding stages of the Y-register, the decrementing control signal from FIG. 10 must be present on line 12–8. Finally, if the Y-register is to be used to store the tangent, then the contents of the Subtractive Type Adder will be stored in the corresponding stages of the Y-register when the S-to-Y control signal from FIG. 10 appears on line 12–10 and the Gate Subtracter and Counter signal is present on line 12–7. The Y-register will therefore perform the same operations in the same manner as described for the X-register.

Thus, the Y-register stores *m* bits of data and includes a first group of stages for storing data representative of major position points along the Y-axis, a second group of stages for storing data representative of minor position points within said major position points, and a third group of stages for storing data representative of accuracy position points within said minor position points. When said Y-register is being used as the main position register, the Counter algebraically and repeatedly increments only the first group of stages storing data representative of the major position points. When it is not being used as the main position register, the first group of stages receives from the Adder data representing major position points as well as any carries from the stages in the Adder storing minor position bits, the second group of stages receives from the Adder data representative of minor position points within said major position points as well as any carries from the stages in the Adder storing accuracy bits, and the third group of stages receives from the Adder data representative of accuracy position points within said minor position points.

C-REGISTER

Figure 13:
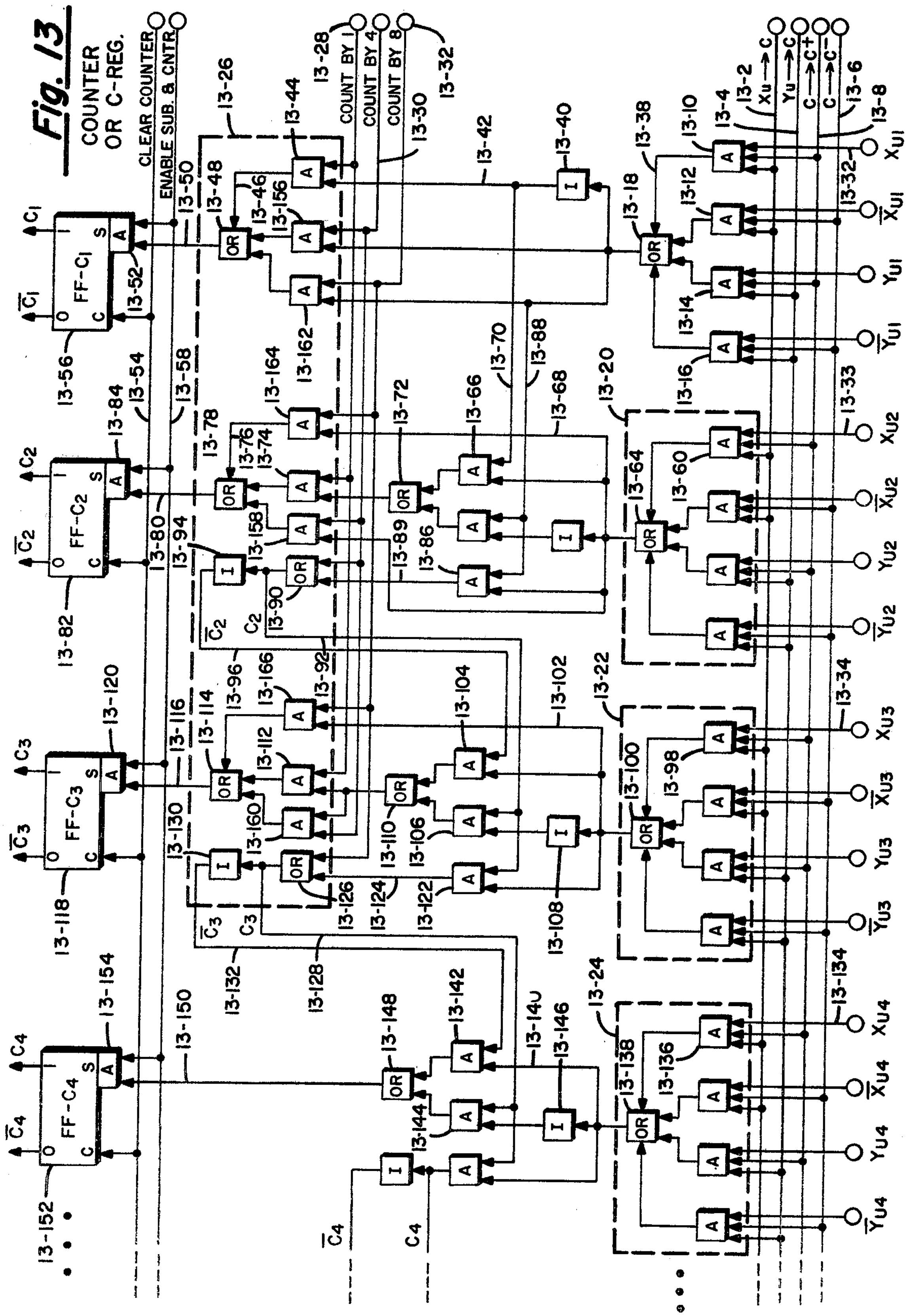
FIG. 13 illustrates the C-register and its associated input circuits.

FIG. 13 discloses the Counter or C-register which is a 10-bit Counter that increments or decrements information received by it by $2^n$ counts where *n* is an integer. As will be explained later, this allows vector generation speed to be increased. The Counter receives a 10-bit value from either $X_u$ or $Y_u$ whichever is being used as the main register and, therefore, is not being used by the 20-bit Adder. The Counter performs a count operation on the value and returns the newly incremented or decremented value to the $X_u$ or $Y_u$ register depending upon the location from which it came. Only four stages of the Counter or C-register are shown in FIG. 13 for purposes of simplicity of the drawings. As stated previously, either the true or complement outputs of the upper 10 stages of the X-register or the true or complement outputs of the upper 10 stages of the Y-register may be transferred to the C-register depending upon the presence of the $X_u \rightarrow C$ control signal on line 13–2 or the $Y_u \rightarrow C$ control signal on line 13–4. If the outputs of the upper 10 stages of the X-register are to be transferred to the C-register and incremented, the increment signal must be present on line 13–8. This signal actually gates the true outputs from the upper 10 stages of the X-register into the Add circuitry of the C-register. In a like manner, if the outputs of the upper 10 stages of the Y-register are to be gated into the C-register and incremented, the increment signal on line 13–8 will couple the true outputs from the Y-register into the Add circuit of the C-register. Similarly, if either the X or the Y register data is to be coupled to the C-register and decremented, the complement side of either the upper 10 stages of the X-register or the upper 10 stages of the Y-register, depending upon the control signal on line 13–2 or line 13–4, will be coupled to the Add circuitry of the C-register by the decrement signal on line 13–6. Thus, AND gate 13–10 couples the true side of the first stage of the upper 10 stages of the X-register through OR gate 13–18 to the Add circuitry of the C-register whenever the $X_u \rightarrow C$ control signal is present on line 13–2 and the increment signal is present on line 13–8. In a like manner, the complement of the first stage of the upper 10 stages of the X-register is coupled through AND gate 13–12 and OR gate 13–18 to the Add circuitry of the C-register whenever the $X_u \rightarrow C$ control signal is present on line 13–2 and the decrement signal is present on line 13–6. Also, AND gate 13–14 couples the true output of the first stage of the upper 10 stages of the Y-register through OR gate 13–18 to the Add circuitry of the Counter whenever the $Y_u \rightarrow C$ control signal is present on line 13-4 and the increment signal is present on line 13–8. Finally, AND gate 13–16 couples the complement of the first stage of the upper 10 stages of the Y-register through OR gate 13–18 to the Add circuitry to the C-register whenever the $Y_u \rightarrow C$ control signal is present on line 13–4 and the decrement signal is present on line 13–6. Each of the other input circuits 13–20, 13–22 and 13–24 shown enclosed in dashed lines, contain four AND gates the outputs of which are coupled to an OR gate as previously described and each operates in the same manner.

The output from OR gates 13–18 and the OR gates in circuits 13–20, 13–22 and 13–24 are applied to a conventional adder circuit which adds one count to the digital data applied and which stores the incremented data in the appropriate counters of the C-register. However, as stated earlier the vector generator contains control logic for speeding up the vector generation process. The control logic for causing the vector generation speed-up process will be discussed later. At this time however, it is sufficient to note that when the contents of the upper 10 stages of the X or Y register is incremented by one count each cycle, the electron beam of the cathode ray tube is caused to move a unit increment along either the X or the Y axis respectively for each cycle and this is known as the "count-by-one" cycle. This count may be increased by 2, 4, 8, 16, 32 and so forth as desired. For purposes of example only, either a count-by-one signal would be present on line 13–28, a count-by-four signal would be present on line 13–30, or a count-by-eight signal would be present on line 13–32 in FIG. 13. Circuit 13–26 contains the necessary logic to cause the data applied to the adder to be incremented either by 1, 4, or 8. If the adder circuit is being used in the count-by-one mode, the lowest order bit presented to the Counter must always cause the lowest order stage of the C-register to change states. The remaining higher order stages will change states depending upon the carries from the lower order stage. If, however, the circuit is being used in the count-by-four mode, the two lowest order bits being coupled into the adder must be coupled unchanged into the lowest order stages of the C-register. The third order stage, however, must always change states whenever a bit is presented to it in the count-by-four mode. In a like manner, if the adder is being used in the count-by-eight mode, the three lowest order bits being coupled into the adder must always be stored unchanged in the three lowest order stages of the C-register while the bits being coupled into the fourth stage of the adder must always change the state of the fourth stage of the C-register.

Consider the following example. Assume a binary 0 is present from the lowest order stage of the X-register, $X_{u1}$, on line 13–32. Assume that the next lowest order bit, $X_{u2}$, is a binary 1 present on line 13–33. Assume also that bit $X_{u3}$ is a binary 0 on line 13–34 and that bit $X_{u4}$ is a binary 0 on line 13–134. Assume also that a $X_u \rightarrow C$ control signal is present on line 13–2 with an increment signal present on line 13–8. Finally, assume that a count-by-one signal is present on line 13–28. AND gate 13–10 will produce a "0" on line 13–38 since the lowest order bit on line 13–32 is also a "0." OR gate 13–18 will therefore also output a "0" which will be coupled to inverter 13–40. The output of inverter 13–40 on line 13–42 will be a "1" that is coupled to AND gate 13–44 which will produce a binary 1 on output line 13–46 because of the count-by-one signal present on line 13–28. This binary 1 from AND gate 13–44 will be coupled to OR gate 13–48 which will produce an output on line 13–50 to AND gate 13–52. On $\phi_1$ of the clock pulses, the CLEAR Counter signal on line 13–54 from FIG. 9 will be coupled to the CLEAR side of stage 13–56 of the C-register and clear that stage thus storing a 0 therein. However, on $\phi_3$ of the clock, the Enable Subtracter and Counter signal on line 13–58 is coupled to AND gate 13–52 which causes the stage 13–56 to be SET thus storing the binary 1 in stage 13–56. Thus, the "0" that was present on the input line from the lowest order stage of the X-register has been incremented by one count and stored in the lowest order stage of the C-register. The binary 1 on line 13–33 from the second lowest order stage of the X-register is passed through AND gate 13–60 and OR gate 13–64 to AND gate 13–66 via conductor 13–68. Also, coupled to AND gate 13–66 on line 13–70 is the NOT CARRY signal from the lowest order stage. Since the CARRY signal from the lowest order stage is a "0," the NOT CARRY is a binary 1. Thus, the NOT CARRY signal and the binary 1 input signal present on line 13–68 cause AND gate 13–66 to produce a binary 1 output signal which passes through OR gate 13–72 to AND gate 13–74. Since the count-by-one signal is also coupled to AND gate 13–74, it produces an output signal on line 13–76 which is coupled to OR gate 13–78 which produces an output signal on line 13–80. The CLEAR Counter control signal on line 13–54 is enabled on $\phi_1$ and is coupled to the CLEAR side of the second stage 13–82 of the C-register thus setting that stage to a 0. However, on $\phi_3$ of the clock, the Enable Subtracter and Counter signal on line 13–58 as well as the binary 1 on line 13–80 cause AND gate 13–84 to produce an output which SETS stage 13–82 of the C-register thus causing a binary 1 to be stored therein. The binary 1 signal on line 13–68 from OR gate 13–64 is also coupled to AND gate 13–86. However, the other input to AND gate 13–86 is the CARRY signal on line 13–88 from the lowest order stage and it will be remembered that this CARRY signal was a binary 0. Thus, AND gate 13–86 produces a binary 0 on line 13–89 which is passed through OR gate 13–90 as a CARRY signal on line 13–92. Inverter 13–94 causes a binary 1 to be produced as the NOT CARRY signal on line 13–96. The binary 0 on line 13–34 from stage $X_{u3}$ of the X-register is passed through AND gate 13–98 and OR gate 13–100 to conductor 13–102. This binary 0 is coupled directly to AND gate 13–104 and to AND gate 13–106 through inverter 13–108. AND gate 13–104 will therefore have a binary 0 coupled to it on line 13–102 and a binary 1 coupled to it from the NOT CARRY line 13–96 and therefore produces a binary 0 which is coupled to OR gate 13–110. AND gate 13–106, on the other hand, has a binary 1 coupled to it from inverter 13–108 and a binary 0 coupled to it as the CARRY signal on line 13–92 and will therefore produce a binary 0 which is coupled to OR gate 13–110. Therefore, OR gate 13–110 will produce a binary 0 which is coupled to AND gate 13–112 along with the count-by-one signal on line 13–28. Since a binary 0 is present from OR gate 13–110, AND gate 13–112 will output a binary 0 which is passed through OR gate 13–114 on line 13–116. On $\phi_1$ of the clock, the CLEAR Counter signal is present on line 13–54 which is connected to the CLEAR side of stage 13–118 of the C-register thus setting that stage to a binary 0. On $\phi_3$ of the clock, the Enable Subtracter and Counter signal is present on line 13–58 and is coupled to AND gate 13–120 along with the binary 0 on line 13–116. However, because of the presence of the binary 0, AND gate 13–120 will not produce an output signal and thus will not SET stage 13–118 and it will remain cleared thus storing a binary 0. AND gate 13–122 in stage 3 of the adding circuit will have as inputs the binary 0 from input line $X_{u3}$ and the binary 0 as the carry from the previous stage thus outputting a 0 on line 13–124 which passes through OR gate 13–126 and becomes a CARRY on line 13–128. This signal also passes through inverter 13–130 and becomes a NOT CARRY signal, a binary 1, on line 13–132. The binary 0 from the stage $X_{u4}$ on line 13–134 passes through AND gate 13–136 and OR gate 13–138 to conductor 13–140. This binary 0 is coupled directly to AND gate 13–142 and also to AND gate 13–144 through inverter 13–146. Therefore, AND gate 13–142 will have as inputs a binary 0 on line 13–140 and a binary 1 representing the NOT CARRY on line 13–132 and will therefore output a "0" on OR gate 13–148. AND gate 13–144 will have as inputs a binary 1 from inverter 13–146 and a binary 0 as a CARRY on line 13–128 and will therefore output a 0 on OR gate 13–148. This binary 0 is therefore present on line 13–150 from OR gate 13–148. On $\phi_1$ of the clock, the CLEAR Counter pulse on line 13–54 causes stage 13–152 to be cleared. On $\phi_3$ of the clock, the Enable signal on line 13–58 is coupled to AND gate 13–154 along with the binary 0 on line 13–150. Therefore, AND gate 13–154 will not set stage 13–152 and it will remain in a cleared state thus storing a binary 0. It can be seen that in the count-by-one mode with a 0010 input, one count will be added and a 0011 stored in the four lowest order stages of the C-register shown in FIG. 13.

Assume now that the same signals are present on the input lines, a 0010, and a count-by-four signal is present on line 13–30. The binary 0 at the output of OR gate 13–18 in stage one of the adder is coupled directly to AND gate 13–156 along with the count-by-four signal on line 13–30. This means that a binary 0 will be present at the output of the AND gate 13–156 and coupled through OR gate 13–48 to AND gate 13–52 on the SET side of stage 13–56 of the C-register. Since AND gate 13–52 cannot SET stage 13–15 with a binary 0 present on line 13–50, it is obvious that the CLEAR Counter signal on line 13–54 will clear stage 13–56 and store a binary 0 therein on $\phi_1$ of the clock. Thus, the binary 0 on input line 13–32 from stage $X_{u1}$ has been stored directly in stage 13–56 of the C-register. In a like manner, the binary 1 from OR gate 13–65 is coupled directly via line 13–68 to AND gate 13–158 along with the count-by-four signal on line 13–30. Thus, AND gate 13–158 produces a binary 1 output which passes through OR gate 13–78 on line 13–80 and which causes stage 13–82 of the C-register to be SET in the manner previously explained. Thus, the input binary 1 on line 13–32 from stage $X_{u2}$ of the X-register is coupled directly into the second lowest order stage of the C-register 13–82.

The count-by-four signal on line 13–30 is also coupled through OR gate 13–90 and appears as a CARRY signal on line 13–92 which is coupled as one input to AND gate 13–106 in the third stage of the adder. Since stage three had a binary 0 present on line 13–34 from stage $X_{u3}$ of the X-register, OR gate 13–100 produced a binary 0 on its output which, when passed through inverter 13–108, became a binary 1 that is coupled to AND gate 13–106 along with the CARRY signal, a binary 1, on line 13–92. Thus, AND gate 13–106 produces a binary 1 on its output which passes through OR gate 13–110 to AND gate 13–160. Also coupled to AND gate 13–160 is the count-by-four signal on line 13–30 thus causing a binary 1 to be produced by AND gate 13–160 which is coupled through OR gate 13–114 to cause stage 13–118 of the C-register to be SET in the manner previously explained. Thus, the binary 0 input to the third stage of the adder has been incremented by one and is stored in stage 13–118.

Because AND gate 13–122 in the third stage of the adder has as one input a binary 0 from OR gate 13–100, it produces a binary 0 on line 13–124 which is coupled through OR gate 13–126 and becomes a CARRY on line line 13–128. Inverter 13–130, however, outputs a binary 1 as the NOT CARRY signal on line 13–132 which is coupled to AND gate 13–142. The CARRY signal on line 13–128, a binary 0, is coupled as one input to AND gate 13–144. Because AND gate 13–142 will have a binary 0 present as an input on line 13–140, neither it nor AND gate 13–144 will be able to produce a binary 1 output and therefore a binary 0 will be stored in stage 13–152 of the C-register in the manner previously described. Thus, with a 0010 input to the adder and a count-by-four signal present on line 13–30, a 0110 signal has been stored in the first four stages of the C-register showing that the input signal has indeed been incremented by four.

Assume that the same input signals from the X-register, 0010, are present on the input line. Assume also that a count-by-eight signal is present on line 13–32. This means that the three lowest order input bits must not be changed but must be coupled directly to the corresponding stages of the C-register. This is accomplished in the first stage by taking the output of OR gate 13–18 which in this case is a binary 0 and coupling it directly to AND gate 13–162 along with the count-by-eight signal on line 13–32. Since AND gate 13–162 has a binary 0 as one input, it produces a binary 0 output which passes through OR gate 13–48 to the SET side of the lowest order stage 13–56 of the C-register. Since it is a binary 0, as explained previously, the CLEAR Counter signal on line 13–54 will CLEAR stage 13–56 and store the binary 0 therein. In the second stage of the adder, the binary 1 at the output of OR gate 13–64 is coupled directly to AND gate 13–164 along with the count-by-eight signal on line 13–32. Since AND gate 13–164 has two binary 1's on its inputs, it produces a binary 1 as an output which passes through OR gate 13–78 and SETS stage 13–82 of the C-register in a manner previously explained. In a like manner, the binary 0 at the output of OR gate 13–100 on line 13–102 is coupled directly to AND gate 13–166 along with the count-by-eight signal on line 13–32. Because AND gate 13–166 has a binary 0 as one input, it produces a binary 0 output which passes through OR gate 13–114 to the SET side of stage 13–118 of the C-register. Therefore, in a manner previously described, the CLEAR Counter signal on line 13–54 CLEARS the third stage of the C-register, 13–118, and stores a binary 0 therein.

The count-by-eight signal on line 13–32 is also coupled as one input to OR gate 13–126 thus causing a binary 1 to be produced as a CARRY on line 13–128. This CARRY signal is coupled as one input to AND gate 13–144. Because the output of OR gate 13–138 in stage 4 of the Adder is a binary 0, inverter 13–146 produces a binary 1 output and passes it to AND gate 13–144 which produces a binary 1 output that passes through OR gate 13–148 and is coupled via conductor 13–150 to the SET side of stage 13–152 of the C-register thus causing it to be SET in the manner previously described. Therefore, in the count-by-eight mode with a 0010 input, a count-by-eight has been added and a 1010 stored in the appropriate stages of the C-register shown in FIG. 13.

The Counter in FIG. 13, as stated previously, is actually a 10-bit counter and the remaining six stages not shown operate in a manner similar to the four stages previously described. It should be obvious that the Counter circuit can be modified to count not only by 1, 4, and 8, but by any count, $2^n$, where $n$ is an integer equal to or less than the number of stages in the C-register. It is also obvious that larger word length registers could be used depending upon the needs of the system and, therefore, the integer $n$ could also be larger.

As explained previously in connection with the X and Y registers, shown in FIGS. 11 and 12 respectively, the output from the C-register is gated back either to the Y or the Y register when a $C \rightarrow X_u$ or $C \rightarrow Y$ control signal respectively is present along with the Gate Subtracter and Counter signal. Thus, the signals from the upper 10 stages of either the X or Y register are coupled to the Counter on $\varphi_3$ of the clock signal (Enable Subtractor and Counter) and are either incremented or decremented according to the control signal applied and are gated back to the upper 10 stages of the X or the Y register on $\varphi_4$ of the clock. It should be obvious also from FIG. 13 that the signals from either the X-register or the Y-register can be coupled into the Counter and that either of these signals may be either incremented or decremented depending upon the control signals on lines 13–8 and 13–6 respectively.

FINAL POSITION REGISTER

Figure 14:
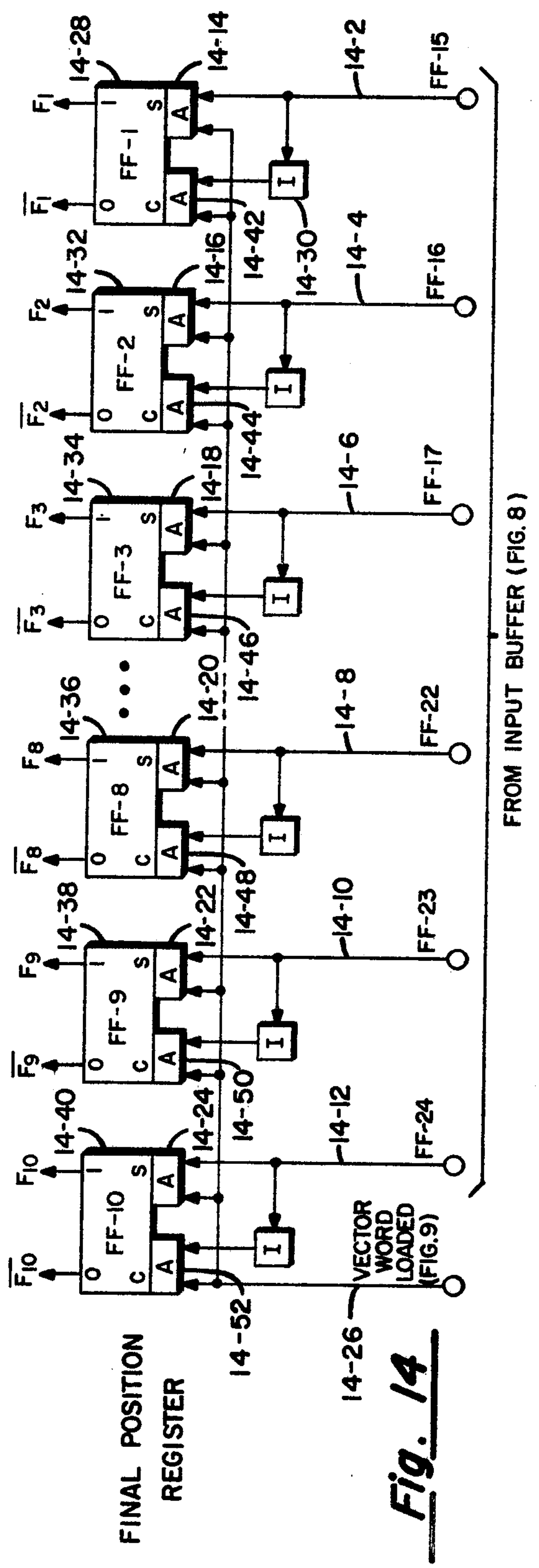
FIG. 14 illustrates the Final Position Register.

The Final Position Register, F, is shows in FIG. 14. It is a 10-bit register which holds the digital value of the final position of the electron beam on the X or Y axis. This final digital value is known as $X_f$ or $Y_f$. $X_f$ or $Y_f$ is the terminating point of the vector on the larger 1024 by 1024 point position matrix along either the X or Y axis. $X_f$ is stored in this register whenever tangent is used and $Y_f$ is stored in this register whenever a cotangent data is used. The data stored in stages 15 through 24 of the Input Buffer Register shown in FIG. 8 are coupled to the input lines 14–2 through 14–12 respectively in FIG. 14. These lines are directly coupled to AND gates 14–14 through 14–24 respectively along with the Vector Word Loaded signal from FIG. 9 on line 14–26 and through inverters to AND gates 14–42 through 14–52 respectively. These AND gates SET or CLEAR their respective flip-flops in the F-register depending upon whether or not the received input signal is a binary 1 or a binary 0. For example, if theinput signal on line 14–2 is a binary 1, AND gate 14–14 produces a binary 1 as an output which SETS flip-flop 14–28. On the other hand, if the input signal on line 14–2 is a binary 0, it is inverted by inverter 14–30 to produce a "1" which is applied to AND gate 14–42 along with the control signal on line 14–26. AND gate 14–42 then CLEARS flip-flop 14–28. Each of the other flip-flops 14–32 through 14–40 is SET or CLEARED in a similar manner. As stated previously, the F-register is a 10-bit position register. However, for purposes of simplicity of the drawings, only six stages are shown in FIG. 14. It is obvious that this register may be made longer or shorter depending upon the system in which it is being used. Thus, in summary, the Final Position Register contains data representing the end-position coordinate along the axis being decremented or incremented and thus defines the point along that axis where the vector shall terminate.

COMPARATOR

FIG. 15 discloses the Comparator circuit. The 10-bit Comparator compares the values of the data stored in the F-register which represents the end-point of the vector with the data stored in the Counter which represents the current position of the vector. It is obvious that when the two values are equal, the vector is completed and a STOP signal must be generated. The inverted exclusive OR circuits 15–2 through 15–20 are well known in the art and operate according to the equation $Z = C\bar{F} + \bar{C}F$. The truth table for this equation is shown in Table II, FIG. 35, in which it can be seen that if a binary 1 is developed at the output, Z, then both C and F must either be 0's or 1's. Since each of the inverter exclusive OR outputs is connected to AND gate 15–22, an output will be produced on line 15–24 whenever all stages of the C-register match the corresponding stages of the F-register. Also, the signal from AND gat 15–22 on line 15–24 is coupled directly to inverter 15–34 which produces a NOT COM- PARE signal on line 15–36. Thus, it will be seen that whenever all stages of the C-register do not compare with the corresponding stages of the F-register, a NOT COMPARE signal is produced on line 15–36. However, when all stages of the C-register compare with the corresponding stages of the F-register, a COMPARE signal is produced on line 15–24. This COMPARE signal and the NOT COMPARE signal are used in FIG. 9 in the control circuitry described therein.

SPEED SHIFT SENSING CIRCUIT

Figure 17:
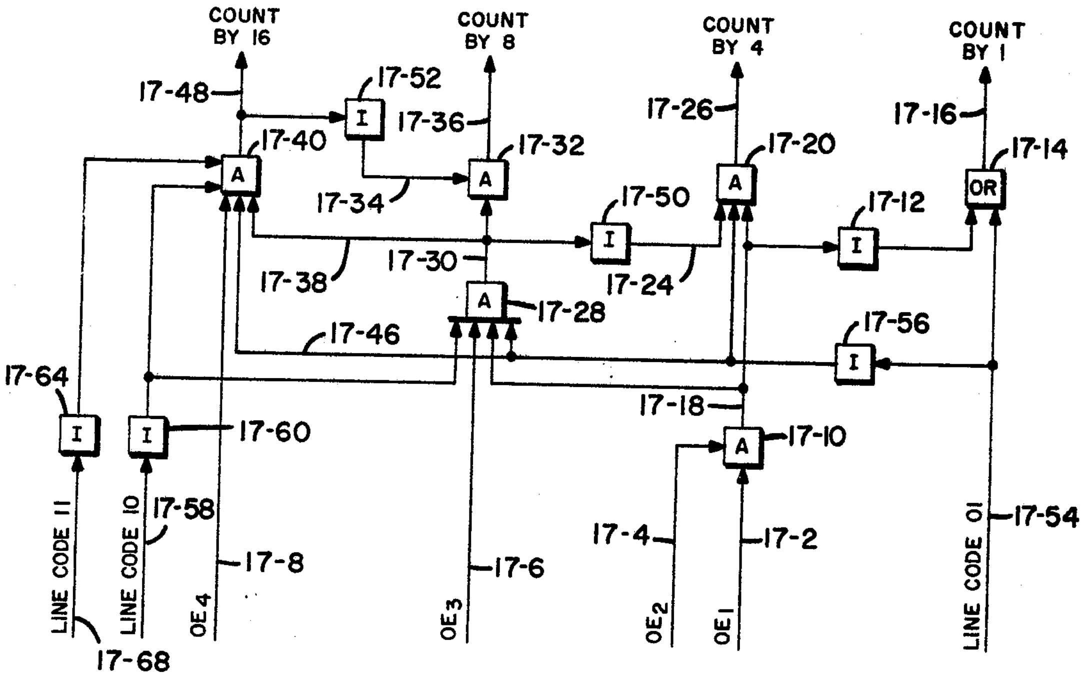
FIG. 17 illustrates the Speed Shift Sensing Circuit.

The speed-shift sensing circuit is shown in FIG. 17. As explained earlier, the purpose of the speed-shift sensing circuit is to speed the production of long vectors. This is accomplished by causing the logic which produces the deflection current to automatically produce one unit of current at a time until the remaining length can be equally divided by 2, 4, 8, 16 or more unit lengths at a time as desired. The theory behind the speed-shift sensing can be explained with the use of FIG. 16 which shows in the left-hand column a 5-bit digital number in the base two system while in the right-hand column appears the corresponding number in the base ten. Assume that a vector is to be drawn from position 0 in the base ten system to position 17 in the base ten system. These two positions correspond to the respective base two positions of 00000 and 10001. It can immediately be seen that the beam cannot be stepped in even (i.e. 2, 4, 8, etc.) increments since the number of divisions between position 0 and position 17 is odd. Therefore, it is obvious that the beam, is stepping in increments of 2, 4, 8, 16 or more units, would over-shoot and go past the end-point. However, it will immediately be seen that if the beam position is incremented by one unit to move it to position 1 in the base ten which corresponds to position 00001 in the base two system, that there is now an even number of increments between position 1 and 17 and thus the beam could step in any even increments up to 16 units. The determination of when the difference between the instant beam position and the final position is an equal number of increments is determined by comparing the lower order bits of the Compare Register which represents the present beam position with the corresponding lower order bits of the Final Position Register. For example, if it is desired to step the beam in increments of two, only the lowest order position of the Counter Register is compared with the lowest order position of the Final Position Register. Thus, if it is desired to go from position 1 to position 4, both expressed in the base ten, then position 1 will represent the present beam position stored in the C-register while position 4 would represent the value stored in the Final Position Register. Obviously, the two lower order bits do not compare and therefore the beam is forced to move one increment to position 2. At this instant, it will be seen that the lowest order bit stored in the Final Position Register, position 4, and the lowest order bit representing the present beam positions, position 2, match since they are both 0's and the beam is now allowed to step by two and it will step immediately to position 4. Assume now that it is desired to count-by-four and that the present beam position is represented by position 1 in the base ten and that the final beam position is represented by position 10 in the base ten. If the beam steps by four immediately, it can be seen that it will go from position 1 to position 5, to position 9 and to position 13 which is beyond the final position that is desired which is represented by position 10. However, if the beam is initially incremented by one unit and caused to move to position 2, it will be seen that if it now moves in increments of four, it will move from position 2, to position 6 and to position 10 which is the desired end-point. It can be determined that position 2 is the correct position in which to begin incrementing by four by comparing the two lowest order bits of the present beam position with the two lowest order bits of the final beam position. In the instant example, when the beam was at position 1, the two lowest order bits were 01. The two lowest order bits of the final position, position 10, is 10. Thus, it will be seen that there is not a match and the beam is caused to be incremented by one unit and it steps to position 2. At this time, the two lowest order bits of the instant beam position are 10 and it will be seen that this matches with the two lowest order bits of the final position, position 10, which is also a 10. Thus, the beam is caused to move in increments of four and moves from position 2 to position 6 to position 10. Following these examples, it will readily be seen that to count-by-eight increments, the three lowest order bits of that instant beam position must be compared with the three lowest order bits of the final beam position. If they do not compare, the beam must be stepped in increments 1, 2 or 4 until the comparison occurs. At this time, the beam may be incremented in the units of eight. In a like manner, if the beam is to be incremented in units of 16, the four lowest order bits of the instant beam position must be compared with the four lowest order bits of the final beam position. When such comparison is made, the beam may then be incremented in units of 16. It is obvious that the beam may be incremented by as many units as desired depending upon the register lengths. Therefore, a register storing *m* bits may be used. Thus, by this means, a writing rate faster than 200,000 inches per second is obtained.

As stated above, the circuitry for determining the rate at which the beam may be incremented is shown in FIG. 17. The outputs on the lowest four negative exclusive ORs in FIG. 15 appear on lines 17–2, 17–4, 17–6 and 17–8. If the two lowest order stages of the C-register and the F-register do not match, AND gate 17–10 will not produce an output and this causes inverter 17–12 to produce an output which is coupled to an OR gate 17–14 to enable a count-by-one signal on line 17–16. It is obvious that if the two lowest order stages of the C and F registers do match, AND gate 17–10 will produce an output on line 17–18 which is coupled to AND gate 17–20 and inverter 17–12. Inverter 17–12 will invert the signal present and thus will not produce an enable signal to cause an output on line 17–16 which is the count-by-one circuit. However, provided the other two inputs to AND gate 17–20 on line 17–22 and 17–24 are present, AND gate 17–20 will produce an output signal which represents the count-by-four signal on line 17–26. If the third lowest order stage of the C and F register match, a signal will be present on line 17–6 which will be coupled to AND gate 17–28. Provided that the two lowest order stages of the C and F registers also match, the output from AND gate 17–10 will also be coupled to AND gate 17–28 and provided that the other two inputs are also enabled, AND gate 17–28 will produce an output on line 17–30 which will be coupled to AND gate 17–32. If the other input to AND gate 17–32 on line 17–34 is enabled, AND gate 17–32 will produce an output on line 17–36 which will represent a count-by-eight signal. If the four lowest order stages of the C and F registers are matched, signals will be present on lines 17–8 and 17–38 both of which will be coupled to AND gate. 17–40. Provided the other three inputs to AND gate 17–40 on lines 17–42, 17–44 and 17–46 are enabled, AND gate 17–40 will produce an output signal on line 17–48 which will represent a count-by-sixteen signal.

As will be described later, the Line Code circuit produces four different codes that represents four different types of lines that may be drawn by the vector generator. Code 00 represents a solid line. Code 01, 10, and 11 each represent a dashed or broken line with the length of the dashes for code 01 being 2/1024 units, the length of the dashes produced by code 01 being 8/1024 units and the length of the dashes produced by code 11 being 16/1024 units. If code 00 is produced by the Line Code circuit, thus indicating a solid line is to be drawn, it may be drawn at any desired speed depending upon the length of the vector. Thus, if the two lowest order bits of the C and F register do not match, OR circuit 17–14 will produce a count-by-one signal on line 17–16. However, if the two lowest order stages do match, inverter 17–12 will prevent a count-by-one signal and AND gate 17–20 will produce a count-by-four signal on line 17–26. If the three lowest order stages of the C and F registers match, then the output from AND gate 17–28 will cause inverter 17–50 to produce an inhibit signal on line 17–24 to prevent AND gate 17–20 from producing a count-by-four signal on line 17–26. However, AND gate 17–32 will produce a county-by-eight signal on line 17–36. If all four of the lowest order stages of the C and F registers compare, AND gate 17–40 will produce an output on line 17–48 which will cause inverter 17–52 to produce an inhibit signal on line 17–34 to prevent AND gate 17–32 from producing a count-by-eight signal on line 17–36. However, the signal on line 17–48 from AND gate 17–40 will be a count-by-sixteen signal.

If Line Code 01 is produced which indicates that the smallest dash line or vector is to be drawn, a signal is produced on line 17–54 which passes through OR gate 17–14 and produces a count-by-one signal on line 17–16. The input signal on line 17–54 also passes through inverter 17–56 to produce an inhibit signal which inhibits AND gates 17–20, 17–28 and 17–40 to prevent these gates from producing count-by-four, count-by-eight, or count-by-sixteen signals.

If a signal appears on line 17–58 which represents Line Code 10 or the next largest deshed line having dashes with a length of 8/1024 inches, inverter 17–60 produces an output on line 17–42 which inhibits both AND gates 17–28 and 17–40 that produce count-by-eight and count-by-sixteen signals. However, AND gate 17–20 will produce a count-by-four signal on line 17–26 provided that the two lowest order stages of the C and F registers match. If a signal representing Line Code 11 or the third largest dashed line with the dashes having a length of 16/1024 inches appears on line 17–62, inverter 17–64 inhibits AND gate 17–40 thus preventing a count-by-sixteen signal on line 17–48. However, provided the three lowest order bits of the C and F registers match, AND gate 17–28 will cause AND gate 17–32 to produce a count-by-eight signal on line 17–36.

Thus, in summary, if Line Code 00 is produced by the Line Code circuitry which represents a solid vector, the Speed Shift Sensing Circuit shown in FIG. 17 will cause the vector to be drawn at the maximum possible speed, count-by-one, count-by-four, count-by-eight, or count-by-sixteen, depending upon which of the four lowest order stages of the C and the F registers match. When either of the count-by-four, count-by-eight, or count-by-sixteen outputs are produced, all lower order counts are inhibited. Further, by the Line Code circuitry producing line codes 01, 10 or 11, one of three types of dashed lines will be produced with the code selected inhibiting all circuits not necessary to the production of the proper count signal. It is obvious that faster speeds could be obtained by utilizing similar circuitry to sense the matching of $n$ of the $m$ bits in the C and F registers.

Thus, the Speed Shift Sensing Circuit controls the beam speed and comprises a plurality of gate means coupled to the comparator for producing an output signal when $n$ of said $m$ bits representing said present beam position compares with $n$ corresponding bits representing said final beam position and control means coupled to said gate means for causing said beam to move in $2^{n-1}$ unit increments along a first axis X (or Y), and along a second axis, Y (or X), in $2^{n-1}$ unit increments times the tangent (or cotangent) of the angle at which the vector is being drawn with respect to said first axis, said control means causing said beam to move in $2^n$ unit increments along said first axis and along said second axis in $2^n$ unit increments times said tangent (or cotangent) when said output signal is produced by said gate means.

It may also be desired to slow the beam down as it approaches an end-point along either the X or Y axis. This may be accomplished by the logic circuitry shown in FIG. 36. In general, if the electron beam is moving in steps of $2^n$ unit increments, then $x-n$ bits of the data representing present beam position are compared with $x-n$ corresponding bits of data representing the final beam position. An output signal is produced when the bits compare. When this output signal is produced, the logic circuitry is caused to produce a signal which causes the beam to move in $2^{n-1}$ unit increments until all bits of data representing the final beam position compare with the $x$ bits of data representing the present beam position. An example may suffice to show the operation. Assume that it is desired to move the beam initially in unit increments of 4. Since $2^n=4$, $n=2$. Assume also that 10 bits are used to represent the final beam position and also the present beam position. Thus, $x=10$. This means that $x-n$ or $10-2=8$ bits that must be compared. The beam will then step along in unit increments of 4 until the compare signal is produced when the 8 bits compare. At this time, a signal is produced which causes the Counter and the Subtractive Type Adder to void the last add of 4 counts and to substitute an add-by-two count. Thus, the beam begins to move in $2^{n-1}=2^{2-1}=2$ unit increments. The comparator now compares $x-n$ bits where $2^n=2$ (since the beam is now moving in unit increments of 2) and, therefore, $n=1$ and $x-n=10-1=9$. Thus, 9 of the 10 bits are now compared and the beam steps along in unit increment of two. When a comparison of the $x-n=9$ bits is obtained, a signal is produced which causes the Counter and the Subtractive Type Adder to void the last add of 2 counts and substitutes an add by 1 count. Thus, the beam begins to move in $$2^{n-1}=2^{1-1}=2^0=1$$

unit increment steps. The comparator now compares the $x-n$ bits where $2^n=1$ (since the beam is now moving in unit increment steps. The comparator now compares the $$n=0 \text{ and } x-n=10-0=10$$

Thus, all 10 bits are now compared and the beam steps along in unit increments of one. When a comparison of the $x-n=10$ bits is obtained, a signal is obtained which indicates the vector is completed and which causes the vector generation process to stop.

The Speed Shift Sensing Circuit of FIG. 36 includes sensing circuit 36–2 which produces the signals to cause the speed shift to take place. Whenever AND gate 36–4 has as inputs a $\phi_3$ timing signal on line 36–6, a draw preset signal on line 36–8 and a not compare signal on line 36–10, it produces a signal which sets flip-flop 36–12 and clears flip-flops 36–14 and 36–16. The outputs of these three flip-flops cause AND gate 36–18 to produce a count-by-four signal on line 36–19. Obviously, more flip-flops could be added to obtain higher count signals such as count-by-eight, count-by-sixteen, etc. As the beam is moving along in unit increments of 4 ($n=2$), AND gate 36–20 receives the outputs from $x-n$, $$10-2=8$$

stages of the comparator, for purposes of this example. When all 8 stages of the Counter representing the present beam position compare with the corresponding 8 stages of the Final Position Register, AND gate 36–20 produces an output on line 36–22. This signal, along with $\phi_1$ clock signal on line 36–24 and the count-by-four signal on line 36–19, causes AND gate 36–26 to produce an output which sets flip-flop 36–14 Flip-flop 36–14 produces outputs which disables AND gate 36–18 to remove the count-by-four signal and enables AND gate 36–28 which produces a count-by-two signal on line 36–30. However, the last add of 4 counts in the Counter caused the 8 stages of the Counter to compare with the corresponding 8 stages of the Final Position Register. These last 4 counts must be voided if the beam is to stop at the vector end-point without an overshoot. This is accomplished by the signal on line 36–22 from AND gate 36–20. It will be remembered that after the Counter and the Subtractive Type Adder have performed their incrementing function, a Gate Subtracter and Counter signal must be present to gate the incremented signals back into the appropriate X or Y register. It is this signal which must be inhibited in order to void the last 4 counts in the Counter and in the Subtractive Type Adder. Thus, the signal on line 36–22 from AND gate 36–20 will not be present if the 8 stages mentioned above do not compare. Inverter 36–32 will therefore produce an output on line 36–34 which is coupled to AND gate 36–36 along with the count-by-four signal on line 36–19 (at this time the count-by-four signal has not been removed). AND gate 36–36 then produces an output which passes through OR gate 36–38 to AND gate 36–40. AND gate 36–40 will produce an output on line 36–36 if the draw flag signal is present on line 36–42 and a $\phi_4$ clock signal is present on line 36–44. This output on line 36–36 is the gating signal which gates the incremented output of the Counter and the Subtractive Type Adder back to the appropriate X or Y register. It will be seen then that when the 8 stages mentioned above compare, AND gate 36–20 produces an output signal on line 36–22 which removes the count-by-four signal and enables the count-by-two signal, and, at the same time, the Gate Counter and Subtractive Type Adder signal is inhibited because the inverter 36–32 will have no output on line 36–34. It is not desired that the beam intensity be enabled at this time and therefore, the output of AND gate 36–20 on line 26–22 is also coupled to AND gate 36–48 along with the count-by-four signal on line 36–19. AND gate 36–48 produces an output which passes through through OR gate 36–50 to clear Intensity Flip-flop 36–52 and remove the intensity enable signal on line 36–54.

Now, as explained earlier, 9 bits of the Counter register and 9 corresponding bits of the Final Position Register are being compared and the beam is moving in increments of 2 units. Until a compare occurs, AND gate 36–56 will not produce an output on line 36–58. This means that Inverter 36–60 will produce an output on line 36–62 which is coupled to AND gate 36–64 along with the count-by-two signal on line 36–30. AND gate 36–64 produces an output which passes through OR gate 36–38 and AND gate 36–40 as previously explained to ENABLE the Gate Counter and Subtractive Type Adder signal. Also, the output of Inverter 36–60 on line 36–62 is coupled to AND gate 36–66 in Intensity Enable circuit 36–38. The count-by-two signal on line 36–30 is also coupled to AND gate 36–66 which produces an output that passes through OR gate 36–70 to AND gate 36–72. AND gate 36–72 will produce an output when it also has as inputs the $\phi_4$ clock signal on line 36–44 and the DRAW FLAG signal on line 36–42. The output of AND gate 36–72 SETS Intensity Flip-flop 36–52 which produces an ENABLE INTENSITY signal on line 36–54. Thus, the beam moves along in increments of two units. When the 9 bits mentioned above compare, the Gate Counter and Subtractive Type Adder signal is inhibited, the ENABLE INTENSITY signal is inhibited and the beam speed is shifted from a count-by-two to a count-by-one-mode. This is accomplished by the signal produced by AND gate 36–56 on line 36–58 when the 9 bits compare. It causes Inverter 36–60 to remove its output on line 36–62 which inhibits the Gate Counter and Subtractive Type Adder signal. It also is coupled to AND gate 36–74 in the Intensity Enable Circuit 36–68 along with the count-by-two signal on line 36–30. AND gate 36–74 produces an output which passes through OR gate 36–50 to CLEAR the Intensity Flip-flop and inhibit the INTENSITY ENABLE signal on line 36–54. At the same time, the output of AND gate 36–56 on line 36–58 is coupled to AND gate 36–76 along with the count-by-two signal on line 36–30 and a $\phi_1$ clock signal on line 36–24. These signals cause AND gate 36–76 to produce an output which SETS flip-flop 36–16 and disables AND gate 36–28 and enables AND gate 36–78. The output from AND gate 36–78 on line 36–80 is a count-by-one signal.

AND gate 36–82 in gating circuit 36–84 has as inputs the count-by-one signal on line 36–80 and the NOT COMPARE signal on line 36–10. This NOT COMPARE signal is present on line 36–10 since all 10 bits of the Counter do not compare with the corresponding 10 bits of the Final Position Register. Thus, AND gate 36–83 couples a "0" signal to Inverter 36–84 which produces a NOT COMPARE signal on line 36–10. This NOT COMPARE signal on line 36–10 is also coupled to AND gate 36–86 in the Intensity Enable circuit 36–68. The count-by-one signal on line 36–80 is also coupled to AND gate 36–86 which produces an output which passes through OR gate 36–70 to SET Intensity Flip-flop 36–52 in the manner previously explained.

The beam therefore steps along in unit increments until all 10 bits of the Counter compare with the corresponding 10 bits of the Final Position Register. At this time, AND gate 36–82 produces an output signal on line 36–88 which is coupled to AND gate 36–90 in Intensity Enable circuit 36–68 along with the count-by-one signal on line 36–80. AND gate 36–90 CLEARS Intensity Flip-flop 36–52 in the manner previously explained thus inhibiting the INTENSITY ENABLE signal. Further, the signal on line 36–88 is coupled to the SET side of the STOP flip-flop where, with the count-by-one signal on line 36–80 and a $\phi_4$ clock signal on line 36–44, AND gate 36–92 produces an output which passes through OR gate 36–94 and SETS STOP flip-flop 36–96 which produces an output on line 36–98. This signal on line 36–98 is coupled to AND gate 36–100 in Sensing Circuit 36–2. When a $\phi_3$ clock signal is also coupled to AND gate 36–100 on line 36–6, AND gate 36–100 produces an output which CLEARS flip-flop 36–12 to produce a signal which inhibits AND gates 36–18, 36–28 and 36–78. The circuit is ready to begin operation when AND gate 36–4 is caused to produce an output signal as explained previously.

It has been shown that the beam speed control circuit for slowing down the beam comprises a comparator including a plurality of gate means coupled to said Counter and said Final Position register for comparing $x-n$ bits of said data representing said present beam position with $x-n$ corresponding bits of data representing said final beam position and producing an output signal when said bits compare, and control means coupled to said comparator for causing said beam to move in $2^n$ unit increments along a first axis and $2^n$ unit increments times the tangent (or cotangent) along a second axis, said unit increment being the smallest step the beam can be moved, said control means causing said beam to move in $2^{n-1}$ unit increments along said first axis and $2^{n-1}$ unit increments times said tangent (or cotangent) along said second axis when said output signal is produced by said comparator.

LINE CODE CIRCUIT

The Line Code circuitry is shown in FIG. 18. The two flip-flops 18–2 and 18–4 are so interconnected to AND gates 18–6, 18–8, 18–10 and 18–12 that depending upon the condition of flip-flops 18–2 and 18–4, one of the AND gates is producing an output. Thus, whenever a Vector Word Loaded signal from FIG. 9 is present on line 18–14 and clock pulse $\phi_1$ is present on line 18–15, the signals $I_2$ and $I_3$ from the Input Buffer Register on lines 18–16 and 18–18 respectively are stored in flip-flops 18–2 and 18–4 respectively. If both flip-flops are set to a 0, AND gate 18–12 produces a line code of 00 on conductor 18–20. If flip-flop 18–4 is set to a 0 and flip-flop 18–2 is set to a 1, AND gate 18–10 produces line code 01 on conductor 18–22. If flip-flop 18–4 is set to a 1 and flip-flop 18–2 is storing a 0. AND gate 18–8 produces line code 10 on conductor 18–24. In a like manner, if both flip-flops 18–2 and 18–4 are storing 1's, AND gate 18–6 will produce line code 11 on conductor 18–26. Of course, the Draw Flag control signal on line 18–28 from FIG. 9 must be present before any of the AND gates 18–6, 18–8, 18–10 or 18–12 are enabled. Both flip-flops 18–2 and 18–4 are cleared by the STOP signal from FIG. 9 on line 18–30. Thus, it can be seen that depending upon the two signals stored in bit positions 2 and 3 of the Vector Word, the circuitry in FIG. 18 will produce an output code which will determine the type of line or vector to be drawn.

TANGENT-COTANGENT REGISTER

The tangent-cotangent register, T, is shown in FIG. 19. As stated previously, this register is an 11-bit register which stores the ratio of the second axis component of the vector to the first axis component. This ratio is either the tangent or the cotangent depending upon the quadrant in which the vector is to be drawn. In any case, the computer determines the quadrant in which the vector will be drawn and, therefore, stores the appropriate values of either the tangent or the cotangent in the stages of the T-register. The value stored in the T-register (or that same value multiplied times 2, 4, 8, 16 or more unit increments) is coupled to the Subtractive Type Adder where it is algebraically added to the data stored in either the X or the Y registers.

The data from the Input Buffer Register, I, is gated into the stages $T_1$ through $T_{11}$ of the tangent-cotangent register, 2, on lines 19–2 through 19–22. The gating signal is the Vector Word Loaded signal on line 19–24 from FIG. 9. If the input signal from the I-register to any one of the stages of the T-register is a binary 1, the Vector Word Loaded signal on line 19–24 causes it to be gated into the SET side of its respective flip-flop. However, if the signal is a binary 0, it passes through an inverter and the Vector Word Loaded signal on line 19–24 causes it to be gated into the CLEAR side of its respective stage.

As stated previously, the Adder is a subtractive type which means that to add the contents of the T-register to the contents of the X or Y register, the complement of the output of the T-register will be gated to the Adder and subtracted from the contents of the X or Y register. Consider for instance, stage $T_1$ of the T-register. The true output of stage $T_1$ appears on line 19–26 while the complement output of stage $T_1$ appears on line 19–28. If it is desired to add the contents of the T-register to the contents of the X or Y register, the complement output of stage $T_1$ on line 19–28 will be coupled through AND gate 19–30 because of the add signal, $\overline{T}\rightarrow S$ on line 19–32. This add signal comes from FIG. 10. If it is desired to subtract the contents of the T-register from the contents of the X or Y register, the true signal from stage $T_1$ on line 19–26 is coupled through AND gate 19–34 by the subtract signal on line 19–36. This subtract signal is the $T\rightarrow S$ signal from FIG. 10. Thus, OR gate 19–38 receives either the true or the complement side of stage $T_1$ depending upon whether an add or subtract signal is present on lines 19–32 and 19–36. This enables algebraic addition to take place. All of the other stages of the T-register operate in the manner described for stage $T_1$.

It has been shown that the speed which the vector is drawn may be increased by causing the Counter Register shown in FIG. 13 to count-by-4, by-8, or by-16 or more depending upon the length of the vector and the desired speed. It is obvious that if the contents of the X or Y registers is being incremented by 4, 8, or 16, then the contents of the Y or X register respectively that is being used to store the tangent or cotangent must also be multiplied by a corresponding count-of-4, 8, or 16 or more. This is accomplished by causing the data stored in the tangent-cotangent register, T, in FIG. 19 to be multiplied by 4, 8, or 16 correspondingly. For purposes of simplicity of the drawings, only the count-by-one and count-by-four circuits are shown in FIG. 19. However, it will be obvious from FIG. 19 how the count-by-eight or count-by-sixteen circuits could be added. If the count-by-one signal from FIG. 17 is present on line 19–40, the data in each of the stages of the T-register is coupled directly to a corresponding stage of the Subtractive Type Adder. Thus, the output from stage $T_1$, either the true or the complement, is coupled through OR gate 19–38 directly to AND gate 19–42 which, because of the count-by-one signal on line 19–40, produces an output on line 19–44 which is coupled directly to stage A–10 of the adder. Inverter 19–46 produces the complement of the signal on line 19–48 which is also coupled to stage S–10 of the adder. Each of the other stages of the T-register is also coupled directly to a corresponding stage in the adder whenever a count-by-one signal is present on line 19–40. However, when a count-by-four signal is present on line 19–50, the output from stage $T_1$ of the Tangent register through OR gate 19–38 is coupled two stages to the left to AND gate 19–52 which produces an output on line 19–54. This signal is coupled directly to stage S–8 of the adder. Thus, it can be seen that when the count-by-four signal is present on line 19–50, the output from each stage of the T-register is shifted to the left two places to effect a multiplication of four and then is coupled directly to corresponding stages of the adder. Thus, if the binary number 00101100110 were stored in the 11 stages of the Tangent Register and which represented the number $358_{10}$, if a count-by-four signal were present on line 19–50 the data would be shifted two places to the left to give a binary number of 0010110011000 which in the base ten represents the number 1432. It will be seen that the number 1432 is four times the number 358 which was originally stored in the stages of the T-register. Thus, the count-by-four operation has been performed. It can then be seen that if it is desired to count-by-eight, the data in the stages of the T-register would have to be shifted three places to the left. In a like manner, to count-by-sixteen, the data in the stages of the T-register would have to be shifted four places to the left.

Thus, to summarize the tangent-cotangent register, it will be seen that the stages of this register store either the tangent or the cotangent as determined by the computer and that associated with this register is the circuitry necessary first to couple either the true or the complement output of each stage with a Subtractive Type Adder and secondly to cause the output data to be shifted as many places to the left as desired to produce the appropriate count.

SUBTRACTIVE TYPE ADDER

FIG. 20 shows the 20-bit Subtractive Type Adder that utilizes 1's complement arithmetic for performing addition and subtraction operations. For the addition of two numbers A and B, the subtractor output, S, is equal to A−(−B). For the subtraction of two numbers, B from A, the subtractor output S is equal to A−B. The subtractor has an end-around-borrow which essentially is another subtract operation but this operation is performed in parallel with the main subtraction thus requiring only 225 nanoseconds for a complete operation. Obviously, it would make no difference what type added was used as long as it performed the desired add and subtract operations. The arithmetic section 20–2 disclosed in FIG. 20 has been described in detail in commonly assigned copending patent application Ser. No. 405,443, filed Oct. 21, 1964, and, therefore, will not be described here. The details of section 20–2 are shown, however in FIG. 37.

The 20-bit Subtractive Type Adder comprises 10 upper stages storing bits which represent integers and 10 lower stages storing bits which represent decimals. Since the tangent or cotangent is always 1 or less, the 10 lowest order stages of the Tangent Register are connected to the 10 lowest order stages of the Subtractive Type Adder which represent the decimals. The eleventh bit of the Tangent Register is coupled to the lowest order stage of the upper 10 stages of the Subtractive Type Adder for the case when the tangent or cotangent is equal to 1. FIG. 21 shows how the respective stages of the T-register are connected to the various stages of the adder or S-register. It must also be remembered however, that as shown in FIG. 19, each stage of the T-register can be shifted two places or more to the left before being used to increment the data in the X or Y register and then the result stored in the S-register. Thus, for example, stage $T_1$ of the T-register may be shifted two places in the left and stored in stages $S_{-8}$ of the S-register. Of course, at the same time, each of the other stages of the T-register are also shifted two places. Thus, stage $T_{11}$ of the T-register would be stored in stage $S_2$ of the S-register. FIG. 22 shows that the lower 10 stages of the X or Y register are connected directly to the corresponding 10 lower stages of the S-register and that the upper 10 stages of the X or Y registers are connected directly to corresponding ones of the upper 10 stages of the S-register. By comparing FIGS. 21 and 22, it will be seen that the data stored in the lower 10 stages of the Tangent Register is added by the S-register to the data in the lower 10 stages of the X or Y register. As the tangent (or cotangent) is added each cycle to the value stored in the lower 10 stages of the X or Y registers, carries may be produced which are coupled into the upper 10 stages of the S-register.

As can be seen from FIG. 20, the true and complement signals from the X-register stages are gated into the adder stages by the X-to-S control signal present on line 20–4 from the control circuit shown in FIG. 10. The true and complement signals from the Y-register stages are gated into the appropriate stages of the adder register wth the Y-to-S control signal on line 20–6 from FIG. 10.

The circuits shown in blocks 20–8 through 20–18 are merely logic circuits for connecting either the X or the Y register to the Subtractive Type Adder. Only blocks 20–8 and 20–10 are shown in detail. The data from the logic circuits is coupled to the corresponding stages of the arithmetic sections 20–2 where the appropriate arithmetic function is performed and the result stored in stages 20–20 through 20–30. Each of the stages, $S_{10}$ through $S_{-10}$, of the Subtractive Type Adder is of the self-clearing type as used in the other registers. Considered stage $S_{-10}$ for instance. If the signal from the arithmetic section 20–2 on line 20–32 is a binary 1, AND gate 20–34 will produce an output which SETS stage 20–20 provided the Enable Subtracter and Counter signal is present on line 20–36. If, however, the signal from the arithmetic section 20–2 on line 20–32 is a binary 0, inverter 20–38 produces an output which is coupled to AND gate 20–40. If the Enable Subtractor and Counter signal is present on line 20–36, AND gate 20–40 produces an output which CLEARS stage 20–20.

Also, since there are only 11 bits stored in the T-register, the $\overline{T}\rightarrow S$ signal is used to provide inputs to stages $S_1$–$S_{10}$ of the Subtractive Type Adder. Thus, when the $\overline{T}\rightarrow S$ signal is present on line 20–42, a "1" is coupled directly to logic circuits 20–16 and 20–18 as inputs on lines 20–44 and 20–46 respectively. Of course, the $\overline{T}\rightarrow S$ signal is also coupled as like inputs to the remaining logic circuits not shown. This $\overline{T}\rightarrow S$ signal also passes through inverter 20–48 on line 20–50 and provides a further input to each of the logic circuits 20–16 and 20–18 as well as to the remaining logic circuits not shown after circuit 20–18.

Although the arithmetic section Subtractive Type Adder shown in copending application Ser. No. 405,443 (also FIG. 37) includes circuitry to perform a half-add operation, this portion of the circuit may be deleted when the adder is used in the present vector generator. Also, although only 6 stages $S_{-10}$, $S_{-9}$, $S_{-1}$, $S_0$, $S_1$ and $S_2$ are shown for purposes of simplicity of the drawings it is obvious that seven other stages exist between stages $S_{-9}$ and $S_{-1}$ and also seven other stages exist after stage $S_2$.

EXAMPLE OF OPERATION

At this point, it may be appropriate to discuss the operation of the vector generator in terms of a specific example. A generalized concept of operation can then be obtained for other operating states of the vector generator for the other octants. The conditions for the example will be as follows: Assume that the initial position of the beam on the X and Y axes is $X=0$, $Y=0$. This defines the beginning point of the vector at the origin of the large 1024 by 1024 major position point matrix. See FIG. 4 for a definition of major position points. Assume that the vector is to be drawn from the origin to a final position or point which is defined as $X=8$ in the base ten, and $Y=6$ in the base ten. This is a point on the large 1024 by 1024 major position point matrix. The vector to be drawn can be expressed as the equation of a straight line as follows: $(Y_2-Y_1)=m(X_2-X_1)$, where $X_1$, $Y_1$, represents the beginning point of the vector and $X_2$, $Y_2$, represents the terminating point of the vector and $m$ represents the slope of the vector. In this example, $X_1=0$, and $Y_1=0$, since the beginning point was at the origin as determined by $X=0$, $Y=0$. The quantity $m$ can be determined by:

$$m=\frac{Y_2-Y_1}{X_2-X_1}=\frac{6-0}{8-0}=\frac{6}{8}=0.75 \quad (1)$$

This value of $m$ is equal to the tangent of the angle between the horizontal axis and the desired vector. The tangent will be used for this example since the vector is to be drawn in the first octant. To represent the tangent, $.75_{10}$, in binary, it is necessary to find values of tangent $\theta$ in the first octant. The first octant will be defined for the values of $0°\leqslant\theta\leqslant45°$. To draw a vector at 45° from the origin to the upper right of the viewing area, the tangent of the 45° angle would be 1024 divided by 1024 which equals 1.0. To be able to terminate a vector at an end-point which is up only one point in Y and is 1024 points long on the X-axis, a tangent of 1 divided by 1024 would be needed. Thus, with a 10-bit binary number, values of tangent from 1/1024 up to 1023/1024 can be obtained. Thus, a tangent of exactly 45° cannot be obtained with the 10-bit number. It is for this reason that the tangent register consists of 11 stages. Therefore, the weighting of the 11-bit number is such that the most significant bit is equal to 1, the next most significant bit is equal to one-half, and so on including the least significant bit which is equal to 1/1024. In the example, the tangent is $.75_{10}$ which is equal to 768/1024. Thus, the number 768 can be represented in binary as an 11-bit number as 01100000000 or $1400_8$.

Since the first octant has been chosen in which to draw the vector, the octant number is represented by all zeros in the Octant Register and 000 is stored in its three stages.

Further, assume that the solid vector is to be drawn and thus the Line Code Register will store the code 00 which represents a solid vector.

With these initial conditions established, consider now the operation according to the operation timing chart shown in FIG. 23. The first cycle is the $I/0$ cycle. On $\phi_1$ of the clock, assuming that the Position Word has been loaded into the Input Buffer Register and has been detected by the control circuitry shown in FIG. 9, gating signals are produced which gate the initial X and Y beam position information into the upper 10 stages of the X and Y registers as well as gating the three zeros representing the octant code into the Octant Register. On $\phi_2$ of the clock, and assuming that the Vector Word has been loaded into the Input Buffer Register and has been detected by the control circuitry shown in FIG. 9, gating signals are produced which gate the 11-bit binary word representing the tangent of .75 into the Tangent Register and also gates the binary word representing the final beam position along the X-axis into the F-register. Also the contents of the X and Y register is gated to the current distribution circuit of the D-A converters. On $\phi_4$ of the clock, the Draw Preset flip-flop shown in the control circuitry in FIG. 9 is SET. This completes the I/0 cycle.

The vector drawing cycle begins on the next $\phi_1$ of the clock at which time the output of the Draw Preset flip-flop shown in the control circuitry in FIG. 9 causes a CLEAR Counter pulse to be produced which clears the stages of the Counter register. On $\phi_3$ of the clock, the Draw Preset flip-flop causes an Enable Subtracter and Counter pulse to gate the signals into the Subtractive Type Adder and the Counter. Based on the truth table for octant 1 as shown in Table I in FIG. 34, the generation process to be accomplished is to increment the upper 10 stages of the X-register by a fixed unit value of 1 for purposes of this example (but which could be 4, 8, 16 or more depending on the length of the vector) and to add the tangent (or a value of 4, 8 or 16 times the tangent or more if necessary) to the data stored in the Y-register such that for every new value stored in the upper 10 stages of the X-register, the Y-register will have a value such that the ratio of Y divided by X is approximately equal to the tangent and thus the desired vector is drawn. For the purposes of this example, the contents of the upper 10 stages of the X-register are gated to the corresponding stages of the Counter on $\phi_3$ of the vector drawing cycle, while the contents of all 20 stages of the Y-register are gated to the Subtractive Type Adder and incremented by the 11 bits of the T-register. Also on $\phi_3$ of the first drawing cycle, the Draw Flag flip-flop in the control circuitry of FIG. 9 is SET. On $\phi_4$ of the vector drawing cycle, the output of the Draw Flag flip-flop is used to produce gating signals which gate the incremented data in the C-register back to the upper 10 stages of the X-register and also gate the data in the S-register, the sum of the data stored in the Y and T registers, back to the Y-register. On the following $\phi_1$, the Intensity flip-flop is set and the contents of the X and Y registers is gated to the deflection circuits. This vector drawing cycle automatically repeats itself and continues until the compare cycle begins.

The compare cycle begins with $\phi_3$ of the clock signal at which time the contents of the upper 10 stages of the X-register are again gated to the Counter and the contents of all 20 stages of the Y-register and the 11 stages of the T-register are added together in the Subtractive Type Adder. It will be remembered that at all times the Compare circuit is continually comparing the contents of the Counter Register with the contents of the Final Position Register. Assume that on $\phi_3$ of the compare cycle when the contents of the upper 10 stages of the X-register are incremented and gated into the Counter that the output of the Counter Register now compares with the data stored in the Final Position Register. At this time, that is $\phi_3$ of the compare cycle, the NOT COMPARE signal from inverter 15–34 on line 15–36 in FIG. 15 is removed from AND gates 9–54 and 9–55 in the control circuitry shown in FIG. 9. This means that on the next $\phi_3$ of the clock no gating signal will be present to allow the contents of the X-register and the Y-register to be gated to the Counter and the Subtractive Type Adder respectively. On $\phi_4$ of the compare cycle, the contents of the Counter is gated back to the upper 10 stages of the X-register and the contents of the Subtractive Type Adder is gated back to all 20 stages of the Y-register. Also on $\phi_4$ the STOP flip-flop is set which produces a vector completed signal on line 9–8. The next cycle begins the stop cycle. On $\phi_3$ of the stop cycle, the output of the STOP flip-flop clears the Draw Preset, and Draw Flag flip-flop and the Intensity flip-flop and the control circuitry is set to start another vector and the present vector is completed. As stated earlier but not shown in this example, when long vectors are being drawn, the vector generator speeds up the process by a factor of 4, 8, 16 or more to provide a faster writing rate thus reducing the time required to draw a vector. The speed-up is accomplished by shifting the T-register input to the Adder by 2, 3 or 4 positions thus effectively multiplying by 4, 8 or 16 before each addition or subtraction. To provide the same scaling for the upper 10 stages of the X or Y registers, whichever is not being used by the Adder, the Counter Register, C, is caused to count by 4, 8, 16 or more instead of 1.

In the present example, since the initial X point is 0 and the final X point is 8 units, and since the beam is to move in unit increments or the count-by-one mode, the vector drawing cycle must be repeated eight times in order to complete the vector. Only one vector drawing cycle would be needed if the count-by-eight mode were used or two cycles of the count-by-four mode were used. FIG. 24 shows the contents of the X-register and the Y-register for each of the eight times the vector drawing cycle is repeated while also showing the contents of the T-register which is added to the Y-register during each of these cycles. It will be seen that all zeros are stored in all 20 stages of both the X and the Y registers for the initial position. It will also be seen that the binary word representing a tangent of $.75_{20}$ is stored in the Tangent Register. During the first vector drawing cycle, $T_1$, the upper 10 bits of the X-register are gated into the Counter where they are incremented by one and returned to the upper 10 stages of the X-register. Thus, it will be seen that at time $T_1$, a count of 1 is stored in the upper 10-bits of the X-register. During the same cycle the Tangent Register contents have been added to all zeros of the Y-register by the Subtractive Type Adder and restored to the Y-register. Thus, it will be seen that at time $T_1$, the lower 10-bits of the Y-register now contains exactly the same information as the lower 10-bits of the T- register. During the second vector drawing cycle, $T_2$, the binary 1 stored in the upper 10 stages of the X-register is incremented by one count and stored in the Counter. It is then returned to the upper 10-bits of the X-register where now there is stored a binary 2. At the same time, the contents of the Y-register which contains $.75_{10}$ therein, is added to the $.75_{10}$ value stored in the Tangent Register to cause a value of $1.5_{10}$ to be returned to and stored in the Y-register. It will be noted that by adding the contents of the T-register to the lower 10-bits of the Y-register a carry is obtained which is now stored in the lowest order stage of the upper 10-bits of the Y-register. This process continues for the next six vector drawing cycles and during each cycle, the upper 10-bits of the X-register is incremented by one and the 20-bits of the Y-register are incremented by $.75_{10}$. It will be seen that during the eighth vector drawing cycle, $T_8$, the contents of the upper 10-stages of the X-register compare with the contents of the 10-bits of the Final Position Register. As stated previously, this comparison causes output signals to be produced which stop operation of the vector generator. It will be noted that in the final position, the upper 10 stages of the X-register store $8_{10}$ while the upper 10 stages of the Y-register store $6_{10}$ which meet the initial requirements set up for this example.

It should also be pointed out at this time that the upper 10 stages of the X and Y registers and the three most significant stages of the lower 10 stages of the X and Y registers are used to provide control signals to the cathode ray tube. Thus, in the example just given and referring to FIG. 24, only stages $2^0$ through $2^9$, the upper 10 stages, and $2^{-1}$, $2^{-2}$ and $2^{-3}$ of the lower 10 stages of the Y-register are coupled to the D-to-A converter which controls the position of the electron beam along the Y-axis. The last seven bits of the Y-register, bits $2^{-4}$ through $2^{-10}$ are used, as explained previously, for purposes of accuracy only. By referring to FIG. 4, it will be recalled that the upper 10-bits of the X and Y register determine major position points on the cathode ray tube. Thus, in the above example, the quantity $6_{10}$ stored in the Y-register as the final position of the beam on the Y-axis represents six major position points along the Y-axis. The three most significant bits of the lower 10-bits of the Y-register represent minor position points as shown in FIG. 4 and in the above example during the first vector drawing cycle, $T_1$, the three most significant bits of the lower 10-bits of the Y-register store the quantity $6_{10}$ which means that the beam must move 6 of the 8 minor position points along t he Y-axis. 6/8 equals, of course, .75 which is the tangent used in this example. The seven remaining bits of the Y-register are used to store information representing various positions within the minor position points. However, since for purposes of visual indication, only eight minor position points need be noted, the seven least significant bits are merely stored until such time as their sums are great enough to carry over into the three most significant stages of the lower 10 stages of the Y-register where they are used to correct the direction in which the beam is traveling. This causes a slope change as shown in FIG. 4 which cannot be seen by the human eye.

BEAM BLANKING CONTROL CIRCUIT

The Beam Blanking Control Circuit is shown in FIG. 25. In the preferred embodiment of the invention, four types of lines or vectors may be drawn, that is, a solid line, a dashed line with the dashes having a length of 2/1024 units, a second dashed line with the dashes having a length of 8/1024 units, and a third dashed line with the dashes having a length of 16/1024 units. A method must be provided for holding the intensity on while drawing the solid line and for blanking the beam at appropriate times during the drawing of the dashed lines. The circuit in FIG. 25 accomplishes this purpose. Thus, whenever line code 00, which indicates a solid line or vector is to be drawn, is present on line 25–2, the signal passes through OR gate 25–4 and is present on line 25–6 as an Intensity Enable signal which is connected to the intensity control circuits in FIG. 28 to enable the beam intensity.

To obtain the smallest dashed line, the lowest order stage of the upper 10 stages of either the X or the Y register provides an output on line 25–8 or 25–10 respectively. As the lowest order stage is always alternately SET and CLEARED, this signal can be used to provide a vector with the shortest increments to form a dashed line. Thus, whenever it is the X-register that is being used as the main register, the presence of the $X_u$-to-C control signal on line 25–12 causes the signal from the lowest order stage of the upper 10 stages of the X-register on line 25–8 to be passed through AND gate 25–14 and OR gate 25–16 to AND gate 25–18. If line code 01, which represents the smallest dashed line, is present on line 25–20, AND gate 25–18 produces an enable signal on line 25–22 which passes through OR gate 25–4 and is coupled to the intensity control unit on line 25–6. Since, as stated previously, the lowest order stage of the upper 10 stages of the X-register is changing states every 75 nanoseconds, this means that a pulse appears on line 25–8 every 75 nanoseconds and which also means that the Enable signal from OR gate 25–4 on line 25–6 is a series of pulses 75 nanoseconds in length which are separated by spaces 75 nanoseconds in length. A similar operation occurs whenever the Y-register is being used as the main register and Yu→C control signal is present on line 25–24. This causes AND gate 25–26 to pass the signal received on line 25–10 from the lowest order stage of the upper 10 stages of the Y-register. Again, these signals are 75 nanoseconds in length separated by spaces of 75 nanoseconds in length.

In a similar manner, the output of stage three of the uppermost 10 stages of the X-register is coupled to AND gate 25–32 via conductor 25–28 and the output of stage three of the uppermost 10 stages of the Y-register is connected to AND gate 25–34 via conductor 25–30. Whenever the proper control signal is present on line 25–12 or line 25–24, either AND gate 25–32 or AND gate 25–34 will produce an output which passes through OR gate 25–36 and is coupled to AND gate 25–38. Also coupled to AND gate 25–38 is a signal representing line code 10 on line 25–40. These two input signals allow AND gate 25–38 to produce an Enable signal which passes through OR gate 25–4 and is coupled to the intensity control circuit on line 25–6. Since stage three of the upper 10 stages of either the X or Y register will change stages only once for each 4 times the lowest order stage of the upper 10 stages changes states, the signals present on lines 25–28 and 25–30 will be 4 times 75 nanoseconds or 300 nanoseconds in length. This means that the Enable signal from OR gate 25–4 will be a series of pulses 300 nanoseconds in length separated by spaces 300 nanoseconds in length.

It is obvious that the output of the fourth stage of the upper 10 stages of either the X or the Y register which store the binary value of $2^4$, or 16, will change states once while the lowest significant stage will change 8 times. Thus, the pulses from the fourth stage of the upper 10 stages of the X-register present on line 25–42, and the output from the fourth stage of the upper 10 stages of the Y-register present on line 25–44 will be 1200 nanoseconds in length. These signals when accompanied by the correct control signal on line 25–12 or 25–24 will cause either AND gate 25–46 or 25–48 to produce an output which is coupled to OR gate 25–50. The output from OR gate 25–50 is coupled to AND gate 25–52 along with the line code signal 11 on conductor 25–54. The presence of both the signals cause AND gate 25–52 to produce an Enable signal which is passed through OR gate 25–4 and connected to the intensity control circuits through line 25–6. Thus, the output on line 25–6 would be a series of pulses 600 nanoseconds in length separated by spaces 600 nanoseconds in length.

FIG. 26 shows the four types of lines or vectors which may be drawn with the preferred embodiment of the disclosed vector generator and the codes which cause that particular vector to be drawn. However, it is obvious that by utilizing more stages in the Line Code Register, a greater number of output combinations may be obtained which could be used to cause a greater number of different types of lines or vectors to be drawn. However, for the purposes of the present invention, four types of lines have been deemed to be a sufficient number.

VECTOR INTENSITY

The intensity of the vectors varies according to the tangent of the angle at which the vector is being drawn and the vector drawing speed. It is obvious that the shortest vector will occur at an angle of 0° while the longest vector will occur at an angle of 45° because the tangent at 45° is 1. Thus, the greatest intensity should occur at 45° while the least intensity should occur at 0°. FIG. 27 is a table which shows how the vector intensity was determined. The left-half of the column headed "Tangent Register" shows the information stored by stages $T_8$, $T_9$, $T_{10}$, and $T_{11}$ of the Tangent Register for 9 different angles. The right-half of the column shows the contents of these registers in the base ten. The column with the heading "Angle" shows the various angles for the data stored in stages $T_8$ through $T_{11}$ and the column headed "Length" shows the length of the vector in units as it varies from 0° to 45°. Since there is very little difference in length in the first four angles, that is, 0° through 20.5°, it was arbitrarily decided to use bits $T_{10}$ and $T_{11}$ to set up an initial intensity level of one unit. These first four angles are designed as Group I under the column entitled "Group" and have the same intensity. They are detected by the zeros on stage $T_{10}$ and $T_{11}$. It was also arbitrarily decided to call the fifth and sixth angles Group II and to set up an intensity level of 1.15 units which is in proportion to the average length of the vectors of Group II. They are detected by a "0" in stage $T_9$ and a "1" in stage $T_{10}$. Group III includes merely the vector drawn at the seventh angle and since it has a unit length of 1.25 it is also decided to give it an intensity level of 1.25 units. This condition is detected by a "0" in stage $T_8$, and a "1" in stages $T_9$ and $T_{10}$. Finally, Group IV was chosen as including angles eight and nine and the intensity level was arbitrarily selected as 1.35 units. Bits $T_8$, $T_9$ and $T_{10}$, all "1's", or bit $T_{11}$ were selected to determine when these conditions occur.

INTENSITY CONTROL CIRCUIT

FIG. 28 shows the Intensity Control Circuit which utilizes the circuitry necessary to bring about the conditions specified in FIG. 27. The Enable signal from the Beam Blanking Circuit in FIG. 25 is present on line 28–2. It is this signal which determines the tpye of vector to be drawn, i.e., a solid line or one of three dashed lines. This signal is amplified by amplifier 28–4 and applied to the base of transistor 28–6. The emitter of transistor 28–6 is connected to ground via conductor 28–8 while variable resistor 28–10 connects the collector of transistor 28–6 to the emitter of transistor 28–12. The base of transistor 28–12 is connected to a first negative source of voltage, $V_1$, while the collector is connected through resistor 28–14 to a second negative source of voltage, $V_2$. The collector is also connected to the intensity control grid of the cathode ray tube. Also, resistors $R_1$ through $R_8$ connect the collectors of transistors 28–16 through 28–30 respectively in parallel to the emitter of transistor 28–12. When each of the transistors 28–16 through 28–30 and transistor 28–6 is in a nonconducting state, transistor 28–12 has no path through which current can flow and therefore is also nonconducting. In this state, no voltage drop occurs across resistor 28–14 and the full value of negative voltage source $V_2$, approximately −75 volts in the preferred embodiment, is applied to the intensity control grid of the cathode ray tube thus effectively blanking the tube. This intensity blanking will occur until a threshold of approximately −50 volts is applied to the control grid. As the voltage goes more positive beyond this point, the beam intensity begins to appear on the face of the cathode ray tube. When transistor 28–6 is enabled through the beam blanking control signal on line 28–2 from FIG. 25, resistor 28–10 is initially preset to cause the potential on the collector of transistor 28–12 to be equal to the threshold voltage discussed above. This means that the cathode ray tube is in the blanked condition. However, when any of the other transistors 28–16 through 28–30 conducts, the voltage on the collector of transistor 28–12 falls below the threshold and the beam is unblanked. The amount that the voltage on the collector of transistor 28–12 will fall below the threshold is determined by the amount of current which flows through transistor 28–12 which, in turn, is determined by which of the transistors 28–16 through 28–30 is conducting. Each of these transistors has one of the resistors $R_1$ through $R_8$, respectively, in its collector circuit and each of these resistors has a resistance value which will cause the proper amount of current to flow through transistor 28–12 to cause the proper intensity to occur.

Transistors 28–16, 28–18, 28–20 and 28–22 are used to vary the intensity when the beam is to be moved one increment at a time while transistors 28–24, 28–26, 28–28 and 28–30 are used to increase the intensity variation when the beam is to move in increments of four units. Obviously, if the beam were to move in increments of 8 or 16 units or more, a further increase in intensity would be required and, therefore, more transistors would have to be used in the circuit of FIG. 28 with the proper resistors in their collector circuits to cause a proper amount of current to flow through transistor 28–12.

AND gate 28–32 will conduct when it has as its inputs a count-by-one signal from FIG. 17 on conductor 28–34 and an Intensity Level Select signal on line 28–36 from the Intensity flip-flop in the control circuitry in FIG. 9. The output from AND gate 28–32 on conductor 28–46 provides one enable to AND gates 28–38, 28–40, 28–42 and 28–44. Referring again to the FIG. 27, in the left-half of the column headed "Tangent Register," it will be seen that for Group I, bits $T_{10}$ and $T_{11}$ are both zeros. Thus, for any one of these four angles, both stages $T_{10}$ and $T_{11}$ will produce complement, $\overline{T}$, or NOT outputs. When these NOT outputs are present on lines 28–47 and 28–48, in FIG. 28, AND gate 28–38 produces an output signal which is amplified by amplifiers 28–50 and coupled to the base of transistor 28–16 thus causing it to conduct. The value of $R_1$ which connects the collector of transistor 28–16 to the emitter of transistor 28–12 causes the proper amount of current to flow through these two transistors to produce unit intensity on the cathode ray tube.

Referring again to FIG. 27, Group II of the signals representing the fifth and sixth angles both have a bit present in stage $T_{10}$ and no bit present in stage $T_9$. Thus, these two stages can be used to represent Group II to cause the desired intensity level on the cathode ray tube. Referring again to FIG. 28, when the true signal from stage $T_{10}$ is present on line 28–52 and the complement signal is present from stage $T_9$ on line 28–54, AND gate 28–40 produces an output signal which is amplified by amplifier 28–56 and applied to the base of transistor 28–18. Resistor $R_2$ which connects the collector of transistor 28–18 to the emitter of transistor 28–12 is of the proper value to cause the current flow through these two transistors to cause an intensity of 1.15 units on the face of the cathode ray tube.

In a like manner, when the complement signal from Tangent Register indicates a tangent of 1, and therefore, state $T_9$ is present on line 28–60 and the true signal is present from state $T_{10}$ on line 28–52, AND gate 28–42 produces an output signal which is amplified by amplifier 28–62 and applied to the base of transistor 28–20. Again, resistor $R_3$ in the collector circuit of transistor 28–20 is of the proper value to cause an intensity of 1.25 units on the face of the cathode ray tube.

Also, in a like manner, when the true signal from stage $T_8$ is present on line 28–64, the true signal from stage $T_9$ is present on line 28–66 and the true signal from stage $T_{10}$ is present on line 28–68, AND gate 28–70 produces an output signal which passes through OR gate 28–72 and is coupled to AND gate 28–44. AND gate 28–44 produces an output signal which is amplified by amplifier 28–74 and which is coupled to the base of transistor 28–22. Again, resistor $R_4$ in the collector circuit of transistor 28–22 is of the proper value to cause an intensity of 1.35 units on the face of the cathode ray tube. As previously discussed, a binary 1 stored in stage $T_{11}$ of the Tangent Register indicates a tangent of 1, and therefore, an angle of 45°. It has also been stated that the longest vector will occur at an angle of 45° and therefore the intensity should be the greatest. According to FIG. 27, this intensity has also been chosen as 1.35 units and is obtained in FIG. 28 by the true signal from stage $T_{11}$ on conductor 28–76 which passes through OR gate 28–72, AND gate 28–44 and amplifier 28–74 to the base of transistor 28–22. Resistor $R_4$ operates in a manner previously described to cause an intensity of 1.35 units on the face of the cathode ray tube.

If it is desired to count-by-four, the intensity must be four times as bright for the same angle as that required when counting by one unit. Thus, intensity must increase with an increase in speed. This is accomplished with the count-by-four signal on line 28–78 and the Intensity Level Select signal on line 28–80 which cause AND gate 28–82 to produce an output which is coupled to the four AND gates 28–84, 28–86, 28–88 and 28–90. The output of AND gates 28–84, 28–86, 28–88 and 28–90 are amplified by the respective amplifiers 28–92, 28–94, 28–96 and 28–98 and connected to the base of the respective transistors 28–24, 28–26, 28–28 and 28–30 to control their conduction. Resistor $R_5$ in the collector circuit of transistor 28–24 has a resistance value one-fourth of that of resistor $R_1$ in the collector circuit of transistor 28–16. In a like manner, resistor $R_6$ has a resistance value one-fourth of resistor $R_2$, resistor $R_7$ has a value one-fourth of resistor $R_3$ and resistor $R_8$ has a resistance of one-fourth of resistor $R_4$. Thus, it can be seen that when transistors 28–24, 28–26, 28–28 and 28–30 are caused to conduct, they will cause four times as great an amount of current to flow through transistor 28–12 as will their respective transistors 28–16, 28–18, 28–20 and 28–22. It will be noted that AND gate 28–38 and AND gate 28–84 have the same input signals with the exception of the count-by-one signal and the count-by-four signal. In a like manner, except for the count-by-one and count-by-four signals, AND gate 28–40 has the same inputs as AND gate 28–86, AND gate 28–42 has the same inputs as AND gate 28–88 and AND gate 28–44 has the same inputs as AND gate 28–90. It will therefore be seen that transistors 28–16 through 28–22 are the count-by-one transistors while transistors 28–24 through 28–30 are the count-by-four transistors.

Thus, in summary it will be seen that the intensity control circuit shown in FIG. 8 controls the intensity of the vectors according to the angle at which the vectors are drawn (as determined by the data stored in the tangent-cotangent register) and the speed at which the vector is being drawn. The two sets of transistors 28–16 through 28–22 and 28–24 through 28–30, determine the intensity according to whether the vectors are being drawn in the count-by-one mode (or speed) or the count-by-four mode (or speed). The four transistors in each group determine the intensity of the vector according to the angle to which it is being drawn. The preset transistor 28–6 blanks or unblanks the cathode ray tube at a level depending upon the setting of the preset resistor 28–10 which determines the amount of current initially drawn through output transistor 28–12. Resistor 28–10 is set such that when transistor 28–6 is conducting, the voltage on the collector of transistor 28–12 is just below the threshold at which the cathode ray tube is unblanked. Thus, when any of the other transistors are turned on the voltage on the collector of transistor 28–12 falls below the blanking threshold and the beam begins to trace on the face of the cathode ray tube.

DIGITAL–TO–ANALOG CONVERTER

The digital-to-analog converter utilized in the vector generator is shown in FIG. 29 and consists of the 13 input lines from either the SET or CLEAR side of either the X or the Y register, a current distribution circuit 29–2, a current metering circuit 29–8, and a power amplifier 29–6. The output of the power amplifier is coupled to the yoke winding 29–10 of the cathode ray tube. If the deflection windings are operated in push-pull as they are in the preferred embodiment of the present invention, four such circuits shown in FIG. 29 are utilized. Two circuits are utilized in push-pull for the X-deflection circuits and two for the Y-deflection circuits.

It is obvious that the 13 bits from the X or Y registers could be coupled directly to a digital-to-analog converter current metering circuit but it is inadvisable since the presence of bits $2^5$ through $2^9$ cause large increments of currents to be switched by the transistors in the digital-to-analog converter. It has been found that large increments of current prevent the transistors from switching fast enough; therefore current distribution circuit 29–2 is utilized. The first eight flip-flops of the current distribution circuit receive directly the inputs of stages $2^{-1}$ through $2^{-3}$ and $2^0$ through $2^4$. However, bits $2^5$ through $2^9$ are coupled to logic circuit 29–4 which produces 31 different outputs to be stored in the 31 remaining flip-flops of the current distribution circuit. These 31 different outputs cause current metering circuit 29–8 to produce 31 increments of currents with each increment porviding 32 units for a total of 992 units of current. Adding the 31 units from the first eight flip-flops of the current distribution circuit, the current metering circuit is capable of producing 1023 units of current with the addition of fractional increments of one-half, one-fourth, and one-eighth unit. All of the 39 current metering circuits are of a well-known type in which the slope or rise and fall time of the output signal is constant and is of the type disclosed in Pat. No. 3,192,403, patented June 29, 1965, and issued to Bernfeld et al. The desired embodiment is disclosed in commonly assigned copending application Ser. No. 569,181, filed Aug. 1, 1966, now U.S. Patent 3,434,135d. In order to enable power amplifier 29–6 to better handle the current supplied to it, the outputs of the current metering circuit 29–8 are divided and connected in five parallel groups.

CURRENT DISTRIBUTION CIRCUIT

FIG. 30 is a diagram of a current distribution circuit showing five flip-flop receiving data directly from the X or Y registers and six flip-flops connected to the logic circuit that causes each of the flip-flops to produce a signal representing 32 increments of current whenever the particular flip-flop is set. Flip-flops 30–2, 30–4 and 30–6 receive data directly from stages $2^{-3}$, $2^{-2}$ and $2^{-1}$ respectively of the X or Y register. Flip-flops 30–8 through 30–10 receive information directly from stages $2^0$ through $2^4$ of the X or Y registers respectively. During the I/O cycle, the data stored in the X and Y registers which represent the original of the vector should be coupled to the D/A converter in order to move the beam to the proper position to begin drawing the vector. This is accomplished by the Vector Word Loaded signal on line 30–20 from FIG. 9. This signal passes through OR gate 30–22 on line 30–12 to the AND gates on both the SET and CLEAR side of each flip-flop and provides the enable signal which causes the data from the X or Y register to be stored in the corresponding flip-flops of the Current Distribution Circuit. At this time, however, the Intensity Flip-flop shown in FIG. 9 is not SET, and therefore, the beam can move to the position of the vector origin without being seen. However, during each Vector Drawing cycle, as the beam moves away from the vector origin, the data stored in the X and Y registers must be coupled to the D/A converter. Thus, when the Intensity flip-flop is SET on the first $\phi_1$ of the Vector Drawing cycle after the Draw Flag flip-flop in FIG. 9 is SET, the Intensity Level Select signal on line 30–24 and the $\phi_1$ clock signal on line 30–26 cause AND gate 30–28 to produce an output which passes through OR gate 30–22 on line 30–12 to the AND gates on both the SET and CLEAR side of each flip-flop and provides the enable signal which causes the data from the X or Y register to be stored in the corresponding flip-flops of the Current Distribution Circuit. Thus, as the X or Y register is incremented each Vector Drawing Cycle, the incremented data is transferred to the D/A converter to cause the beam to move accordingly. If a binary "1" is present on any of the lines from the X or Y register, the enable signal on line 29–12 causes the binary "1" to set the flip-flop to which it is associated and, thus, stored the "1" therein. If a binary 0 is present on any of the lines from the X or Y registers, an inverter which is connected to the CLEAR side of the flip-flop causes the binary "1" to be produced which, when the enable signal is present on line 30–12, causes the respective flip-flops to be CLEARED and thus a 0 is stored therein. Input lines from stages $2^5$ through $2^9$ from the X or Y registers are applied to the logic circuit 30–14. For purposes of simplicity of the drawings, only six stages are shown connected to the logic circuit. However, the other 25 remaining stages have inputs $2^5$ through $2^9$ coupled to them by the logic circuit 30–14 as shown in the table in FIG. 31. Thus, flip-flop 30–16 will produce an output whenever any of stages $2^5$ through $2^9$ of the X or Y registers produce an output signal. In a similar manner, flip-flop 30–18 will produce an output whenever it has an input signal from any of the stages $2^6$ through $2^9$ of the X or Y register. The combination of inputs such as required for the other flip-flops to produce an output signal can readily be determined by the table shown in FIG. 31 and so it can be seen that if a signal is present from stage $2^6$ of the X or Y register, both flip-flops 30–16 and 30–18 will produce an output and since each stage will produce a signal representing 32 increments of currents, the signal from stage $2^6$ of the X or Y register will cause output signals representing 64 increments of current. In a like manner, each of the other stages producing an output signal will cause various combinations of the flip-flop to produce output signals representing the desired increments of current.

Thus, the current distribution circuit comprises a first group of n+p bistable circuits coupled to said first storage means (the X or Y register) for receiving major position bits from *n* of *j* (5 of 10 in the preferred embodiment) bistable circuits and minor position bits from *p* (3 in the preferred embodiment) bistable circuits and producing output signals representing $$2^n+\sum_{p=1}^{p=i} 2^{-p}$$

unit increments of current (32+.875 in the preferred embodiment) where $n>0$, $p>0$ and *i* is an integer>1, a logic circuit coupled to said first storage means for receiving the remaining *j-n* major position bits (5 in the preferred embodiment) and producing *r* control signals (31 in the preferred embodiment) where $r=2^{j-n}—1$, and a second group of *r* bistable circuits coupled to said logic circuit for receiving said *r* control signals and porducing *r* output signals each representing an increment of current I where $$I=\frac{2^j-2^n}{r}$$

POWER AMPLIFIER

FIG. 32 shows the details of the power amplifier circuit which is used to drive the cathode ray tube deflection coils. It shows a plurality of transistors 32–2 through 32–10 forming a driving circuit. They are connected with their outputs in parallel and all of them feed yoke winding 32-12 which may be either the horizontal or vertical deflection coil. Circuit 32–14 is the reference voltage circuit which determines how much current will flow through the metering resistors in the current metering circuits. The output of the reference voltage circuit 32–14 is connected to the base of driving transistor 32–16 which is coupled in the Darlington configuration with each of the other transistors 32–2 through 32–10. This circuit configuration allows a high gain to be obtained between the reference voltage and the voltage applied to the deflection coil of the cathode ray tube and at the same time isolates the load from the reference circuit so that any changes in the load does not affect the reference voltage. Normally, all of the emitters of transistors 32–2 through 32–10 would be connected directly in parallel and would receive all of the outputs from the current metering circuit in parallel. However, it has been found that there is a tendency for one of the transistors 32–2 through 32–10 to conduct a great deal more current than the others and thus cause its failure in the circuit prematurely. In order to prevent this and to enable each of the transistors to assume its share of the load, the output signals from the current metering circuit are divided into five parallel groups with each group being directly connected to the emitter of the particular transistor. However, it is still possible that one group may overwork the particular transistor to which it is connected. Therefore, in an effort to better share the current among the transistors 32–2 through 32–10, each of the groups connected to the emitter of any one particular transistor is also coupled through a resistance to each of the emitters of the other transistors. Thus, the signal from Group I on line 32–18 is not only coupled directly to the emitter of transistor 32–2 but is also coupled to the emitter of transistor 32–4 through resistor 32–20, to the emitter of transistor 32–6 through resistor 32–22, through the transistor 32–8 through resistor 32–24 and to the emitter of transistor 32–10 through resistor 32–26. As explained previously, the signals from the other groups are connected in a like manner to the emitters of the transistors. This, then, causes another current distribution to the five current carrying transistors 32–2 through 32–10 and lengthens the life of the components.

Thus, the power amplifier is a driving means comprising a plurality of transistors forming a driving circuit and having their collectors connected in parallel to the yoke winding of the cathode ray tube, a like plurality of input terminals for receiving increments of current from said current metering circuit, each of said input terminals being directly connected to the emitter of a corresponding one of said plurality of transistors, and, through resistance means, to each of the emitters of the remainder of the transistors, said interconnection of input terminals with said plurality of transistors preventing any one of said transistors from excessive conduction and thus premature failure, a driving transistor with its collector connected to the collector of each of the plurality of transistors and its emitter connected to the base of each of the plurality of transistors and a reference voltage circuit supplying base current to said driving transistor, said interconnection between said driving transistor and said plurality of transistors enabling a high gain to be obtained between said base current and said increments of current received by said input terminals and at the same time isolating said input terminals from said reference voltage circuit so that any changes in the current at the input terminals does not affect the reference voltage.

The digital-to-analog converters are used to cause the cathode ray tube electron beam to be positioned or deflected in the X or Y directions by providing currents from the deflection circuitry of the cathode ray tube which are proportional to the values stored in the corresponding X and Y registers. Each stage of the D-to-A converter is unique in that when the stage receives a step function input, the output for that stage is a ramp. This ramp is the rise time or fall time for that stage. Each stage has a rise time equal to its fall time. For a 75 nanosecond rise time period, if two stages receive successive step inputs, the output of the first stage would be a ramp reaching a final value of one unit of current at the end of 75 nanoseconds and the next high order stage in the next period of 75 nanoseconds would reach a value of two units of current. An example of this principle is shown in FIG. 33. There for ease of illustration, it is assumed that the least significant bit of the X or Y register connected to the digital-to-analog converter is received from stage $2^0$. This stage is toggled or caused to change states every 75 nanoseconds. The corresponding waveforms that would result from such a counting operation for three stages are shown. If the values of the current for each stage of the digital-to-analog converter are added point by point for each value of time, the result would be a smooth straight line ramp as shown. Thus, when waveform A of FIG. 33 is applied to the current distribution circuit, the corresponding stage of the current metering circuit begins to produce an output with a constant ramp that reaches a value of one unit of current at the end of 75 nanoseconds as shown in waveform B. Assume that simultaneously with the ramp shown as waveform B, waveform C is applied to stage $2^1$ of the current distribution circuit thus causing the output of the corresponding current metering circuit to have a waveform shown in FIG. D. This waveform reaches a value of two units of current in the second 75 nanosecond interval. Simultaneously, if waveform E is applied to stage $2^2$ of the current distribution circuit, the corresponding current metering circuit produces an output shown by waveform F which reaches a current value of four units in the fourth 75 nanosecond period. The output of each of the current metering circuits also decays at the same rate as it rises. Thus, at any particular interval of time the summation of all three outputs of the current metering circuits as shown combines to produce a straight line ramp.

What is claimed is:

1. A vector generator for causing an electron beam to draw a vector of any length and at any angle on the face of a cathode ray tube, said vector having a first component along a first axis and a second component along a second axis at right angles to the first axis, said generator comprising:

(a) first means tending to move said beam along said first axis in unit increments, and (b) second means coupled to said first means for simultaneously tending to move said beam along said second axis by an amount equal to the ratio of said second component to said first component times said unit increment.

2. A vector generator for causing an electron beam to draw a vector of any length and at any angle on the face of a cathode ray tube having first and second yoke windings, said vector having a first component along a first axis and a second component along a second axis at right angles to the first axis, said generator comprising:

(a) first storage means for storing two groups of $m$ bits of data representative of the coordinates of the initial beam position along each of said first and second axes, each of said groups of $m$ bits including $x$ major position bits, $y$ minor position bits and $z$ accuracy bits, (b) second storage means for storing data representative of the ratio of said second axis component to said first axis component, (c) third storage means for storing data representative of the final beam position along said first axis, (d) counter means coupled to said first storage means for repeatedly and algebraically incrementing said group of $m$ bits stored therein representative of said initial beam position along said first axis in unit increments to indicate present beam position along said first axis at any instant, (e) adding means including a plurality of stages coupled to said first storage means and said second storage means for simultaneously, repeatedly and algebraically incrementing the other said group of $m$ bits stored therein representative of said initial beam position along said second axis by said ratio, said stages storing said major position bits, minor position bits and accuracy bits with said minor position bit stages and said accuracy bit stages having provisions for producing carries, and (f) comparing means coupled to said counter and said third storage means for producing a signal to stop said incrementing when selected ones of said group of $m$ bits representing said present beam position compares with the data representative of said final beam position.

3. The vector generator as in claim 2 wherein said first storage means comprises:

(a) a first register for storing a first group of $m$ bits of data representative of the coordinates of the initial beam position along a first axis, and (b) a second register for storing a second group of $m$ bits of data representative of the coordinates of the initial beam position along a second axis, each of said registers comprising:

(1) a first group of stages for storing data representative of major position points on said cathode ray tube face, and receiving any carries from said plurality of stages in said adding means storing said minor position bits, (2) a second group of stages for storing data representative of minor position points within said major position points, and for receiving any carries from said plurality of stages in said adding means storing said accuracy bits, and (3) a third group of stages for storing data representative of accuracy position points within said minor position points.

4. The vector generator of claim 2 further including:

(a) a digital-to-analog converter connected to said first storage means for converting said stored digital data to an analog current for moving said electron beam, (b) a beam speed control circuit connected to said comparing means, said counter means and said adder means for producing a signal to control the vector drawing speed, and (c) means connected to said second storage means and said beam speed control circuit for controlling the intensity of said vector.

5. The vector generator of claim 4 wherein said means for controlling said intensity comprises:

(a) first means coupled to said second storage means for receiving data representative of the angle at which the vector is to be drawn, (b) second means coupled to said beam speed control circuit for receiving data representative of said vector drawing speed, and (c) third means coupled to said first means and said second means for varying the intensity of said vector according to said angle and said drawing speed, said intensity increasing with an increase of said angle or an increase of said drawing speed.

6. The vector generator of claim 4 wherein said beam speed control circuit comprises:

(a) gate means coupled to said comparing means for producing an output signal when $n$ of said $m$ bits representing said present beam position compare with $n$ corresponding bits representing said final beam position, and (b) control means coupled to said gate means for causing said beam to move in $2^{n-1}$ unit increments along said first axis and $2^{n-1}$ unit increments times said ratio along said second axis said unit increment being the smallest step the beam can be moved, said control means causing said beam to move in $2^n$ unit increments along said first axis and $2^n$ unit increments times said ratio along said second axis when said output signal is produced by said gate means.

7. The vector generator of claim 4 wherein said beam speed control circuit comprises:

(a) gate means coupled to said comparing means for producing an output signal when $x-n$ bits of said data representing said present beam position compare with the $x-n$ corresponding bits of data representing said final beam position, and (b) control means coupled to said gate means for causing said beam to move in $2^n$ unit increments along said first axis and $2^n$ unit increments times said ratio along said second axis, said unit increment being the smallest step the beam can be moved, said control means causing said beam to move in $2^{n-1}$ unit increments along said first axis and $2^{n-1}$ unit increments times said ratio along said second axis when said output signal is produced by said gate means.

8. The vector generator of claim 4 wherein said digital-to-analog converter comprises:

(a) a current distribution circuit coupled to said first storage means for receiving said major and minor position bits and producing output signals for controlling the increments of current to be coupled to one of said yoke windings of the cathode ray tube, (b) a current metering circuit coupled to said current distribution circuit for receiving said output signals and producing said increments of current, and (c) means coupled to said current metering circuit for receiving said increments of current and driving said yoke winding.

9. The digital-to-analog converter of claim 8 wherein said current distribution circuit comprises:

(a) a first group of $n+p$ bistable circuits coupled to said first storage means for receiving major position bits from $n$ of $j$ bistable circuits and minor position bits from $p$ bistable circuits and producing output signals representing $$2^n+\sum_{p=1}^{p=i} 2^{-p}$$

unit increments of current where $n>0$, $p>0$ and $i$ is an integer $>1$, (b) a logic circuit coupled to said first storage means for receiving the remaining $j-n$ major position bis and producing $r$ control signals where $r=2^{j-n}-1$, and (c) a second group of $r$ bistable circuits coupled to said logic circuit for receiving said $r$ control signals and producing $r$ output signals each representing an increment of current I where $$I=\frac{2^j-2^n}{r}$$

10. The digital-to-analog converter of claim 8 wherein said driving means comprises:

(a) a plurality of transistors forming a driving circuit and having their collectors connected in parallel to the yoke winding of the cathode ray tube, (b) a like plurality of input terminals for receiving increments of current from said current metering circuit, each of said input terminals being directly connected to the emitter of a corresponding one of said plurality of transistors, and, through resistance means, to each of the emitters of the remainder of the transistors, said interconnection of input terminals with said plurality of transistors preventing any one of said transistors from excessive conduction and thus premature failure, (c) a driving transistor with its collector connected to the collector of each of the plurality of transistors and its emitter connected to the base of each of the plurality of transistors, and (d) a reference voltage circuit supplying base current to said driving transistor, said interconnection between said driving transistor and said plurality of transistors enabling a high gain to be obtained between said base current and said increments of current received by said input terminals and at the same time isolating said input terminals from said reference voltage circuit so that any changes in the current at the input terminals does not affect the reference voltage.

References Cited

UNITED STATES PATENTS

| | | | |
|---|---|---|---|
| 3,325,802 | 1967 | Bacon | 240—347 XR |
| 3,329,948 | 1967 | Halsted | 315—18 XR |
| 3,331,069 | 1967 | Cornell et al. | 343—11 |
| 3,333,147 | 1967 | Henderson | 315—23 XR |
| 3,337,860 | 1967 | O'Hara | 315—18 XR |
| 3,394,367 | 1968 | Dye | 315—18 XR |

MALCOLM A. MORRISON, Primary Examiner

E. J. WISE, Assistant Examiner

U.S. Cl. X.R.

328—186; 343—10, 11